United States Patent
McDonald et al.

(10) Patent No.: US 8,527,402 B2
(45) Date of Patent: *Sep. 3, 2013

(54) MORTGAGE LOAN DATA PROCESSING SYSTEM AND METHOD FOR A LOAN BROKER

(75) Inventors: Russell W. McDonald, Orinda, CA (US); Russell W. McDonald, II, Orinda, CA (US)

(73) Assignee: Isourceloans LLC, Los Angeles, CA (US)

( * ) Notice: Subject to any disclaimer, the term of this patent is extended or adjusted under 35 U.S.C. 154(b) by 812 days.

This patent is subject to a terminal disclaimer.

(21) Appl. No.: 12/074,163

(22) Filed: Feb. 29, 2008

(65) Prior Publication Data

US 2008/0215482 A1 Sep. 4, 2008

Related U.S. Application Data

(63) Continuation of application No. 10/429,157, filed on May 1, 2003, now Pat. No. 7,340,435, which is a continuation of application No. 09/349,517, filed on Jul. 8, 1999, now Pat. No. 7,315,841.

(60) Provisional application No. 60/093,729, filed on Jul. 22, 1998, provisional application No. 60/093,730, filed on Jul. 22, 1998, provisional application No. 60/093,750, filed on Jul. 22, 1998.

(51) Int. Cl.
*G06Q 40/00* (2012.01)

(52) U.S. Cl.
USPC .............................................. 705/38; 705/35

(58) Field of Classification Search
CPC ....................................................... G06Q 40/00
USPC ...................................................... 705/35, 38
See application file for complete search history.

(56) References Cited

U.S. PATENT DOCUMENTS

| | | | |
|---|---|---|---|
| 2,635,807 A | 4/1953 | Flint | |
| 4,876,648 A | 10/1989 | Lloyd | |
| 5,239,462 A | 8/1993 | Jones et al. | |
| 5,375,055 A * | 12/1994 | Togher et al. | 705/37 |
| 5,644,726 A | 7/1997 | Oppenheimer | |
| 5,699,527 A * | 12/1997 | Davidson | 705/38 |
| 5,765,144 A * | 6/1998 | Larche et al. | 705/38 |
| 5,819,230 A | 10/1998 | Christie et al. | |
| 5,870,721 A | 2/1999 | Norris | |
| 5,878,403 A | 3/1999 | DeFrancesco et al. | |
| 5,930,776 A | 7/1999 | Dykstra et al. | |
| 5,940,811 A | 8/1999 | Norris | |

(Continued)

OTHER PUBLICATIONS

Negroni, Andrea. Cyber regulation. Mortgage banking. Nov. 1997. p. 1-6.*

(Continued)

*Primary Examiner* — Jason Dunham
*Assistant Examiner* — Jamie Swartz
(74) *Attorney, Agent, or Firm* — Jason H. Vick; Sheridan Ross, PC

(57) ABSTRACT

An exemplary embodiment includes a data processing system and method for managing the origination of a mortgage loan by a loan originator in coordination with a loan broker for a loan customer. The loan originator is not the loan broker. The loan originator provides services necessary for the origination of the mortgage loan and not duplicative of services provided by the loan broker.

83 Claims, 47 Drawing Sheets

(56) References Cited

U.S. PATENT DOCUMENTS

| | | | |
|---|---|---|---|
| 5,940,812 A | 8/1999 | Tengel et al. | |
| 5,966,699 A | 10/1999 | Zandi | |
| 5,966,700 A | 10/1999 | Gould et al. | |
| 5,969,324 A | 10/1999 | Reber et al. | |
| 5,995,947 A | 11/1999 | Fraser et al. | |
| 6,012,047 A | 1/2000 | Mazonas et al. | |
| 6,012,050 A | 1/2000 | Eaton et al. | |
| 6,112,190 A * | 8/2000 | Fletcher et al. | 705/36 R |
| 6,185,543 B1 * | 2/2001 | Galperin et al. | 705/38 |
| 6,192,347 B1 | 2/2001 | Graff | |
| 6,314,404 B1 | 11/2001 | Good et al. | |
| 6,385,594 B1 | 5/2002 | Lebda et al. | |
| 6,438,526 B1 | 8/2002 | Dykes et al. | |
| 6,597,983 B2 | 7/2003 | Hancock | |
| 6,684,189 B1 * | 1/2004 | Ryan et al. | 705/4 |
| 6,904,412 B1 | 6/2005 | Broadbent et al. | |
| 7,315,841 B1 | 1/2008 | McDonald et al. | |
| 7,340,435 B2 * | 3/2008 | McDonald et al. | 705/38 |
| 7,386,504 B2 | 6/2008 | McDonald et al. | |
| 7,620,598 B2 | 11/2009 | McDonald et al. | |
| 7,761,372 B2 | 7/2010 | McDonald et al. | |
| 2001/0011246 A1 | 8/2001 | Tammaro | |
| 2001/0011255 A1 | 8/2001 | Asay et al. | |
| 2002/0035530 A1 | 3/2002 | Ervolini et al. | |

OTHER PUBLICATIONS ifap.ed.gov. Chapter 5 Loan Origination Records and Promissory Notes. Jun. 1997. p. 1-14.http://www.ifap.ed.gov/dlsguides/attachments/chptr5a.pdf.*

HUD. Office of the Assistant Secretary for Housing-Federal Housing Commissioner. Refinancing of Existing Insured Mortgages Pursuant to Section 223(a)(7) of the National Housing Act. Nov. 24, 1993. p. 1-6.* ifap.ed.gov. Chapter 5 Loan Origination Records and Promissory Notes. Jun. 1997. p. 1-14. http://www. ifap. ed.gov/d lsg uides/attach me nts/ch ptr5a, pdf.*

Advertisement entitled "The New Real Estate Environment is Here" Creation Date Unknown.

Advertisement entitled "Third Party Loan Origination Compliance Empowers" Creation Date Unknown.

Advertisement entitled "We have Compliance Down to a System" Creation Date Unknown.

Advertisement entitled "The Recognized Leader in Compliance" Creation Date Unknown.

Advertisement entitled "One Pipeline Success in the Face of Change" Creation Date Unknown.

Belsky, Eric et al. "A Primer on Geographic Information Systems in Mortgage Finance" Journal of Housing Research, vol. 9, Issue 1, pp. 5-31.

Bowen, Laura "Echo Unit Unveils FHA Processing System" Real Estate Finance Today; Washington; Jul. 20, 1998, vol. 15, Issue 15, p. 3.

Clayton, Michelle "Examining Electronic Mortgage Networks" America's Community Banker; Washington; Jul. 1998, vol. 7, Issue 7, p. 14.

Friedman, Jack P. "Dictionary of Business Terms, Third Edition" Barron's Educational Series, Inc. 1987, 1994; pp. 68, 71, 164, 257, 98, 576, 341, 342, 50, 609, 694, 154, 566, and 252.

IBM Technical Disclosure Bulletin, "Simple Dialogue to Define Business Process Work Flows", vol. 34, Issue No. 10A, pp. 408-409, Mar. 1992.

Kersnar, Scott "Lenders Interactive Online Network is Linking up with Byte's Software" National Mortgage News, New York; Jul. 13, 1998, vol. 22, Issue 42, p. 14.

Lyons, Sarah "Stay in Tune with RESPA" Mortgage Originator, Mar. 2004, pp. 92, 94, and 97.

Mason, Joseph R. "Mortgage Loan Modification: Promises and Pitfalls" Oct. 3, 2007, web edition, pp. 1-22.

Murray, Michael "OnePipeline Picks Up Insurance Agents" Sep. 3, 2001, http://www.mbaa.org/reft/stories/0133one.html.

OnePipeline Co-Mortgage Broker Agreement. Creation Date Unknown.

OnePipeline Employment Application Agreement (6 pages including Attachment A). Creation Date Unknown.

OnePipeline Real Estate Broker/Owner Assistance Agreement. Creation Date Unknown.

Possible web page or PowerPoint print outs (21 pages), entitled "One Pipeline" Creation Date Unknown.

Ryan, F. "Mortgage Loan Data Processing System" Derwent Information LTD; IFG Technology & Dev LTD (IFGTIN); Dec. 31, 1996; p. 1.

Teixeira, Diogo "The Mortgage Industry: Virtual Banking and Virtual Technology (Executive View)" American Banker, vol. 159, No. 166.

Thrall, Grant "GIS Applications in Real Estate and Related Industries" Journal of Housing Research, vol. 9, Issue 1, pp. 33-59.

"Truth in Lending Act—Regulation Z," The Mortgage MART, 3 pages, found at http://www.mortgagemart.com/regz.html on Apr. 26, 2001.

Truth in Lending Disclosure Statement, Form RegZD (Mar. 1995), found at http://nt.mortgage101.com/web/pdf/til.pdf on Apr. 26, 2001.

Official Action for U.S. Appl. No. 09/349,517, mailed May 7, 2001.
Official Action (Restriction Requirement) for U.S. Appl. No. 09/349,517, mailed Feb. 24, 2003.
Official Action for U.S. Appl. No. 09/349,517, mailed Oct. 23, 2003.
Official Action for U.S. Appl. No. 09/349,517, mailed Mar. 9, 2004.
Official Action for U.S. Appl. No. 09/349,517, mailed Sep. 26, 2005.
Official Action for U.S. Appl. No. 09/349,517, mailed May 2, 2006.
Official Action for U.S. Appl. No. 09/349,517, mailed Aug. 28, 2006.
Notice of Allowance for U.S. Appl. No. 09/349,517, mailed Sep. 5, 2007.
Official Action for U.S. Appl. No. 10/429,157, mailed Oct. 11, 2006.
Notice of Allowance for U.S. Appl. No. 10/429,157, mailed Dec. 21, 2007.
Official Action (Restriction Requirement) for U.S. Appl. No. 10/429,383, mailed Jan. 31, 2007.
Official Action for U.S. Appl. No. 10/429,383, mailed Mar. 23, 2007.
Official Action for U.S. Appl. No. 10/429,383, mailed Jul. 31, 2007.
Examiner's Interview for U.S. Appl. No. 10/429,383, mailed Aug. 9, 2007.
Notice of Allowance for U.S. Appl. No. 10/429,383, mailed Sep. 5, 2007.
Official Action for U.S. Appl. No. 11/966,422, mailed Jul. 22, 2008.
Official Action for U.S. Appl. No. 11/966,422, mailed Jan. 26, 2009.
Notice of Allowance for U.S. Appl. No. 11/966,422, mailed Jul. 23, 2009.
Official Action for U.S. Appl. No. 12/072,046, mailed Jun. 5, 2009.
Notice of Allowance for U.S. Appl. No. 12/072,046, mailed Apr. 2, 2010.

* cited by examiner

ORIGINATION SYSTEMS AND PROCEDURES — 100

Broker/Lender must begin by selecting the appropriate type of Originator from the list below:

ORIGINATOR "RE" — 102
Real Estate Brokers/Agents → Fig. 3B — 122

ORIGINATOR "B" — 104
Home Builders, FSBOs, etc. → Fig. 3F — 124

ORIGINATOR "FP" — 106
CPAs, Financial Planners, Broker/Dealers, Stock Brokers, Insurance Brokers/Agents, Attorneys or other financial professionals. Collectively ORIGINATOR is a financial professional. → Fig. 3J — 126

ORIGINATOR "FI" — 108
Financial Istitutions such as Banks, Savings and Loans, Thrifts, Credit Unions, etc. → Fig. 3N — 128

ORIGINATOR "R" — 110
Relocation Company → Fig. 3R — 130

ORIGINATOR "C" — 112
Consumer is Originator → Fig. 3V — 132

Fig. 3A

STEP #4 (CONT) - INFORMATION AND INTERVIEW
FOR ORIGINATOR "B"

— 290

Property information to be entered includes (but is not limited to) sales price of new home, date of price list being used, prices of any options and upgrades, amount of deposits, amount of future deposits, etc. ORIGINATOR also tells Cypher whether the Buyer/Borrower wants a set loan amount or if the loan is to be a set percentage of the ultimate sales price.

Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not ORIGINATOR is giving a credit for closing costs. Such a credit can be manually input or Cypher can calculate the credit if it is based on a pre-determined formula. ORIGINATOR will also indicate whether or not the Buyer/Borrower will have impounds for taxes/insurance.

— 292                                                      — 294

ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

| ORIGINATOR prints and explains forms to Buyer/Borrower, including forms and pamphlets from the lot folder (the boiler plate forms). Buyer/Borrower signs all forms. | ORIGINATOR collects all applicable documentation on the stacking order checklist from the Buyer/Borrower, including (but not limited to) W-2 forms, paystubs, bank statements, tax returns, bankruptcy papers, retirement information, etc. |

— 296                                                      — 298

ORIGINATOR packages up all gathered information and puts said information in a pre-determined stacking order and sends it to Broker/Lender for processing.

— 300                                    Continue with Step #5, Fig. 3Y

STEP #4 - (CONT) - ORIGINATOR "FP"

```
                                                               ┌ 370
┌─────────────────────────────────────────────────────────────────┐
│  Loan details to be entered include rate; term; points; whether or not there is a │
│  balloon payment; title and escrow fees (they can be pre-programmed into the     │
│  system).  Also indicated is whether or not Broker/Lender is giving a credit for │
│  closing costs.  ORIGINATOR will also indicate whether or not the Borrower will  │
│  have impounds for taxes/insurance. If loan is to be a "No Point, No Fee" Cypher │
│              will calculate and disclose applicable credits.                     │
└─────────────────────────────────────────────────────────────────┘
                                 │
                                 ▼                             ┌ 372
┌─────────────────────────────────────────────────────────────────┐
│ ORIGINATOR must also complete the Declarations section on the loan application  │
│   (example page 3 of current FNMA 1003), this section discloses any lawsuits,   │
│   bankruptcies, foreclosures, loan defaults, etc. Also, information about sex and│
│    national origin is requested.  If Borrower does not wish to provide information│
│ about sex and national origin, ORIGINATOR will acknowledge that Borrower does   │
│                        not wish to provide such information.                    │
└─────────────────────────────────────────────────────────────────┘
                                 │
                                 ▼                             ┌ 374
┌─────────────────────────────────────────────────────────────────┐
│    ORIGINATOR prints and explains forms to Borrower, including forms and        │
│    pamphlets from the lot folder (the boiler plate forms).  Borrower signs all forms.│
└─────────────────────────────────────────────────────────────────┘
                                 │
                                 ▼                             ┌ 376
┌─────────────────────────────────────────────────────────────────┐
│ ORIGINATOR collects all applicable documentation on the stacking order checklist│
│    from the Borrower, including (but not limited to) W-2 forms, paystubs, bank  │
│      statements, tax returns, bankruptcy papers, retirement information, etc.   │
└─────────────────────────────────────────────────────────────────┘
                                 │
                                 ▼                             ┌ 378
┌─────────────────────────────────────────────────────────────────┐
│  ORIGINATOR packages up all gathered information and puts said information in a │
│     pre-determined stacking order and sends it to Broker/Lender for processing. │
└─────────────────────────────────────────────────────────────────┘
       │      ┌ 380                    Continue with Step #5, Fig. 3Y
       ▼──────────────────────────────────────────────────────────▶
```

Fig. 3M

STEP #4 - (CONT) - FOR ORIGINATOR "FI"
⌐ 450

Loan details to be entered include (but are not limited to) rate; term; points; whether or not there is a balloon payment; title and escrow fees (if Cypher has these fees in advance they can be pre-programmed into the system) and whether or not Broker/Lender is giving a credit for closing costs. Such a credit can be manually input or Cypher can calculate the credit if it is based on a pre-determined formula. ORIGINATOR will also indicate whether or not the Buyer/Borrower will have impounds for taxes/insurance. If loan is to be a "No Point, No Fee" Cypher will calculate and disclose applicable credits.

↓ ⌐ 452

ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

↓ ⌐ 454

ORIGINATOR prints and explains forms to Buyer/Borrower, including forms and pamphlets from the lot folder (the boiler plate forms). Buyer/Borrower signs all forms.

↓ ⌐ 456

ORIGINATOR collects all applicable documentation on the stacking order checklist from the Buyer/Borrower, including (but not limited to) W-2 forms, paystubs, bank statements, tax returns, bankruptcy papers, retirement information, etc.

↓ ⌐ 458

ORIGINATOR packages up all gathered information and puts said information in a pre-determined stacking order and sends it to Broker/Lender for processing.

↓ ⌐ 460  Continue with Step #5, Fig. 3Y →

Fig. 3Q

STEP #3 - PRELIMINARY SETUP - FOR ORIGINATOR "R"

FILE FOLDER (500)
Contains forms, pamphelets and disclosures that are not customized for each Buyer/Borrower and a stacking order checklist. Each ORIGINATOR will have several blank files to be customized at application. File folder will be modified to comply with regulatory and professional organization rules and standards.

↓

COMPUTERIZED SYSTEM (502)
System will coordinate and read information from ORIGINATOR's industry software . Through reading files in other software ORIGINATOR uses in the course of its normal business practices, information can be extracted for loan documents. ORIGINATOR inputs any infornation that is not extracted from its other software systems directly (see details below under CYPHER). Cypher will be modified to comply with regulatory rules and professional organization rules and standards.

↓ (504) Continue with Step #4, Fig. 3T →

Fig. 3S

STEP #4 - (CONT) - FOR ORIGINATOR "R"

530
Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not Broker/Lender is giving a credit for closing costs and if so the amount of the credit. Such a credit can be manually input or Cypher can calculate the credit if it is based on a pre-determined formula. ORIGINATOR will also indicate whether or not the Buyer/Borrower will have impounds for taxes/insurance.

532
ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

534
ORIGINATOR prints and explains forms to Buyer/Borrower, including forms and pamphlets from the lot folder (the boiler plate forms). Buyer/Borrower signs all forms.

536
ORIGINATOR collects all applicable documentation on the stacking order checklist from the Buyer/Borrower, including (but not limited to) W-2 forms, paystubs, bank statements, tax returns, bankruptcy papers, retirement information, etc.

538
ORIGINATOR packages up all gathered information and puts said information in a pre-determined stacking order and sends it to Broker/Lender for processing.

540 Continue with Step #5, Fig. 3Y

Fig. 3U

STEP #4 - (CONT) - FOR ORIGINATOR "C"

580
Property information to be entered includes (but is not limited to) sales price of home, contingencies, amount of deposits, amount of future deposits, etc. Consumer also tells Cypher whether the Buyer/Borrower wants a set loan amount or if the loan is to be a set percentage of the ultimate sales price.

↓ 582

Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and if Broker/Lender is giving a credit for all or part of the non-recurring closing costs. Such a credit can be manually input or Cypher can calculate the credit if it is based on a pre-determined formula. Consumer will also indicate whether or not the Buyer/Borrower will have impounds for taxes/insurance.

↓ 584

Consumer must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, Consumer will acknowledge that Buyer/Borrower does not wish to provide such information.

↓ 586

Consumer prints all forms and also prints an explanation sheet regarding all the forms and then proceeds to sign the forms.

↓ 588

Consumer collects all applicable documentation on the stacking order checklist including (but not limited to) W-2 forms, paystubs, bank statements, tax returns, bankruptcy papers, retirement information, etc.

↓ 590

Consumer packages up all gathered information and puts said information in a pre-determined stacking order and sends it to Broker/Lender for processing.

↓ 592     Continue with Step #5, Fig. 3Y →

Fig. 3X

Contract Information - Lots and Costs (1 of 2) — 34a, 30c

- Lot: 1   Block: [ ]   Unit (Phase): [ ]
- Our Lot # (if different from above): [ ]
- Community Name: Sterling Village
- Street Address: 1 Magnolia Avenue
- City: Rohnert Park   Zip: 94928
- County: Sonoma

- Amount of daily penalty for late close to be listed in paragraph #6: 100  — 34e
- Amount to be listed for liquidated damages [paragraph 14]: 3000 — 34d
- ☒ Check if Subject to CC&Rs — 34f
- ☐ Check if Subject to Prior Sale — 34g

- Date of Price List: 1/1/98
- Base Price per List Mentioned Above: 245000
- Lot Premium: 500 — 34b
- Upgrades per ATC #1: 6400
- #'s for other ATC's — 34k
- Total for other ATC's: 0
- Total Purchase Price: 251900
- LTV to use for Loan Calcs: ○100% ○97% ○95% ○90% ◉80% ○Other [input loan manually] — 34h

- Deposit Received this date [to escrow]: 1000 — 34i
- Deposit Payable To [escrow company]: North American Ti — 34j
- Date Additional Deposit to be Due: [ ]
- Amount of Additional Deposit: 0
- Amt ATCs Rec'd: 0
- Date Add'l ATCs Due: [ ]
- Amt Add'l ATCs Due: 0
- Loan Amount: 201520 — 34l

Lender Information
- Cost of Credit Report: 55
- Lender Name: Wymac Capital
- ◉ Seller's Lender   ○ Other Lender
- Date Loan Contingency Expires: 2/25/98 — 34c

NOTE The figures for purchase price and loan amount WILL NOT be automatically carried forward to the loan screens because the initial numbers usually lack a significant amount of options and the loan applied for may be too low. Try to estimate high on the requested loan amount on the loan screen.

[Next] [Previous] [Main Menu] — 34m

Contract Information - Buyer Info (2 of 2) — 30d

- Buyers[s] Name[s]: John Smith | Mary Smith — 36f
- Present Address: 123 S. Main Street | 123 S. Main Street — 36b
- City, State ZIP: Walnut Creek, CA 94596 | Walnut Creek, CA 94596
- Home Phone: (510) 932-1234 | (510) 932-1234 — 36c
- Do You ☒ Own ☐ Rent   3 Yrs at Address | Do You ☒ Own ☐ Rent   3 Yrs at Address — 36d
- Monthly Rent/Mtg Payment: 1100 | 1100
- Market Value of Home [if homeowner]: 145000 | 145000

[Copy Address Info to Co-Buyer] — 36g, 36e

- Social Security Number: 123-45-6789 — 36i | 987-65-4321 — 36h, 36j

Buyer's Employment
- ○ Employed  ◉ Self-Employed  ○ Retired  ○ Not Employed
- Job Title: Custodian
- Employer: We Kleen U
- Bus. Address: 123 S. Main Street, Walnut Creek, CA
- Bus. Phone: (510) 932-1234
- Years There: 3
- Monthly Income: 4500

Co-Buyer's Employment
- ◉ Employed  ○ Self-Employed  ○ Retired  ○ Not Employed
- Job Title: Receptionist
- Employer: Spectacles
- Bus. Address: Walnut Creek
- Bus. Phone: (510) 932-0000
- Years There: 5
- Monthly Income: 1200

[Next] [Previous] [Main Menu] — 36a

Fig. 4D

Loan Information – Screen 1 of 3

Est. Final Purchase Price [With ALL Options] 255000

Loan Amount
Loan Amount 204000

Terms for 1st Mtg
Rate 7.25
Term [Years] 30
Balloon? O ●
Yrs to Balloon 0
Points to Charge 0

Amort Type
● Fixed
○ ARM

Loan Type
● Conv.
○ VA
○ FHA

Escrow/Title/Tax Issues
Escrow Fee
Owner's Title Ins.
Lender's Title Ins.
Transfer Tax 0

*NOTE* Only input these items if they will be charged to the buyers. If you are giving a credit for using Builder's Lender and want these fees to be paid in part by that credit then enter them here. Note that in many counties the transfer tax is almost seller paid.
☐ Check for Tax/Insurance Impounds

Credit to Closing Costs
Amount of Credit towards closing costs to show on application 2000

[Next] [Previous] [Main Menu]

Loan Information – Screen 2 of 3

| | Borrower | | Co-Borrower | |
|---|---|---|---|---|
| If the answer to any questions 'a' through 'i' is "YES" then attach explanation (ON NEXT SCREEN) | Yes | No | Yes | No |
| a. Are there any outstanding judgements against you? | ☐ | ☒ | ☐ | ☒ |
| b. Have you been declared bankrupt in the last 7 years? | ☐ | ☒ | ☐ | ☒ |
| c. Have you had property foreclosed upon or given title or deed in lieu thereof in the last 7 years? | ☐ | ☒ | ☐ | ☒ |
| d. Are you party to a lawsuit? | ☐ | ☒ | ☐ | ☒ |
| e. Have you directly or indirectly been obligated on any loan which resulted in foreclosure, transfer of title in lieu of foreclosure, or judgement? (This includes such loans as home mtg., SBA Loans, home improvement loans, educational loans, mobile home loans, any mortgage, financial obligation, bond, or loan guarantee. If "Yes" provide details, incl. date, name/address of lender, FHA or VA case #, if any and reasons for the action.) | ☐ | ☒ | ☐ | ☒ |
| f. Are you presently delinquent or in default on any federal debt or any other loan, mortgage, financial obligation, bond or loan guarantee? If "YES" give details as described in the preceding section. | ☐ | ☒ | ☐ | ☒ |
| g. Are you obligated to pay alimony, child support or separate maintenance? | ☐ | ☒ | ☐ | ☒ |
| h. Is any part of the down payment borrowed? | ☐ | ☒ | ☐ | ☒ |
| i. Are you a co-maker or co-endorser on a note? | ☐ | ☒ | ☐ | ☒ |
| j. Are you a U.S. citizen? | ☒ | ☐ | ☒ | ☐ |
| k. Are you a permanent resident alien? | ☐ | ☒ | ☐ | ☒ |
| l. You intend to occupy property as primary residence? | ☒ | ☐ | ☒ | ☐ |
| m. Have you had ownership in property in last 3 yrs? If yes select appropriate answers from list below | ☐ | ☒ | ☒ | ☐ |

Borrower              Co-Borrower
[PR - Principal Res. ▼]  [PR - Principal Res. ▼]
[Owned w/Spouse S▼]    [Owned w/Spouse S▼]

[Next] [Previous] [Main Menu]

Fig. 4F

Client Information Screen

Borrower(s) Name(s): John Smith | Mary Smith
Present Address: 123 S. Main Street | 123 S. Main Street
City, State ZIP: Walnut Creek, CA 94596 | Walnut Creek, CA 94596
Home Phone: (925) 932-1234 | (925) 932-1234
Do You ☑ Own ☐ Rent  4 Yrs at Address | Do You ☑ Own ☐ Rent  4 Yrs at Address
Monthly Rent/Mtg Payment: $1,500.00 | $1,500.00
Market Value of Home [if homeowner]: $250,000.00 | $250,000.00

[Copy Address Info to Co-Borrower]

Social Security Number: 123-45-6789 | Social Security Number: 987-65-4321

[Copy Address from Borrower's Address Above]  Subject Property Address: 123 S. Main Street - Walnut Creek, CA ☐ Self-Employed  Job Title: Supervisor
Years There: 4   Employer: City of Walnut Creek
Bus. Address:
Monthly Income: $4,000.00   Phone: (925) 935-0000

☐ Self-Employed  Job Title: Manager
Years There: 5   Employer: Cal-Trans
Bus. Address:
Monthly Income: $4,000.00   Phone: (925) 937-9990

[Main Menu]

Loan Information -- Screen 1 of 3

Property Value: 250000

Are there other liens on this property for which borrower is obligated? ☑ Yes ☐ No — 52b     52c Lienholder's Name: Bank of America    Amt Owing: $200,000.00    Priority: First
52a                                              $0.00
                                                 $0.00

Loan Amount
Loan Amount: $200,000.00

Terms for 1st Mtg
Rate: 7.25
Term [Years]: 30
Balloon? ☐ Yes  ◉ No
Yrs to Balloon: 0
Points to Charge: 0

Amort Type:
◉ Fixed
☐ ARM

Loan Type:
◉ Conventional
☐ VA
☐ FHA

Escrow Fee: $372.00
Lender's Title Fee: $620.90

☑ Check for Impounds for Taxes/Ins.
☑ Check for No Point/No Fee Loan

[Next]
[Previous]
[Main Menu]

Fig. 5D

| Loan Information - Screen 2 of 3 | | | | |
|---|---|---|---|---|
| If the answer to any questions 'a' through 'i' is "YES" then attach explanation (ON NEXT SCREEN) | Borrower | | Co-Borrower | |
| | Yes | No | Yes | No |
| a. Are there any outstanding judgements against you? | ☐ | ☑ | ☐ | ☑ |
| b. Have you been declared bankrupt in the last 7 years? | ☐ | ☑ | ☐ | ☑ |
| c. Have you had property foreclosed upon or given title or deed in lieu thereof in the last 7 years? | ☐ | ☑ | ☐ | ☑ |
| d. Are you party to a lawsuit? | ☐ | ☑ | ☐ | ☑ |
| e. Have you directly or indirectly been obligated on any loan which resulted in foreclosure, transfer of title in lieu of foreclosure, or judgement? (This includes such loans as home mtg., SBA Loans, home improvement loans, educational loans, mobile home loans, any mortgage, financial obligation, bond, or loan guarantee. If "Yes" provide details, incl. date, name/address of lender, FHA or VA case #, if any and reasons for the action.) | ☐ | ☑ | ☐ | ☑ |
| f. Are you presently delinquent or in default on any federal debt or any other loan, mortgage, financial obligation, bond or loan guarantee? If "YES" give details as described in the proceding section. | ☐ | ☑ | ☐ | ☑ |
| g. Are you obligated to pay alimony, child support or separate maintenance? | ☐ | ☑ | ☐ | ☑ |
| h. Is any part of the down payment borrowed? | ☐ | ☑ | ☐ | ☑ |
| i. Are you a co-maker or co-endorser on a note? | ☐ | ☑ | ☐ | ☑ |
| j. Are you a U.S. citizen? | ☑ | ☐ | ☑ | ☐ |
| k. Are you a permanent resident alien? | ☐ | ☑ | ☐ | ☑ |
| l. You intend to occupy property as primary residence? | ☑ | ☐ | ☑ | ☐ |
| m. Have you had ownership in property in last 3 yrs? If yes select appropriate answers from list below | ☑ | ☐ | ☑ | ☐ |
| Borrower: PR - Principal Res. ▼ / Owned w/Spouse [S] ▼ | | | Co-Borrower: PR - Principal Res. ▼ / Owned w/Spouse [S] ▼ | |

[Next] [Previous] [Main Menu]

Fig. 5E

Loan Information - Screen 3 of 3

X. INFORMATION FOR GOVERNMENT MONITORING PURPOSES

☐ Do not wish to provide  ☐ Male  ☑ Female        ☐ Do not wish to provide  ☑ Male  ☐ Female ☐ American Indian or Alaskan Native  ☐ Asian or Pacific Islander  ☑ White, not Hispanic        ☐ American Indian or Alaskan Native  ☐ Asian or Pacific Islander  ☑ White, not Hispanic ☐ Black, not Hispanic  ☐ Hispanic  ☐ Other (specify) ____        ☐ Black, not Hispanic  ☐ Hispanic  ☐ Other (specify) ____

Use the following text boxes to attach any explanations required for declarations section or any other information that needs to be included on page 4. The system will automatically carry over any additional assets/liabilities on its own.

[Next] [Previous] [Main Menu]

Fig. 5F

Client Information Screen

Client(s) Name(s)
- John / First / Mary
- Smith / Last / Smith
- 123-45-6789 / SSN / 987-65-4321

Current Address:
- Street Address: 123 S. Main Steet
- City: Walnut Creek    State: CA
- ZIP Code: 94596

Financial Info:
- Amount of money available for down payment: $51,000.00

New Address:
- Street Address: Lot #1 at Sterling Village
- City: Rohnert Park    State: CA
- ZIP Code: 94928

Income - Client #1: $4,000.00
○ Weekly ○ Annually ○ Monthly ☐ Self-Employed

Income - Client #2: $14,000.00
○ Weekly ● Annually ○ Monthly ☐ Self-Employed

Phone Numbers:
- Home: (0) -
- Work1: (0) -
- Work2: (0) -

Filename: [required] TEST2.SRC

Done

Fig. 8C

Qualification Screen

Calculation Type:

If you have a specific home or price in mind, select this option button to see if you can qualify, and under which programs.
● Specific Home or Price Select this option if you don't really know your price range, and want to see the most you can qualify for.
○ How Much Can We Get?

Pick One

Funds available for down payment: $51,000.00
3%  5%  10%  20%

Purchase Price: $245,000.00
Is this home a condominium? ○ Yes ● No

Current monthly expenses for det that's "Non-Housing": $125.00
What is current monthly rent or mortgage payment? $0.00

Client Name(s): Smith/Smith    File Name: TEST2.SR
Total Monthly Income: $5166.67
Current Address: 123S. Main Street
    Walnut Creek, CA 94596
New Address: Lot #1 at Sterling Village
    Rohnert Park, CA 94928

Calculate    CANCEL

Fig. 8D

Calculation Results

| | Rate #1 | Points (#1) | Payment (#1) | PITI #1 | Debt Ratios #1 | Rate #2 | Points (#2) | Pay (# |
|---|---|---|---|---|---|---|---|---|
| 30 Yr Fixed Conforming | 6.75% | 2 | $1258.28 | $1584.95 | 30.7/33.1 | 7% | 1 | $129 |
| 30 Yr Fixed Conforming 2-1 Buydown | 5.625% | 2 | $1116.77 | $1443.44 | 27.9/30.4 | 5.875% | 1 | $114 |
| 30 Yr Fixed Jumbo | 7% | 2 | $1290.69 | $1617.35 | 31.3/33.7 | 7.25% | 1 | $132 |
| 30 Yr Fixed Jumbo Quick-Qualifier | 7.375% | 2 | $1339.91 | $1666.58 | 32.3/34.7 | 7.625% | 1 | $137 |
| 30 Yr NO RATIO Fixed | 7.5% | 2 | $1356.48 | $1683.14 | 32.6/35.0 | 7.75% | 1 | $138 |

Info on Deal:
File Name: TEST2.SR
Purchase Price: $245,000.00
Loan Amount: $194,000.00
Monthly Income: $5,166.67
Percent Down: 20.82%
Taxes: $255.21  Insurance: $71.46

Pre-Qual
⊙ w/Shading
○ w/o Shading

Print Info
⊙ Summary
○ Detailed

Done

Fig. 8E

Qualification Information

| | Maximum Loan Amount | Maximum Purchase Price | Loan To Value | Rate | Points (#2) | Payment | Tax (estim |
|---|---|---|---|---|---|---|---|
| 30 Yr Fixed Conforming | $210,979.91 | $261,979.91 | 80.53% | 6.750% | 2.000% | $1,368.41 | $272 |
| 30 Yr Fixed Conforming 2-1 Buydown | $217,641.29 | $268,641.29 | 81.02% | 5.625% | 2.000% | $1,252.87 | $279 |
| 15 Yr Fixed Conforming | $174,744.80 | $225,744.80 | 77.41% | 6.500% | 2.000% | $1,522.21 | $235 |
| 30 Yr Fixed Jumbo Quick-Qualifier | $206,827.17 | $257,827.03 | 80.22% | 7.000% | 2.000% | $1,376.03 | $268 |
| 30 Yr Fixed Jumbo | $200,468.17 | $251,468.17 | 79.72% | 7.375% | 2.000% | $1,384.58 | $261 |
| 30 Yr NO RATIO Fixed | $204,000.00 | $255,000.00 | 80.00% | 7.500% | 2.000% | $1,426.40 | $265 |

Info on Deal:
File Name: TEST2.SR
Down Payment: $51,000.00
Monthly Income: $5166.67

Print Info
⊙ Summary
○ Detailed

Done

Fig. 8F

MORTGAGE LOAN DATA PROCESSING SYSTEM AND METHOD FOR A LOAN BROKER

CROSS-REFERENCE TO RELATED APPLICATIONS

This application is a continuation of U.S. application Ser. No. 10/429,157, filed May 1, 2003, now U.S. Pat. No. 7,340,435, which is a continuation of U.S. application Ser. No. 09/349,517, filed Jul. 8, 1999, now U.S. Pat. No. 7,315,841, which claims the benefit of and priority under 35 U.S.C. §119(e) to U.S. Provisional Application No. 60/093,729, filed Jul. 22, 1998, entitled "System for Originating Mortgage Loans and Coordinating Information Between Two or More of the Following: Multiple Listing Services (MLS), Real Estate Offices, Lenders, Appraisers, Title Companies, Escrow Companies, Home Inspectors, Pest Control . . . Transaction", U.S. Provisional Application No. 60/093,730, filed Jul. 22, 1998, entitled "Method for Enabling Real Estate Agents, CPAs, Attorneys, Home Builders and Other Mortgage and Non-Mortgage Related Persons to Provide Potential Home Buyers or Homeowners with a Variety of Financing Options, Open House Fliers Prequalification . . . Parameters", and U.S. Provisional Application No. 60/093,750, filed Jul. 22, 1998, entitled "Method for Enabling Real Estate Agents, Mortgage Banker, Mortgage Brokers, Banks, Institutions, CPAs, Attorneys, Home Builders, Direct Consumers and Other Mortgage and Non-Mortgage Related Persons to Provide Potential Home Buyers or Homeowners with Forms And Documention", each of which are incorporated herein by reference in their entirety.

FIELD

This invention relates generally to a mortgage loan data and financial services processing system and more particularly a method and system for a loan broker enabling real estate agents, mortgage bankers, mortgage brokers, banks, institutions, CPAs, attorneys, home builders, direct consumers and other mortgage and non-mortgage related persons to originate a real estate loan or mortgage transaction for potential home buyers or homeowners in compliance with RESPA and other regulatory agencies. The present invention also enables the origination of equipment leases, insurance, investments and the like.

BACKGROUND

The Real Estate Settlement Procedures Act ("RESPA") was enacted by Congress to implement reforms in the process of real estate settlement to insure that consumers are provided with greater and more timely information on the nature and costs of the settlement process and that the consumers are protected from unnecessarily high settlement charges caused by abusive practices. RESPA is applicable to "federally-related" residential mortgage loan transactions and is intended to result in:

1. More effective advance disclosure to home buyers and sellers of loan settlement costs;
2. Elimination of kickbacks or referral fees that tend to unnecessarily increase the costs of certain settlement services;
3. A reduction in the amount of funds home buyers are required to place in escrow accounts for payment of real estate insurance and real estate taxes; and
4. Significant reform and modernization of local record keeping of land title information.

RESPA is administered by Federal Housing and Urban Development, commonly known as HUD. RESPA does not affect the validity or enforceability of any sale or contract for the sale of real property or any loan, loan agreement, mortgage, or lien made or arising in connection with a federally regulated mortgage loan. A "federally related mortgage loan" is broadly defined as a loan which is secured by a first or subordinate lien on residential real property (including individual units of condominiums and co-operatives) designed principally for the occupancy of one to four families, and which is made by a lender who is regulated by or whose deposits or accounts are insured by an agency of the Federal Government, or it is made or insured, supplemented, guaranteed or assisted by designated Federal agencies or officers.

With regards to fees paid by lenders, most states will generally follow RESPA guidelines to determine if a fee paid to real estate agents or builders is an "illegal referral fee" or a "legal origination fee." Under HUD's interpretation of RESPA, lenders may pay a fee for actual services performed by their agents or contractors. In enforcing RESPA, HUD will look at whether or not actual work has been performed, and not solely whether there is an agreement to do the work. The work performed\ must be necessary for the transaction and cannot be duplicative of services performed by others. Under HUD's interpretation of RESPA, the "mere taking of an application is not sufficient work to justify a fee under RESPA."

The present invention provides a novel data processing system and method for coordinating and processing mortgage loans in, a manner that complies with (or exceeds) RESPA guide lines to allow payment of origination fees to real estate brokers, builders" licensed mortgage bankers, mortgage brokers, etc. Real estate brokers and others utilize the system of the present invention to originate mortgages, gather documents, complete forms, explain loan programs, provide disclosures, order appraisals, etc. in order to foster RESPA compliance.

SUMMARY

The present invention solves the problems posed by RESPA and other regulatory guidelines through a unique information and gathering system and method.

In accordance with the illustrated preferred embodiment, the present invention provides a novel, cost effective mortgage loan and financial services data processing system.

It is an object of the invention to provide a mortgage loan data processing system that complies with RESPA guidelines.

Also, it is an object of the invention to provide a financial services data processing system that complies with all applicable state and federal regulatory guidelines.

Another object of the invention is to provide a mortgage loan and financial services data processing system that allows real estate agents, mortgage bankers, mortgage brokers, banks, institutions, CPAs, attorneys, home builders, direct consumers and other mortgage and non-mortgage related persons to originate a real estate loan or mortgage transaction for potential home buyers or homeowners.

An additional object of the invention is to provide a mortgage loan and financial services data processing system which eliminates the gathering of duplicative information from a loan customer.

The system of the present invention includes, briefly, a mortgage loan data processing system for managing the origination of a mortgage loan by a loan originator for a loan customer, comprising:
computer processor means for processing data; storage means for storing data on a storage medium; means for initializing the storage medium; means for processing data regarding the loan customer already possessed by the loan originator; means for processing data regarding the loan customer not previously possessed by the loan originator input through screen displays; means for processing data regarding the already possessed and not previously possessed data and for generating a loan application for the loan customer; and means for processing data regarding the mortgage loan and the data regarding the loan customer and for generating disclosure documents.

The present invention has other objects and advantages which are set forth in the description of the Detailed Description. The features and advantages described in the specification, however, are not all inclusive, and particularly, many additional features and advantages will be apparent to one of ordinary skill in the art in view of the drawings, specification, and claims herein.

BRIEF DESCRIPTION OF THE DRAWINGS

FIGS. 4A-4H are schematic representations of display screens of the loan originator computer system of the present invention displaying the user interface for CPA's;

FIGS. 5A-5G are schematic representations of display screens of the loan originator computer system of the present invention displaying the user interface for Builders;

FIGS. 8A-8H are schematic representations of display screens of the loan originator computer system of the present invention displaying the user interface for loan calculation portion of the present invention.

DETAILED DESCRIPTION

The present invention is a computerized data processing system and method for coordinating and processing mortgage loans. The hardware and software components of the loan present invention are shown in FIG. 1.

Figure 1:
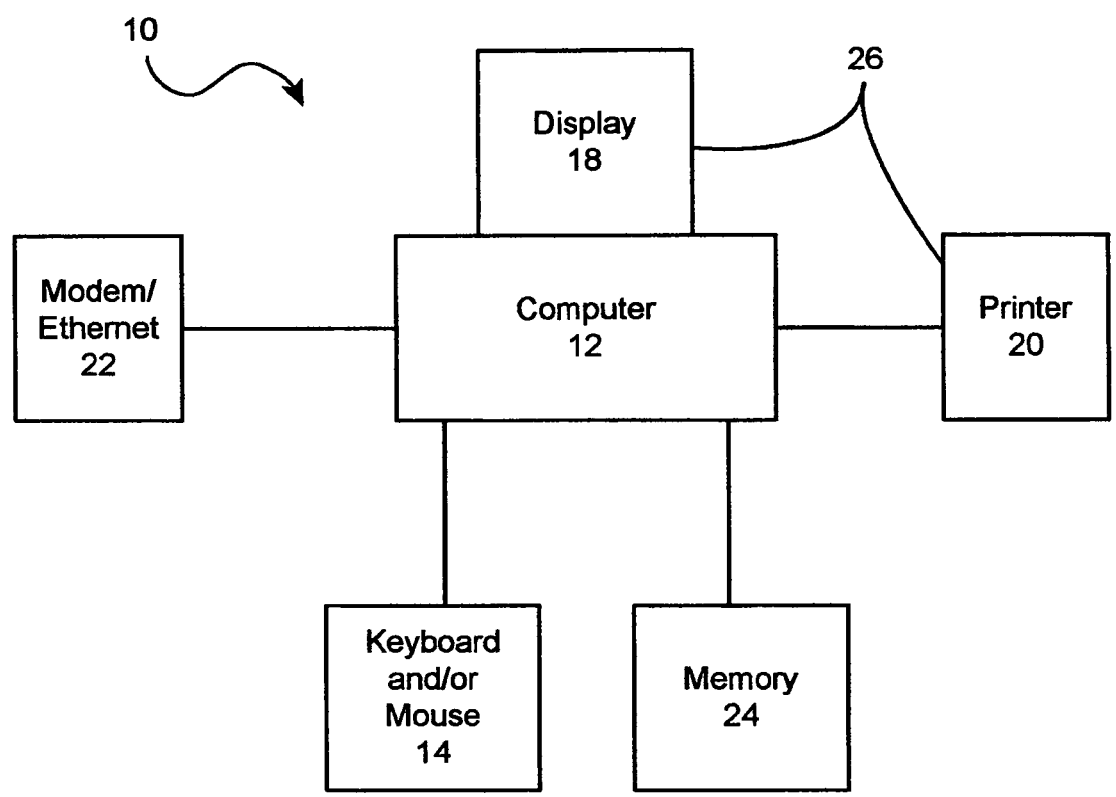
FIG. 1 is a schematic diagram illustrating the loan origination computer system of the present invention.

As shown in FIG. 1, the loan originator computer system 10 of the present invention includes a central processing unit (CPU) 12, primary input hardware 14, which typically includes both a keyboard and a mouse for entering data and commands into the CPU; output hardware 16 including a display such as a monitor screen 18 for displaying graphical user interface windows and the like and, typically, a printer 20 for generating hard copies of the loan application and disclosure forms; a modem or Ethernet card 22 for transferring the loan application and/or other data to other computers; and a memory unit 24.

The computer system 10 and method of the present invention preferably utilize an IBM PC or equivalent hardware (e.g. 32 bit platforms) that operate under WINDOWS 95 software or greater (e.g., WINDOWS 98 or WINDOWS NT). The computer system 10 preferably includes an Intel PENTIUM processor or compatible computer with at a hard drive and at least 16 Mb of RAM and a VGA display. Essentially, the computer system must be capable of running either WINDOWS 95, 98 or NT. The WINDOWS 95 software or greater software environment allows multiple software packages to run concurrently and communicate between themselves. Communication between the software packages leverages the software packages functionally into an integrated solution and minimizes software development.

The software of the computer system 10 preferably includes the following commercially available application software or its equivalent: WINDOWS 95 software or greater software available from Microsoft and a commercially available database such as Microsoft Access. This software is stored in memory unit 24 along with the program software of the present invention. Also stored in the memory unit 24 of the computer system 10 is data from other customer service software. For example, a CPA would have data regarding clients stored in memory unit 24 in connection with the CPA's accounting software.

The present invention enables various mortgage and non-mortgage related persons to use information which they already possess or can obtain about clients, prospective clients, and other contacts to originate a real estate loan transaction, thus acting as a loan originator. The system is specialized for each group based on information that is already in the loan originator's possession, or can be obtained by the loan originator with regards to prospective borrowers or is used in conjunction with or in lieu of the loan originator's normal software system for gathering and organizing and/or processing data.

Figure 2:
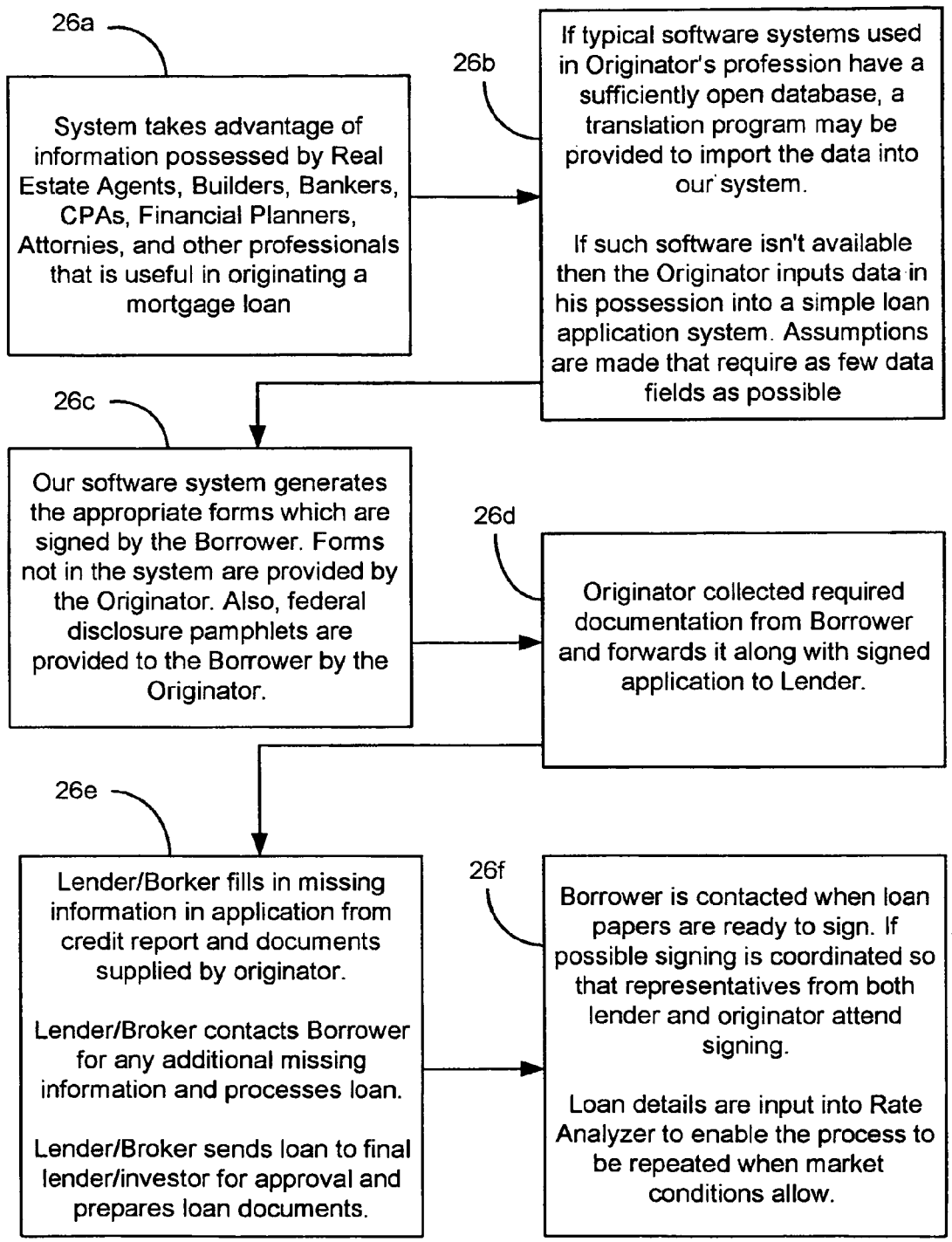
FIG. 2 is a flow chart describing the general methodology of the present invention.

The general methodology of the present invention is set forth in flow chart form in FIG. 2. As depicted, the process of the present invention identifies useful information already possessed by a loan originator 26a, imports the data into the loan origination system 26b, generates the necessary forms for the borrower 26c, collects additional information from the borrower 26d, all of the borrower information is transferred to a lender/broker where the loan application is finalized and approved 26e, and facilitates borrower's signing of the loan papers 26f.

The specifics of the methodology of the present invention are described in detail in the flow chart depicted in FIG. 3. The flow chart provides the customized process for a variety of different types of loan originators 28 including real estate brokers/agents 28a (identified as Originator "RE"); home builders, FSBO's and the like 28b (identified as Originator "B"); CPA's, financial planners, brokers/dealers, stock brokers, insurance brokers/agents, attorneys and other financial professionals 28c (identified as Originator "FP"); financial institutions such as banks, savings and loans, thrifts, credit unions and the like 28d (identified as Originator "PI"); relocation companies 28e (identified as Originator "R"); and consumers 28f (identified as Originator "C"). The flow chart describes the process from the loan originator through the automated underwriting system to funding of the loan.

The loan originator utilizes user interface screens generated by the software of the present invention to enter mortgage related data from the borrower to computer system 10. The customized user interface screens are displayed on monitor 18 and the loan originator utilizes the mouse and keyboard input devices 14 to enter the data. Examples of the user interface screens of the present invention for builders and CPA's are depicted in FIGS. 4 and 5.

In the case of real estate agents, builders and owner-sellers acting as loan originators, the system is customized with the purchase contract and other forms that the loan originator requires. Data for these forms is typically duplicated in one or more places in a typical loan application and the software system will automatically send this data to the appropriate forms and systems. Also, for these referral sources that are most likely to have purchase-borrowers (as opposed to refinances), the system is pre-configured for each loan application to assume a purchase.

Figure 3B:
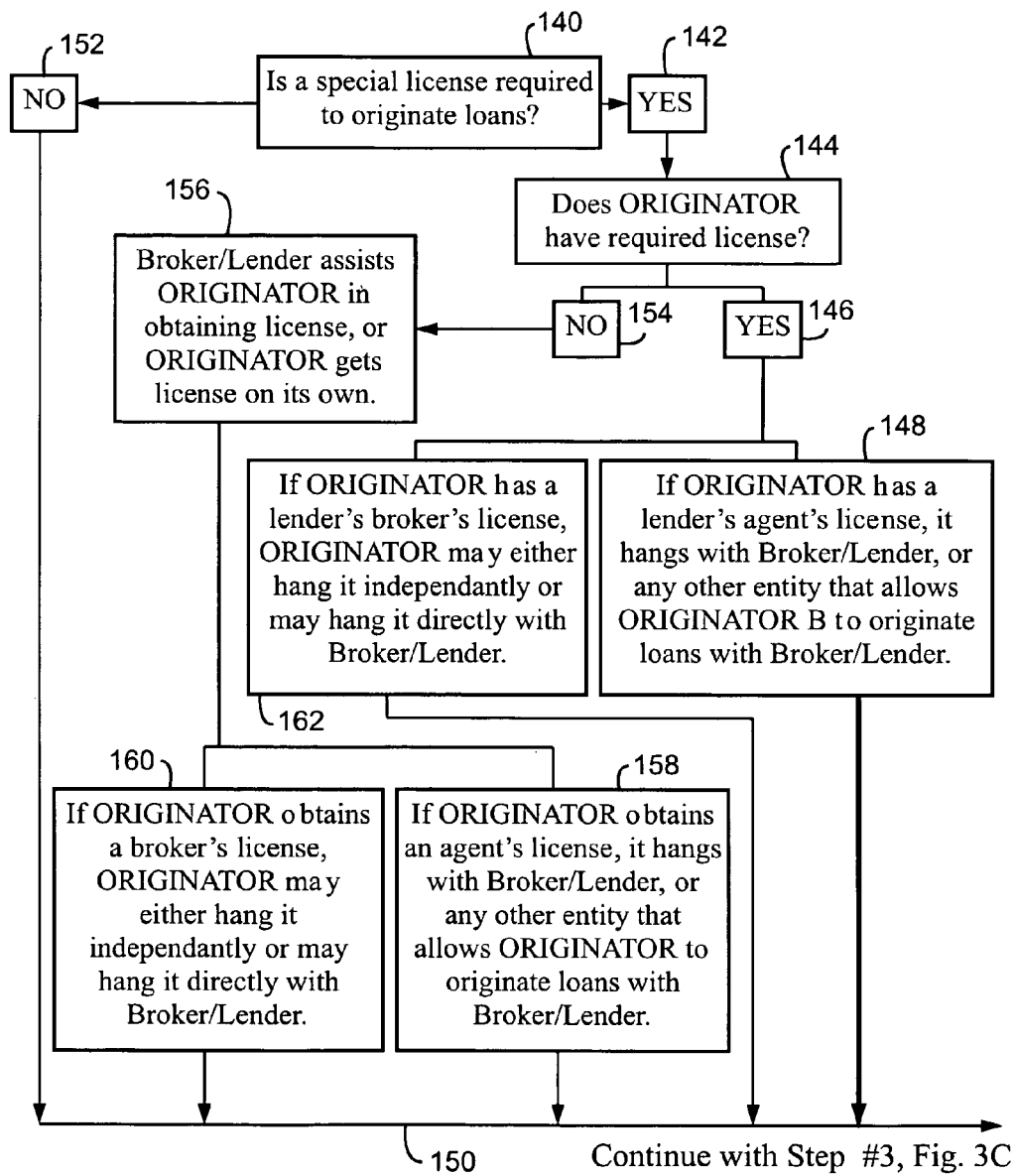
FIGS. 3A-3AE are flow charts describing the detailed methodology of the present invention.
Figure 3C:
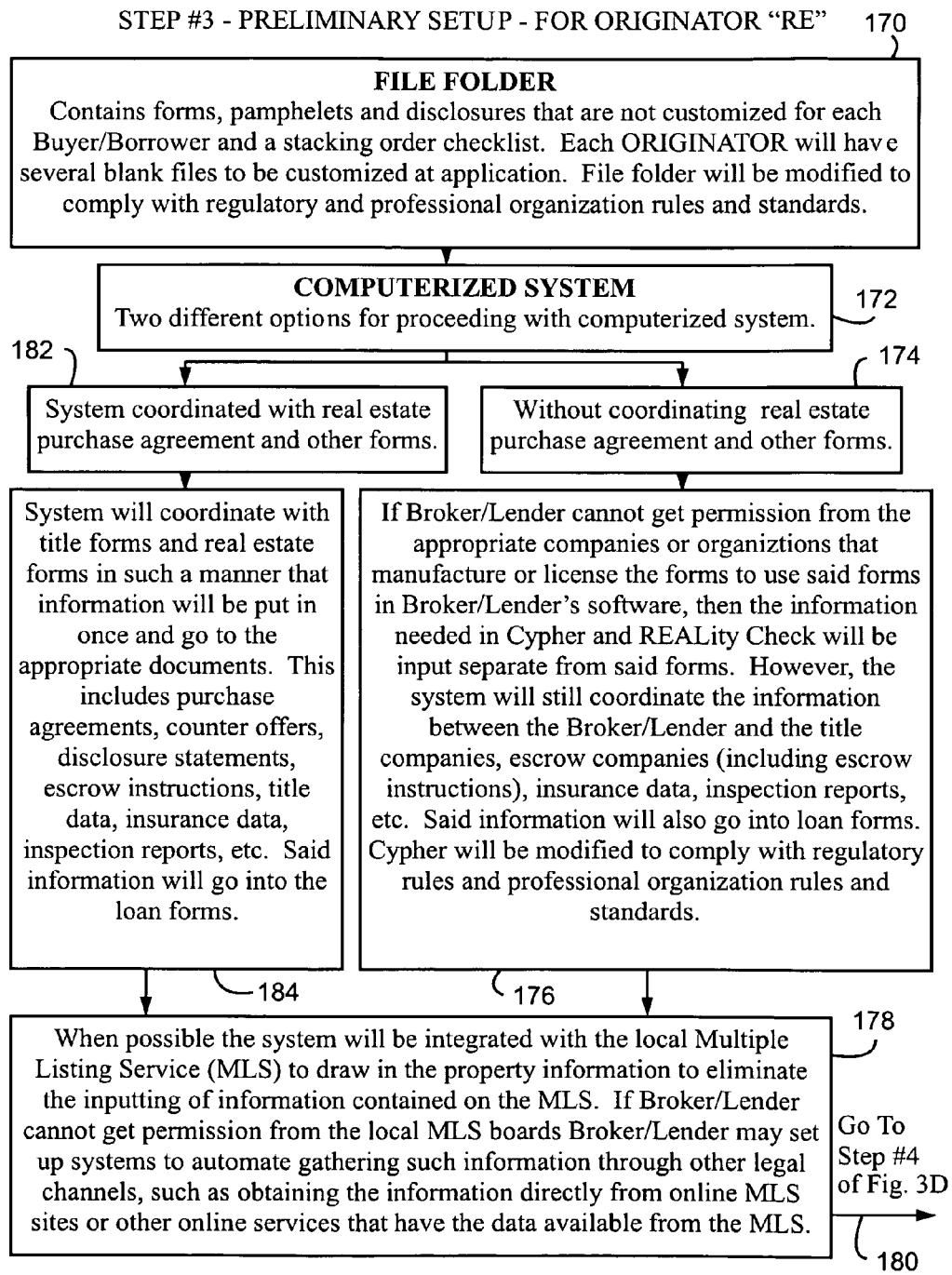
Figure 3D:
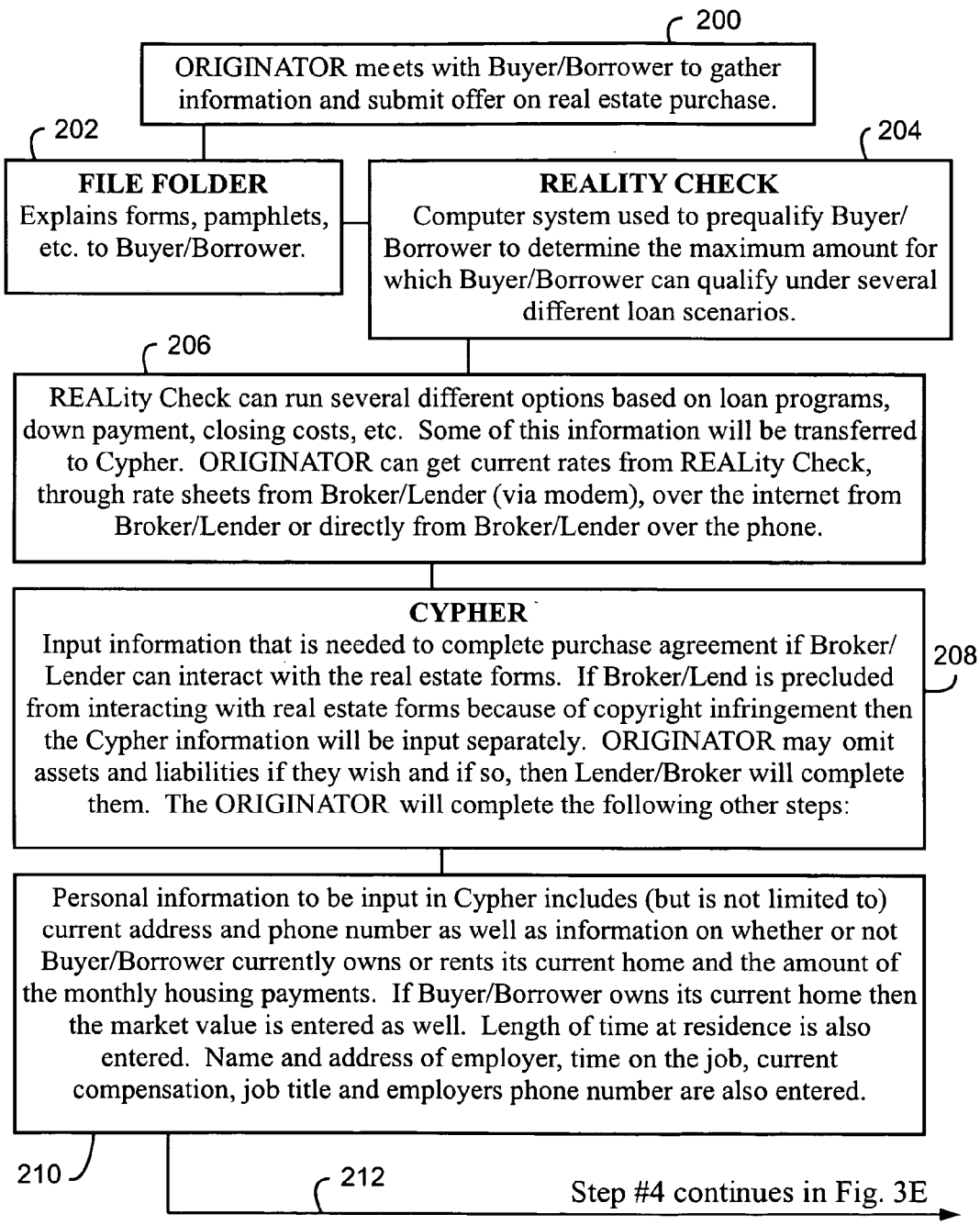
Figure 3E:
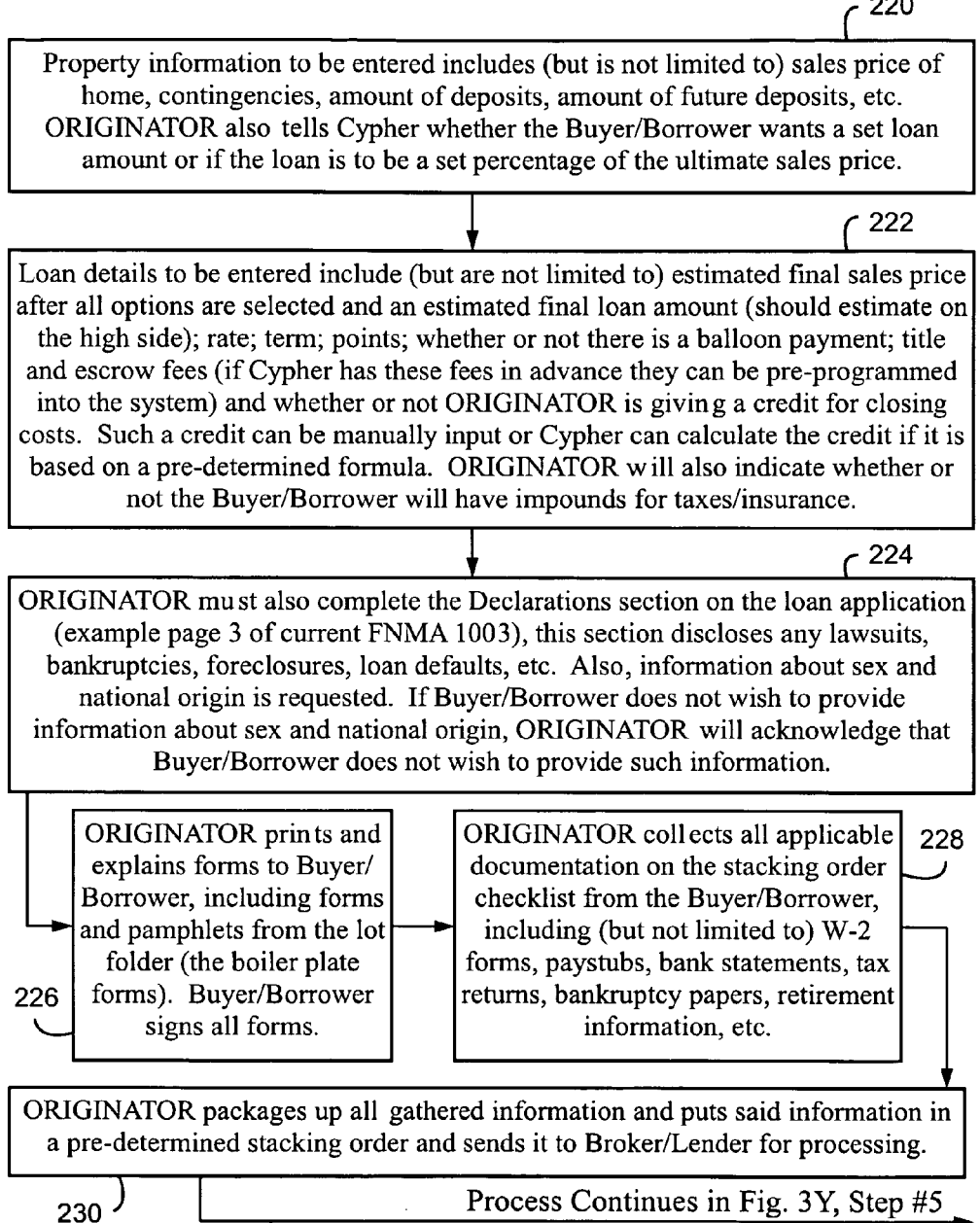
Figure 3F:
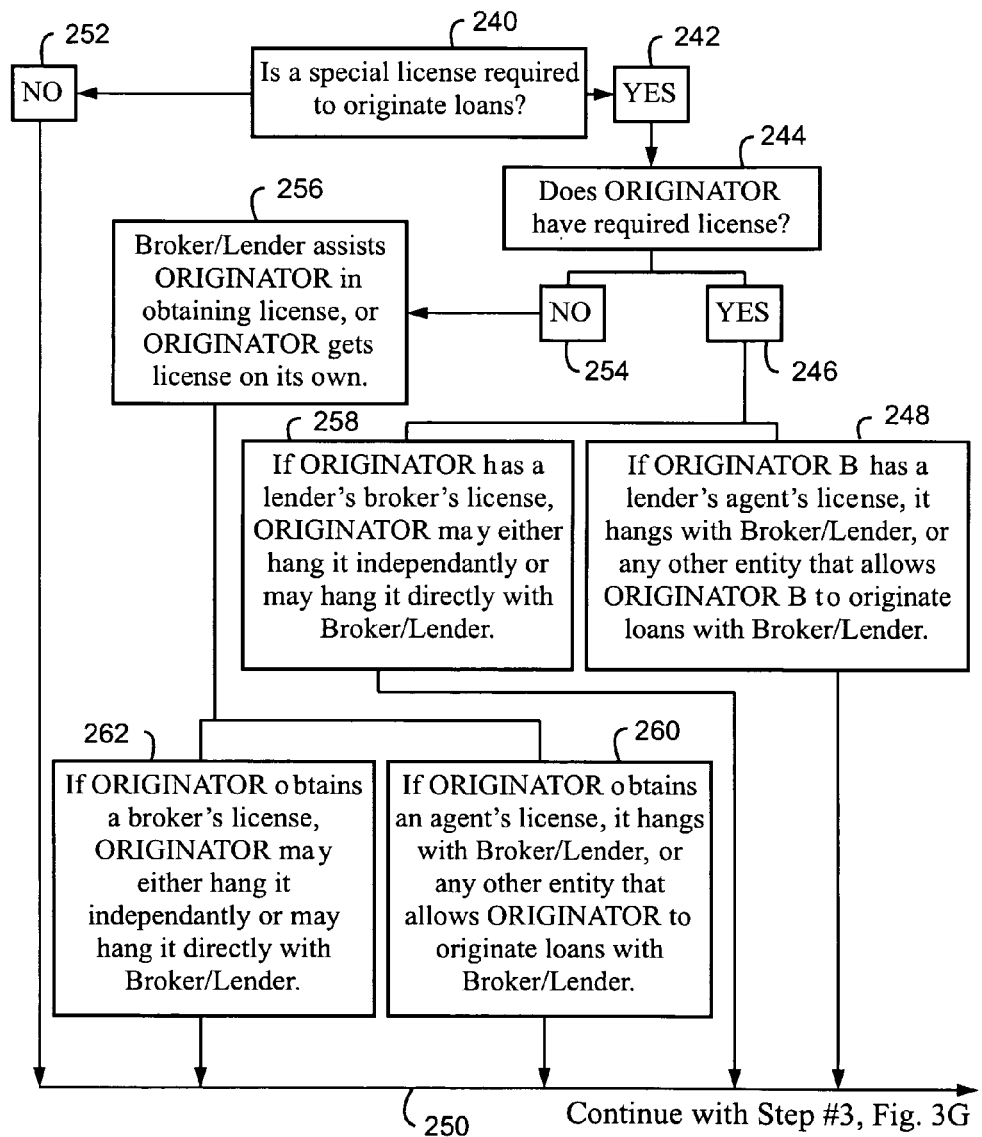
Figure 3G:
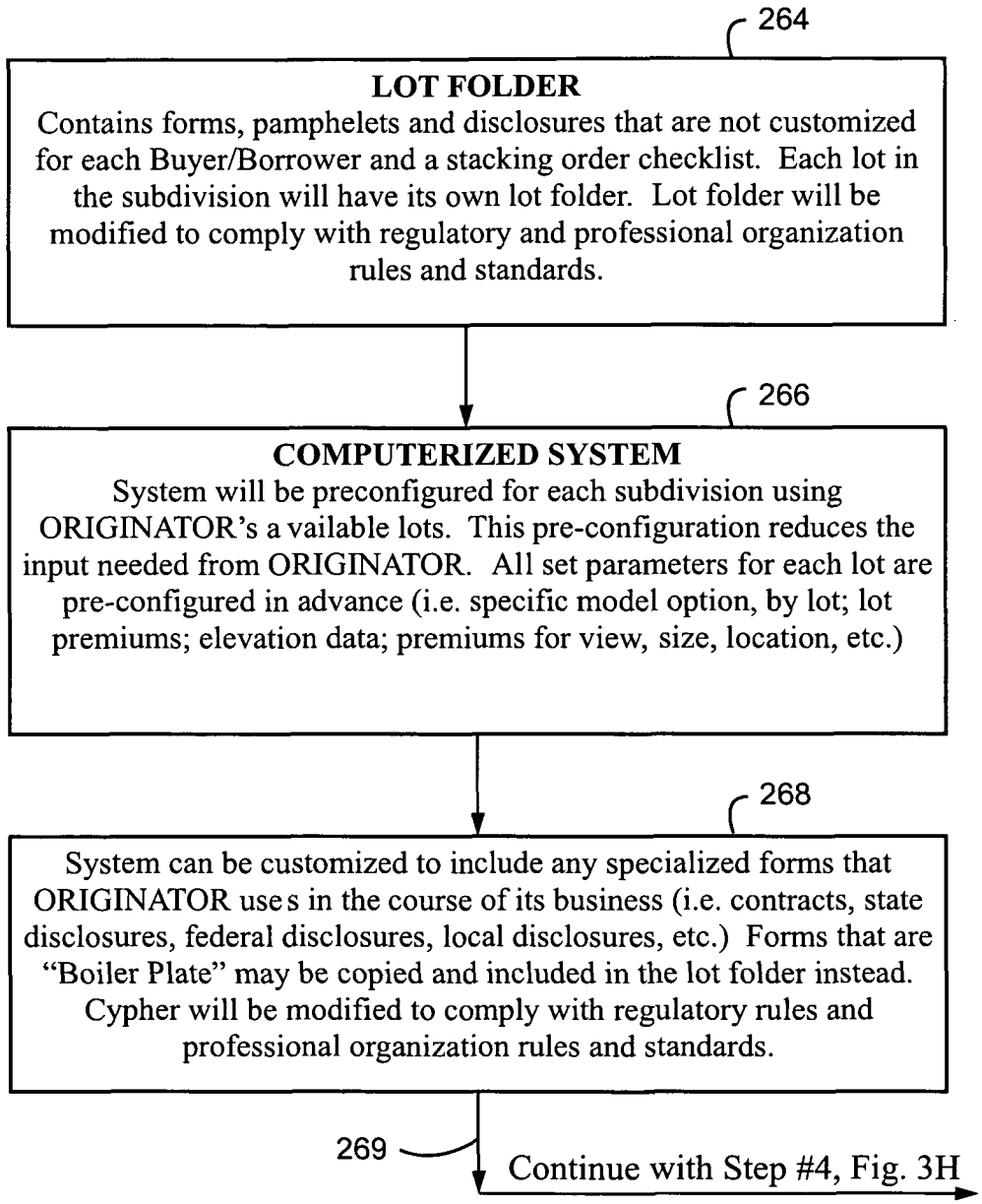
Figure 3H:
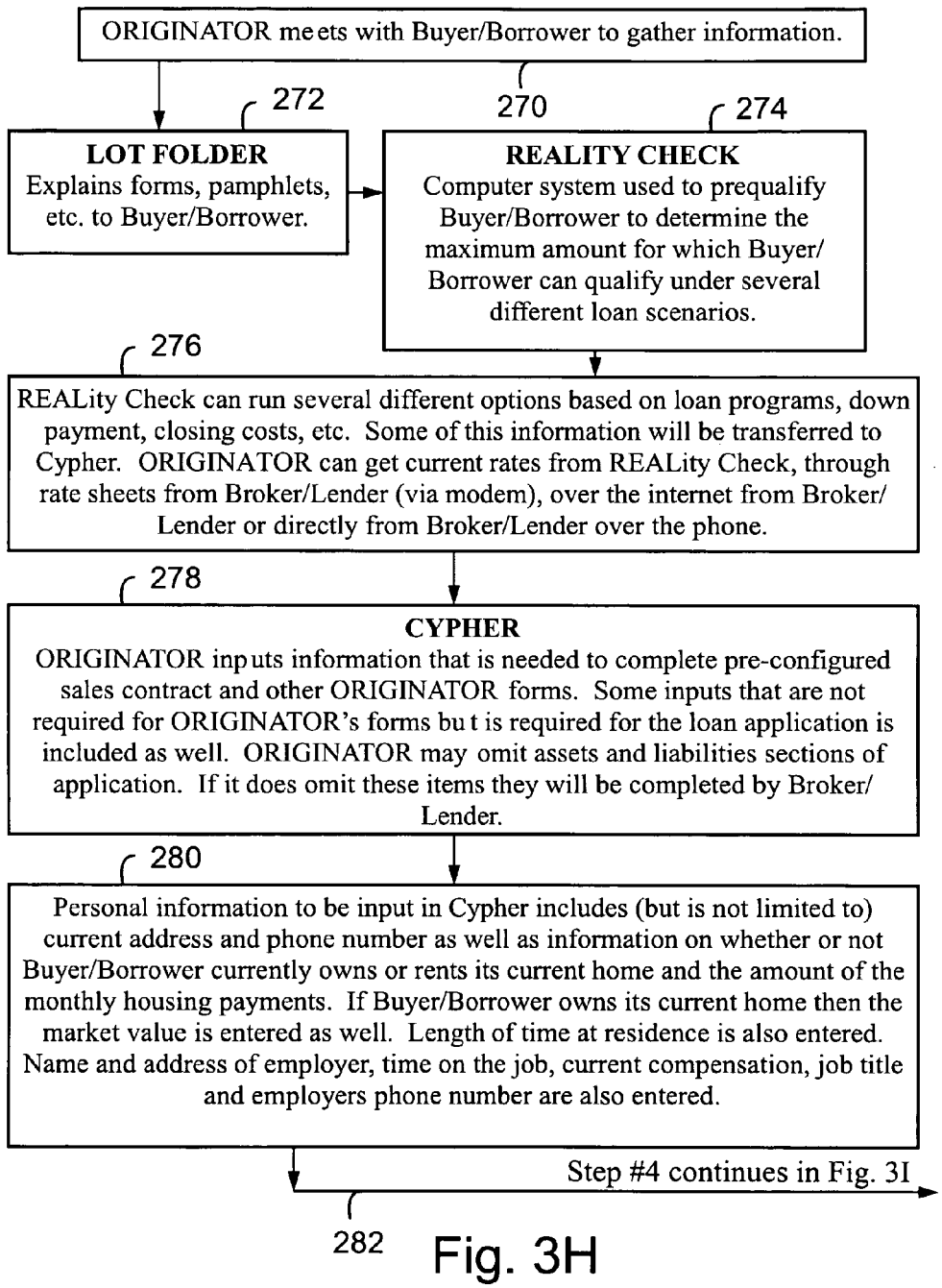
Figure 3J:
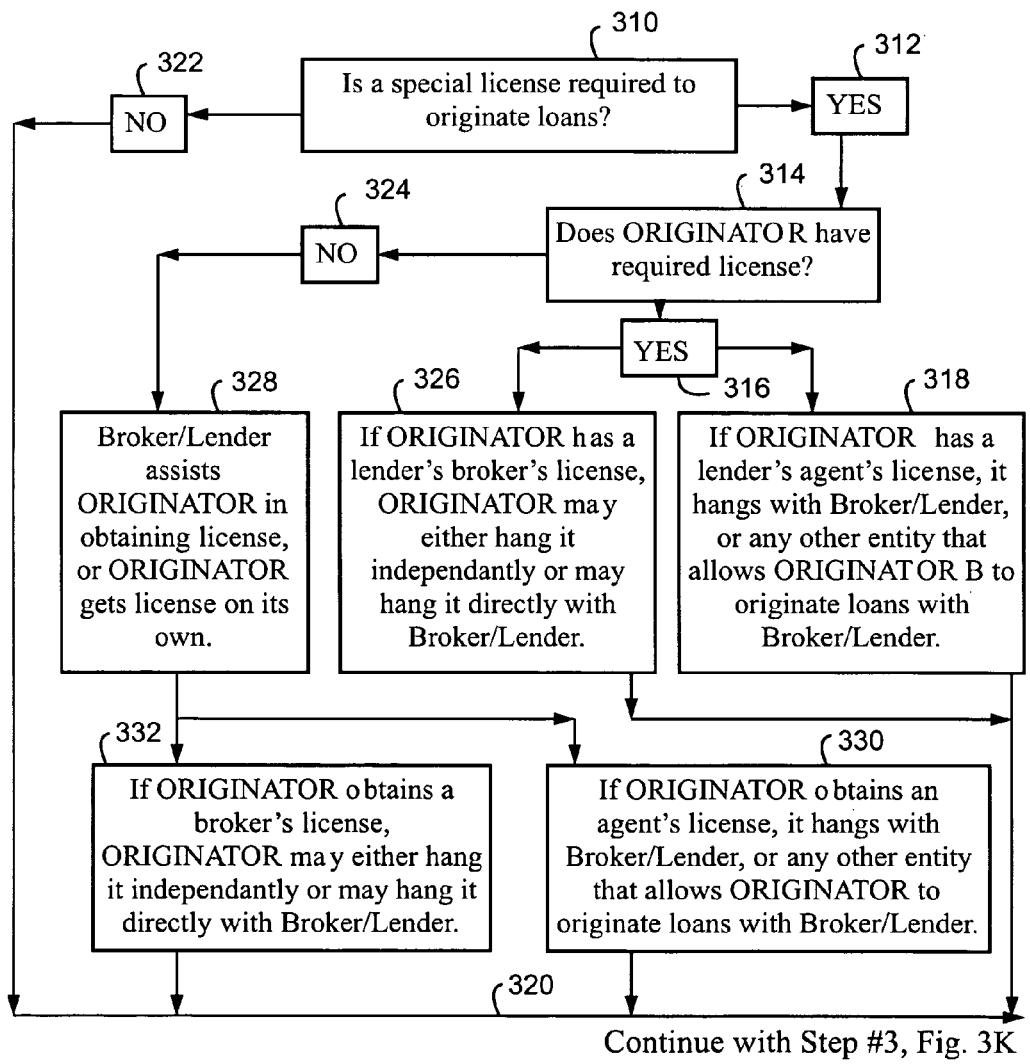
Figure 3K:
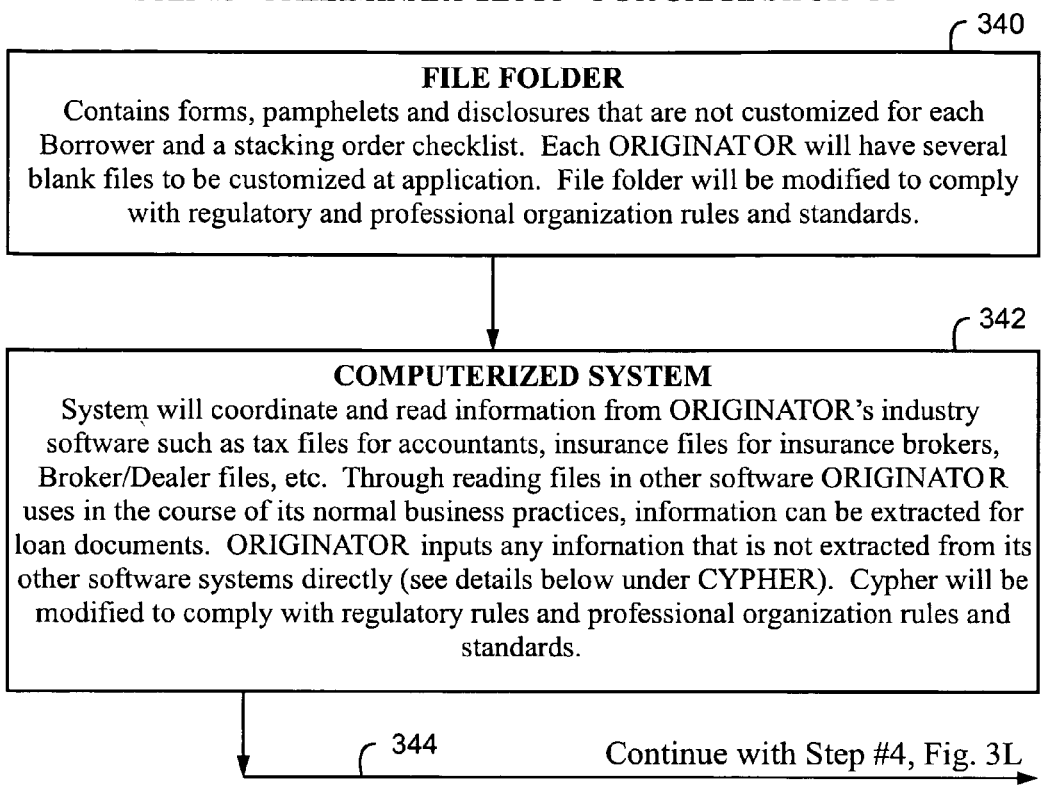
Figure 3L:
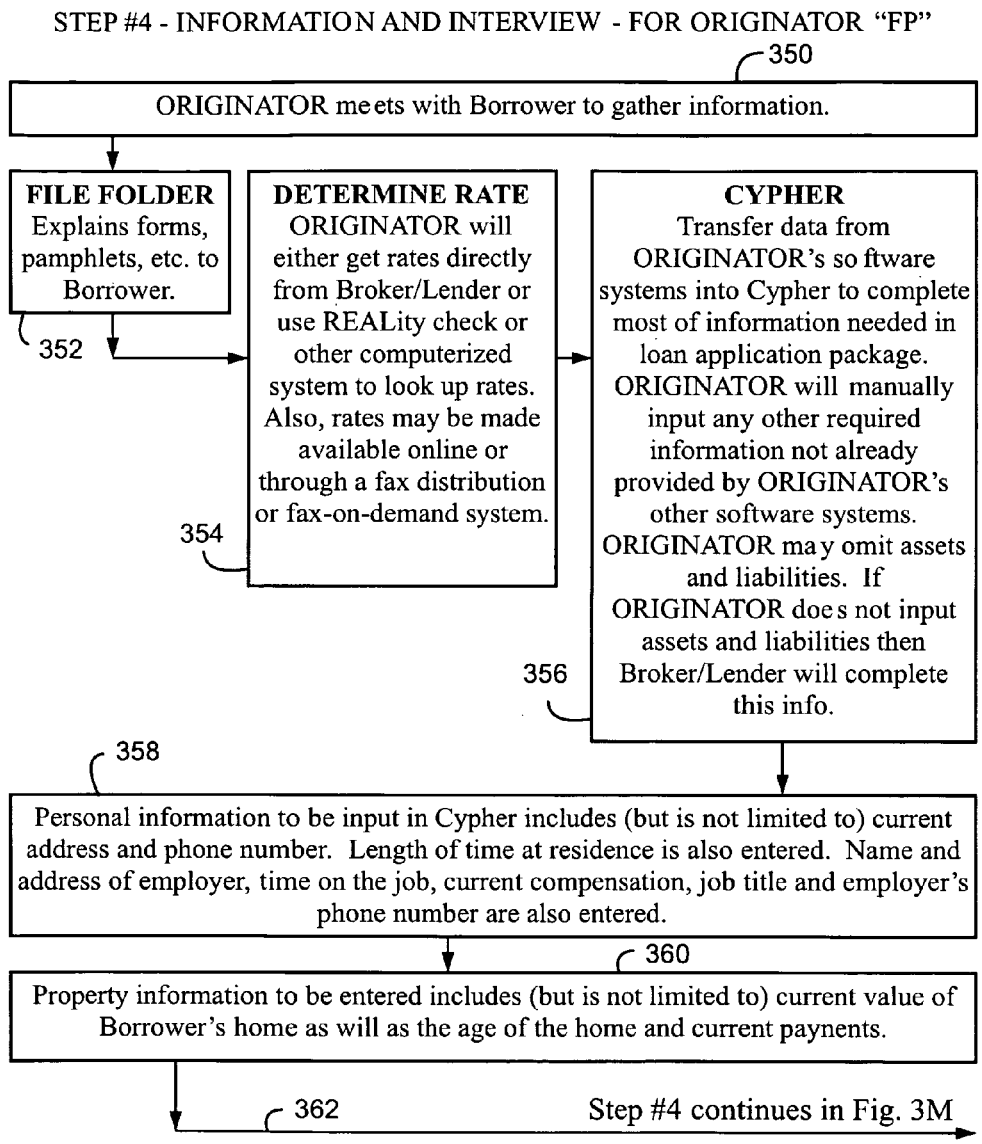
Figure 3N:
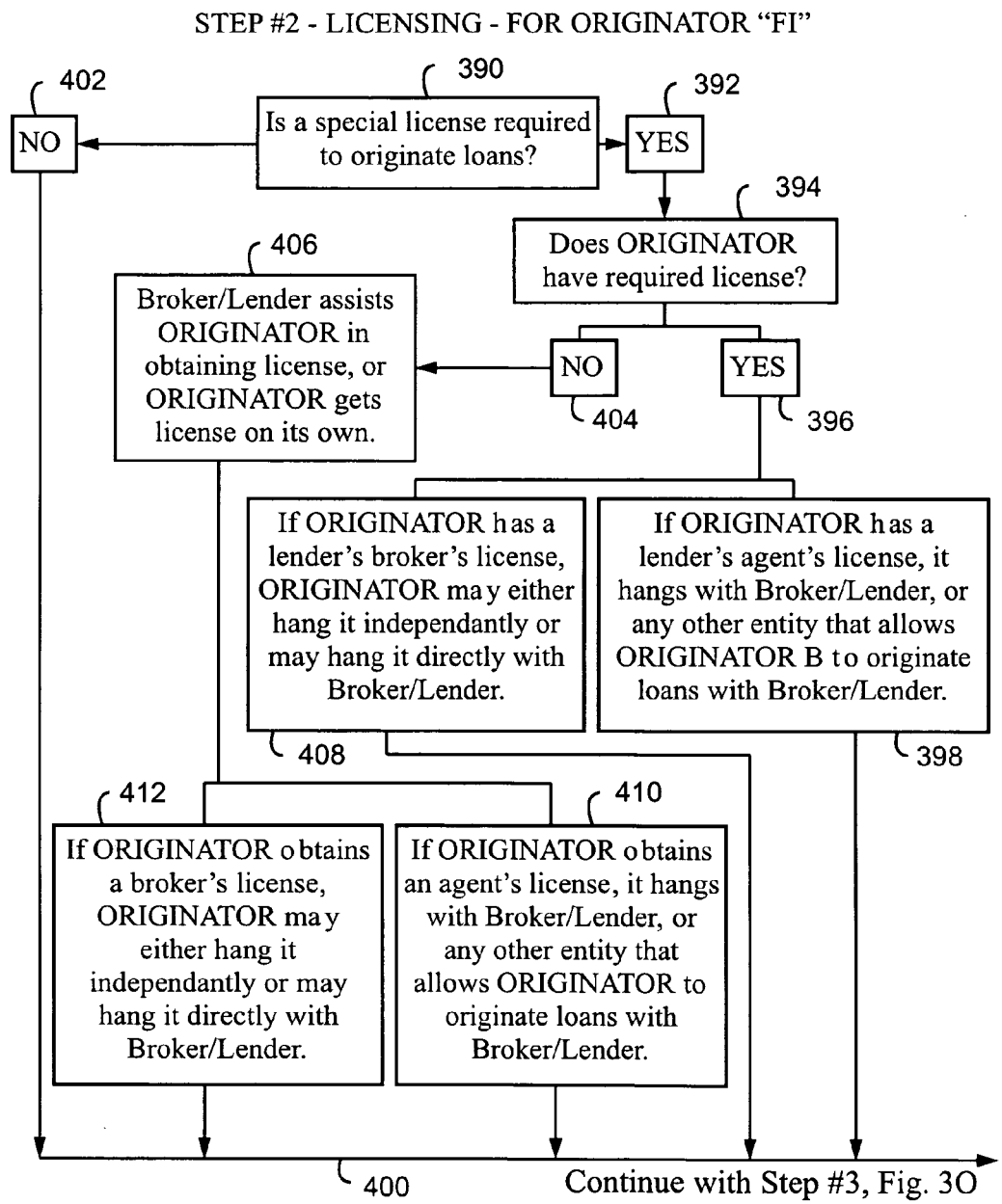
Figure 3O:
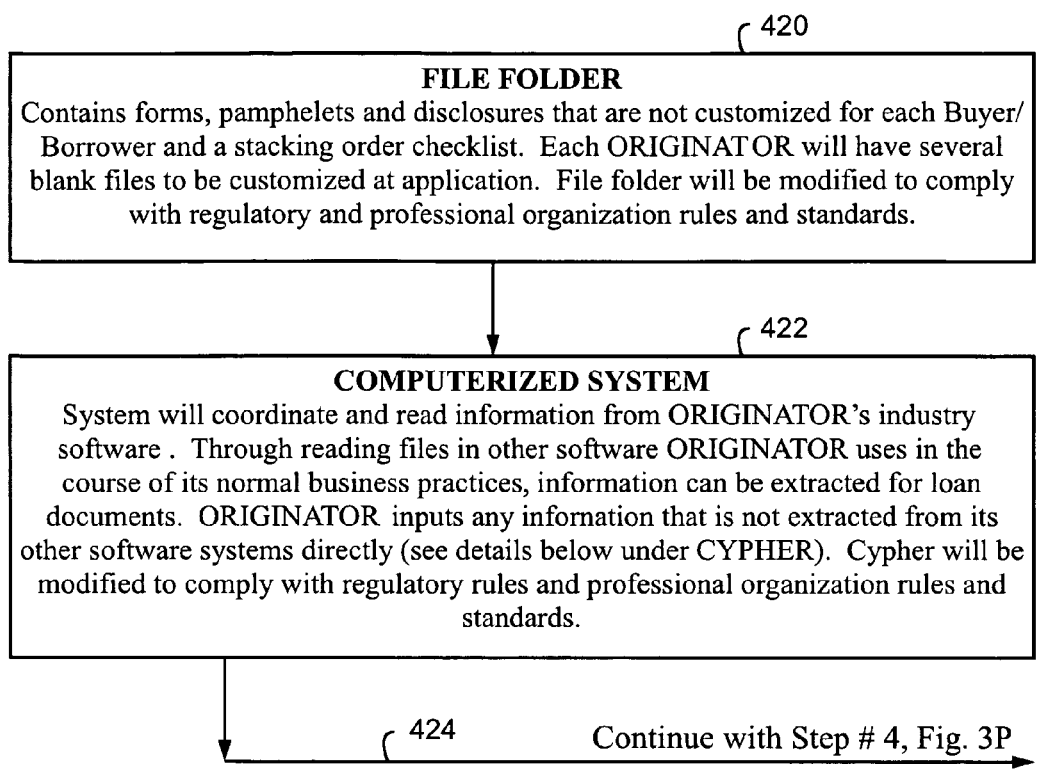
Figure 3P:
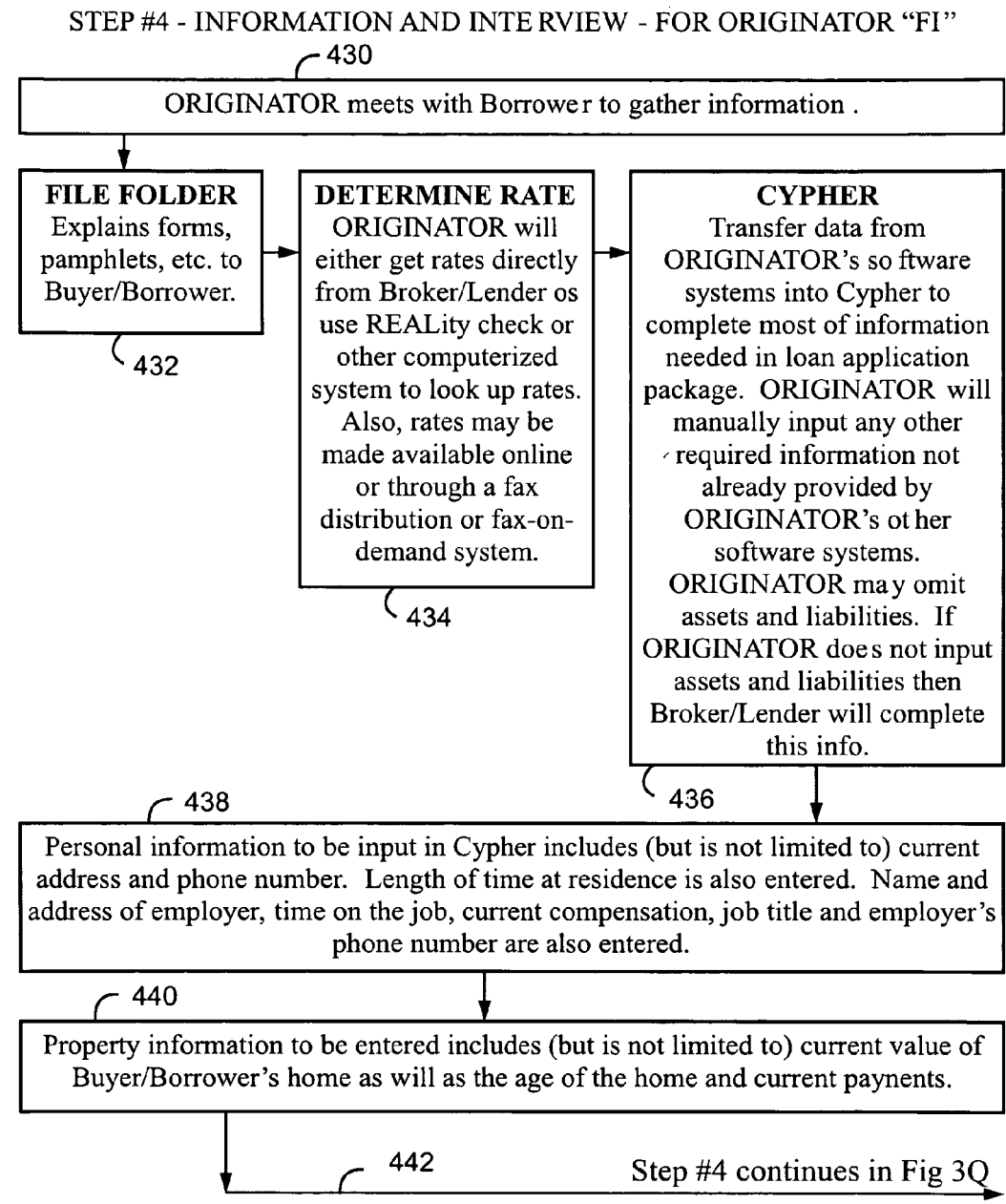
Figure 3R:
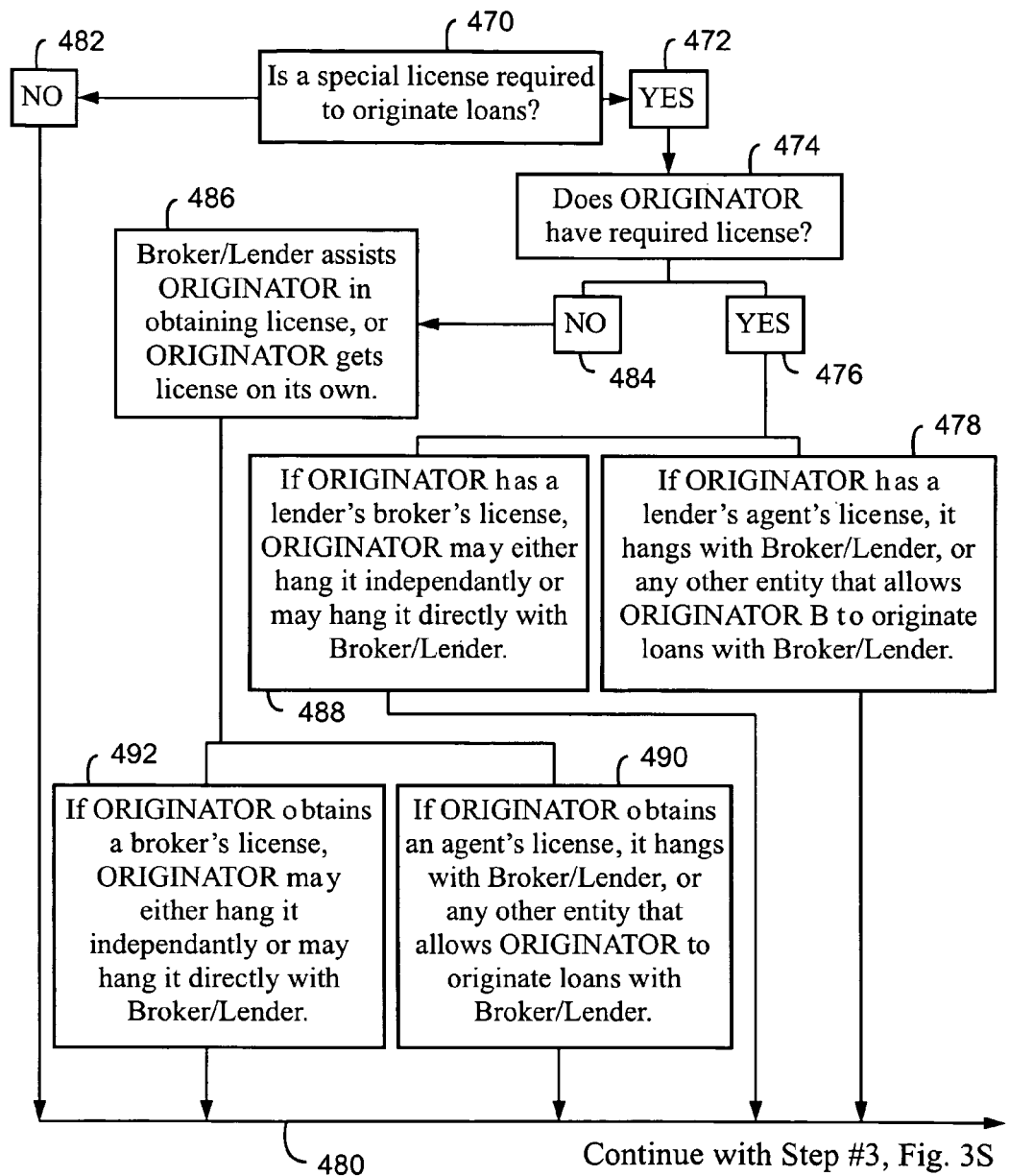
Figure 3T:
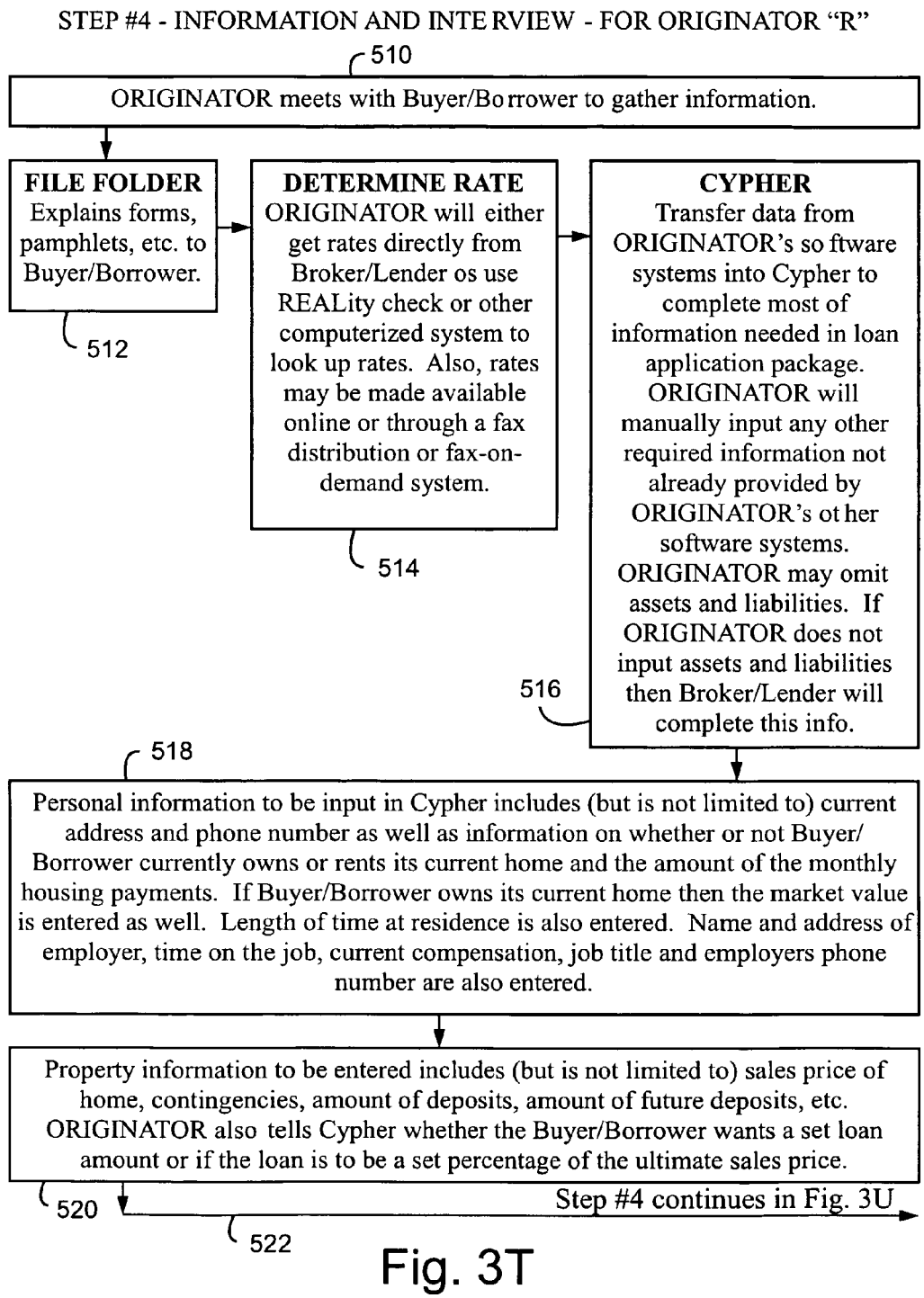
Figure 3V:
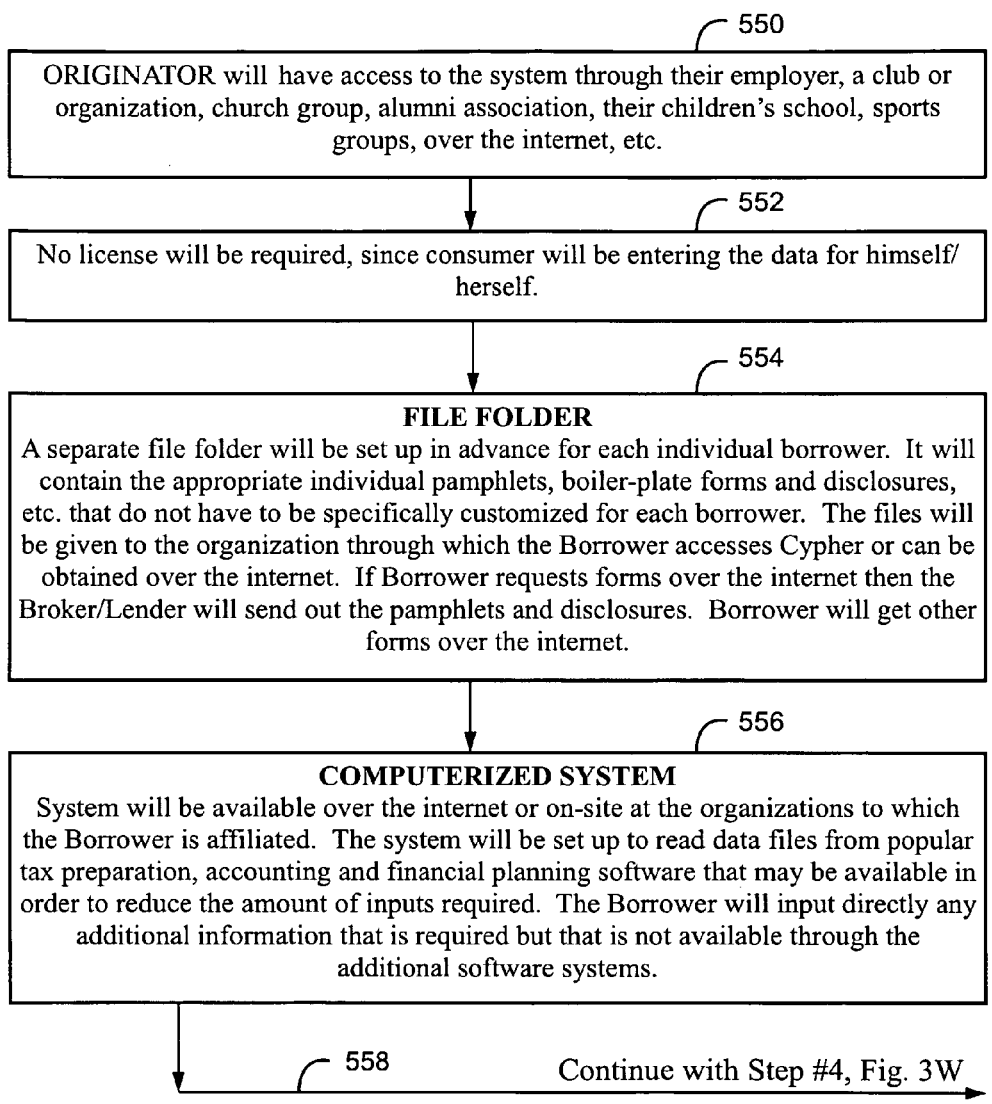
Figure 3W:
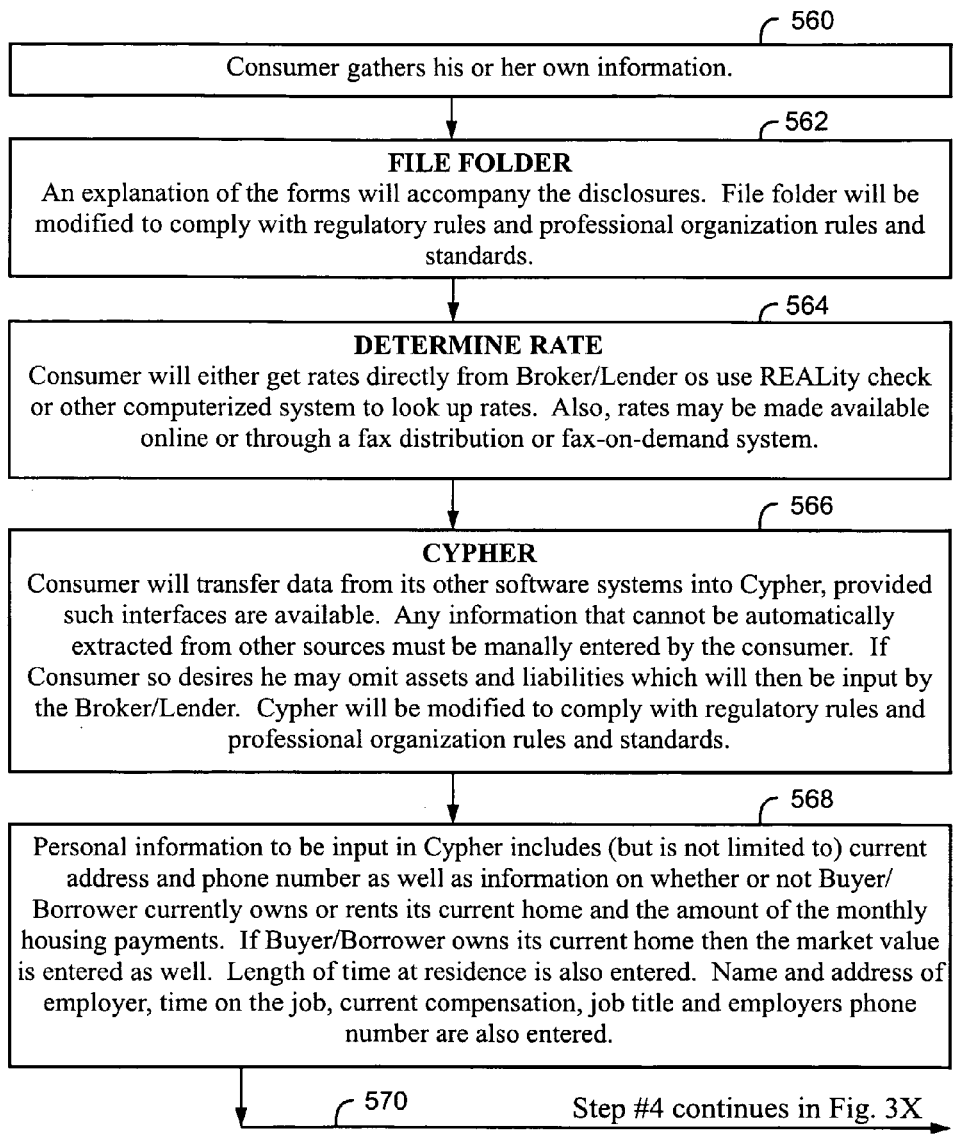
Figure 3Y:
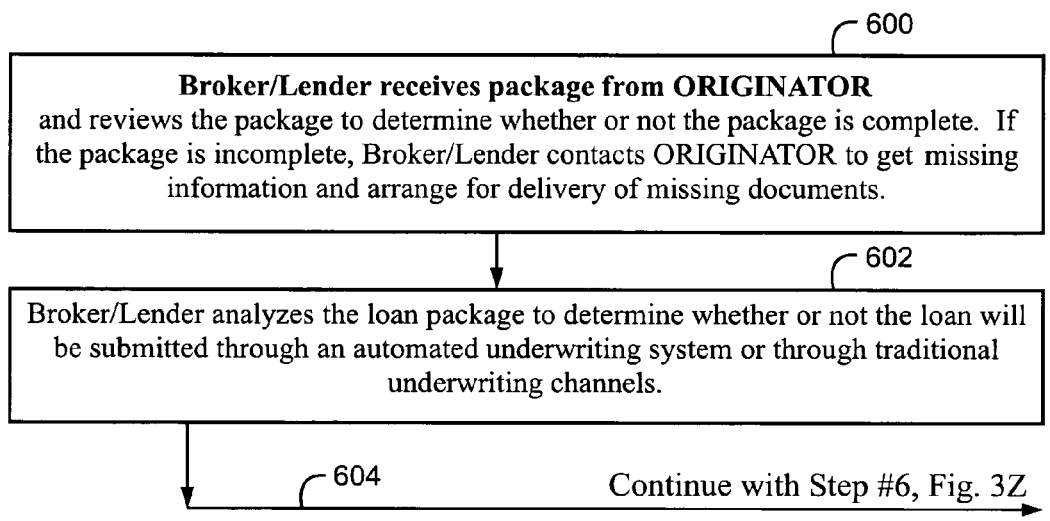
Figure 3Z:
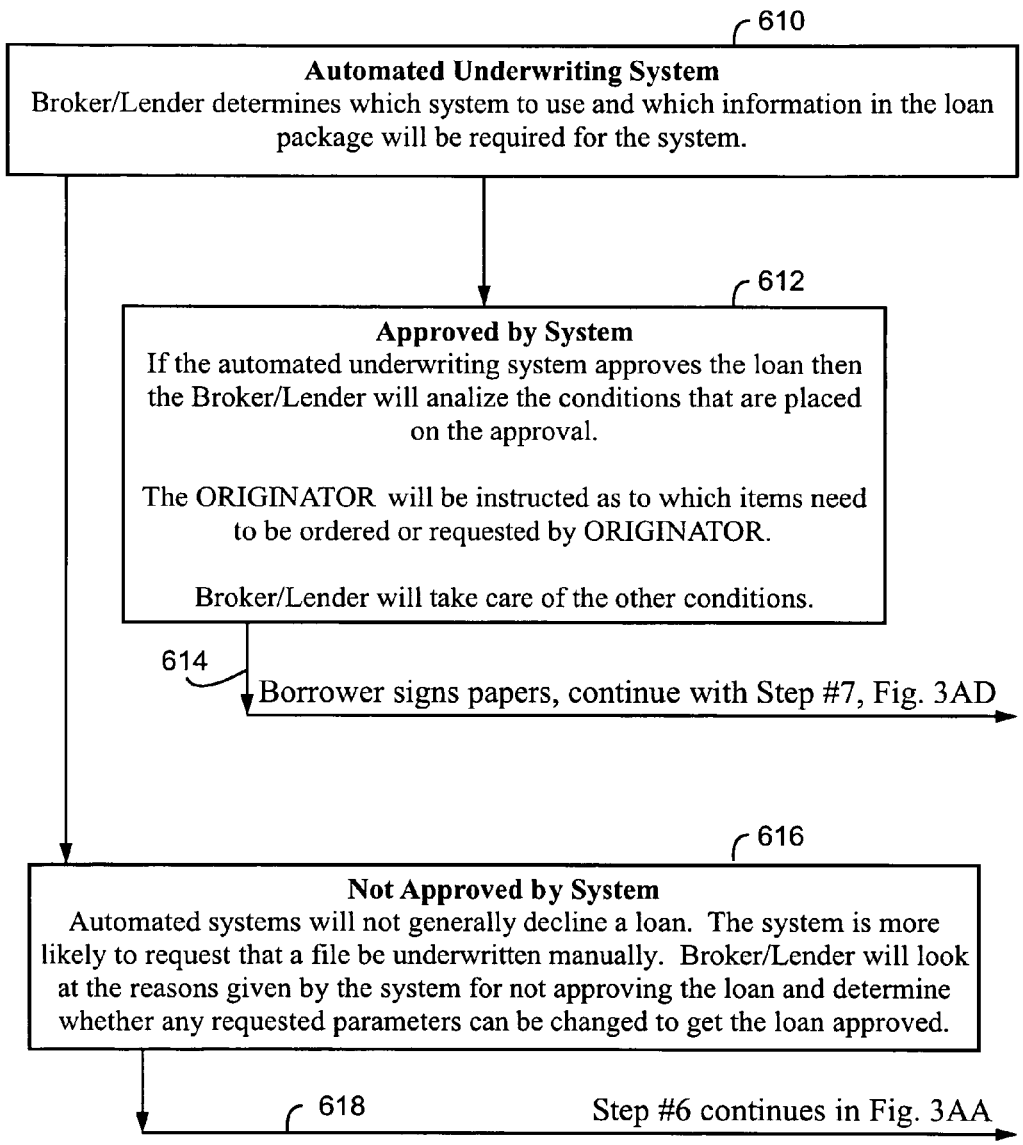
Figure 3A:
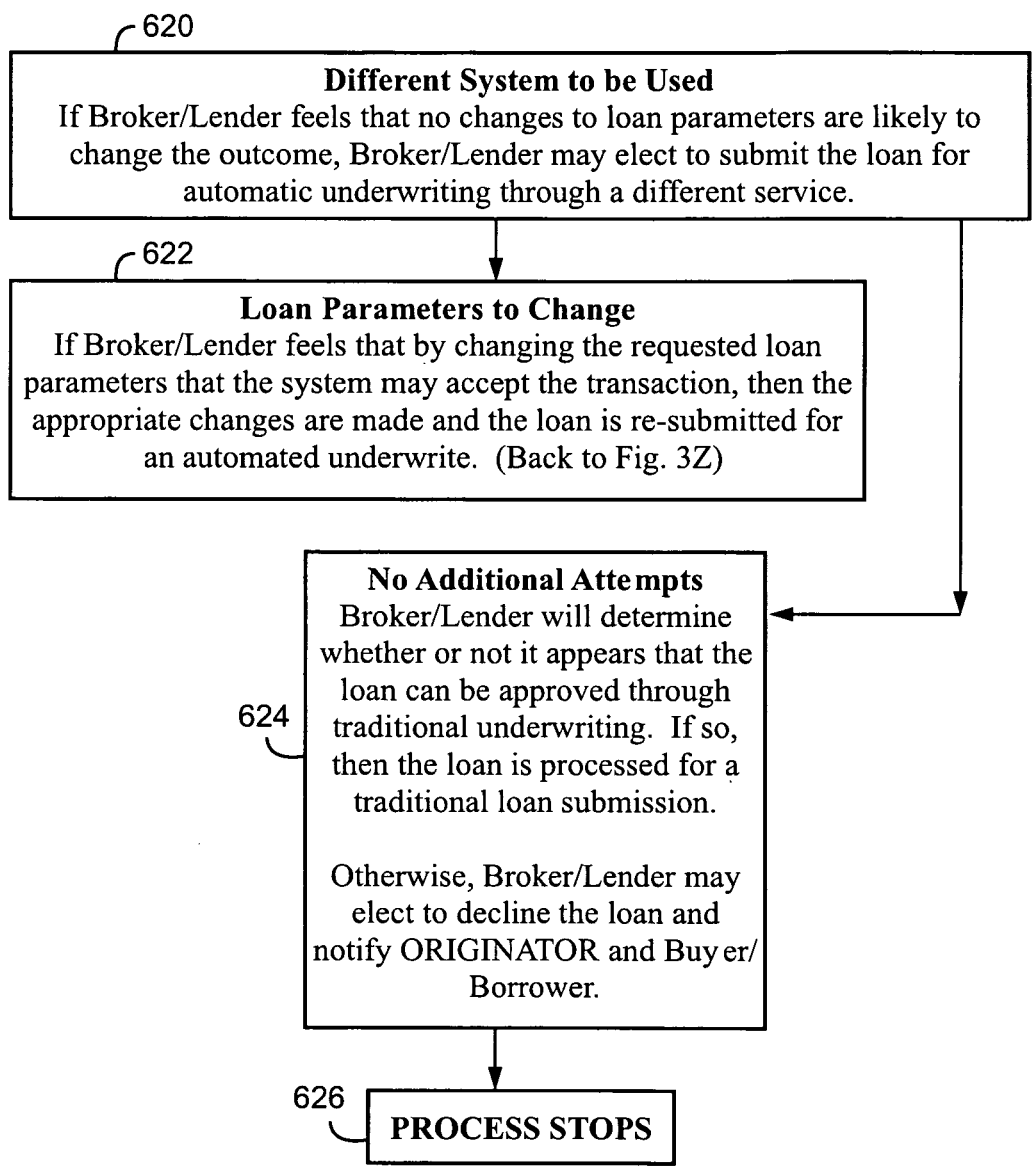
Figure 3A:
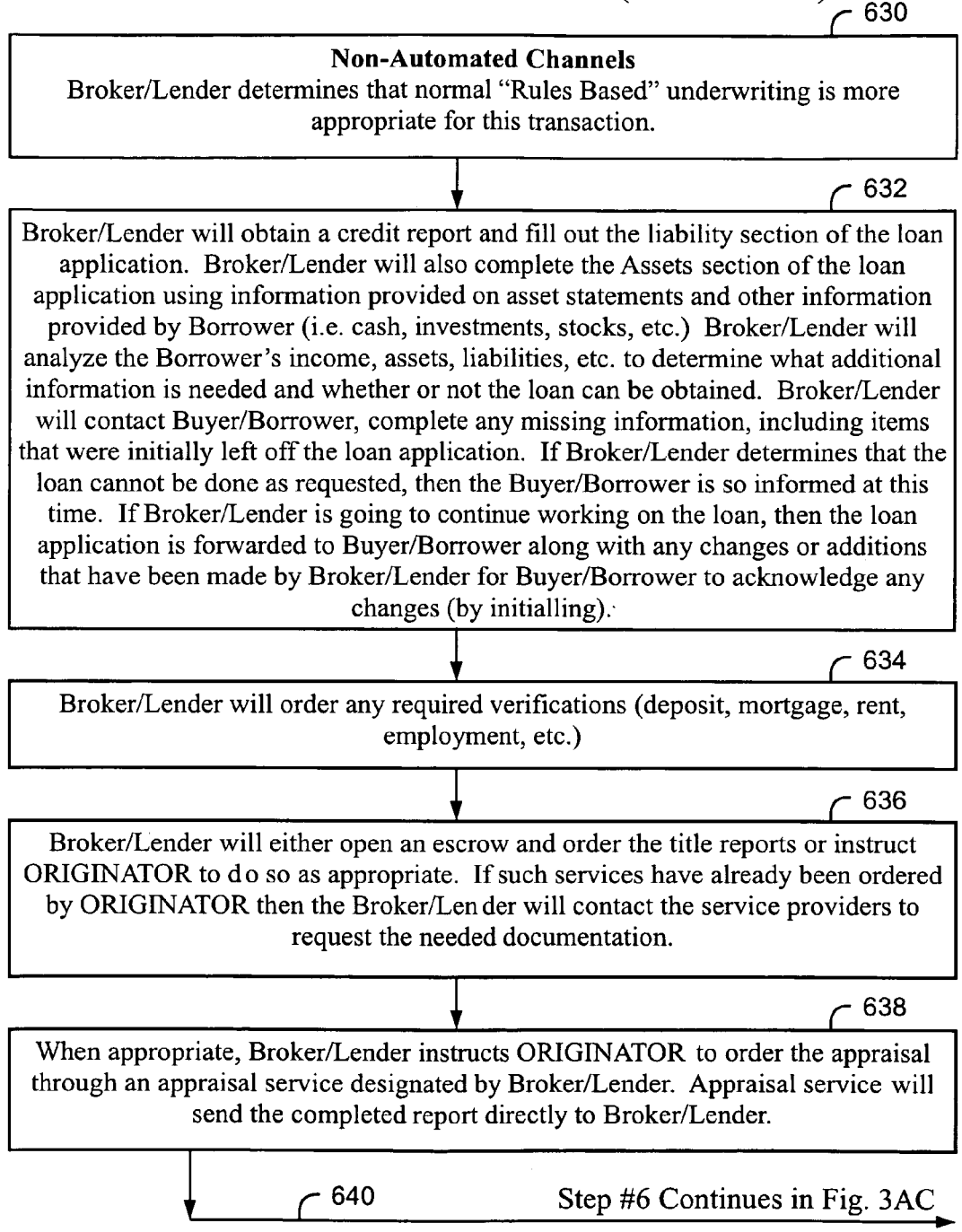
Figure 3A:
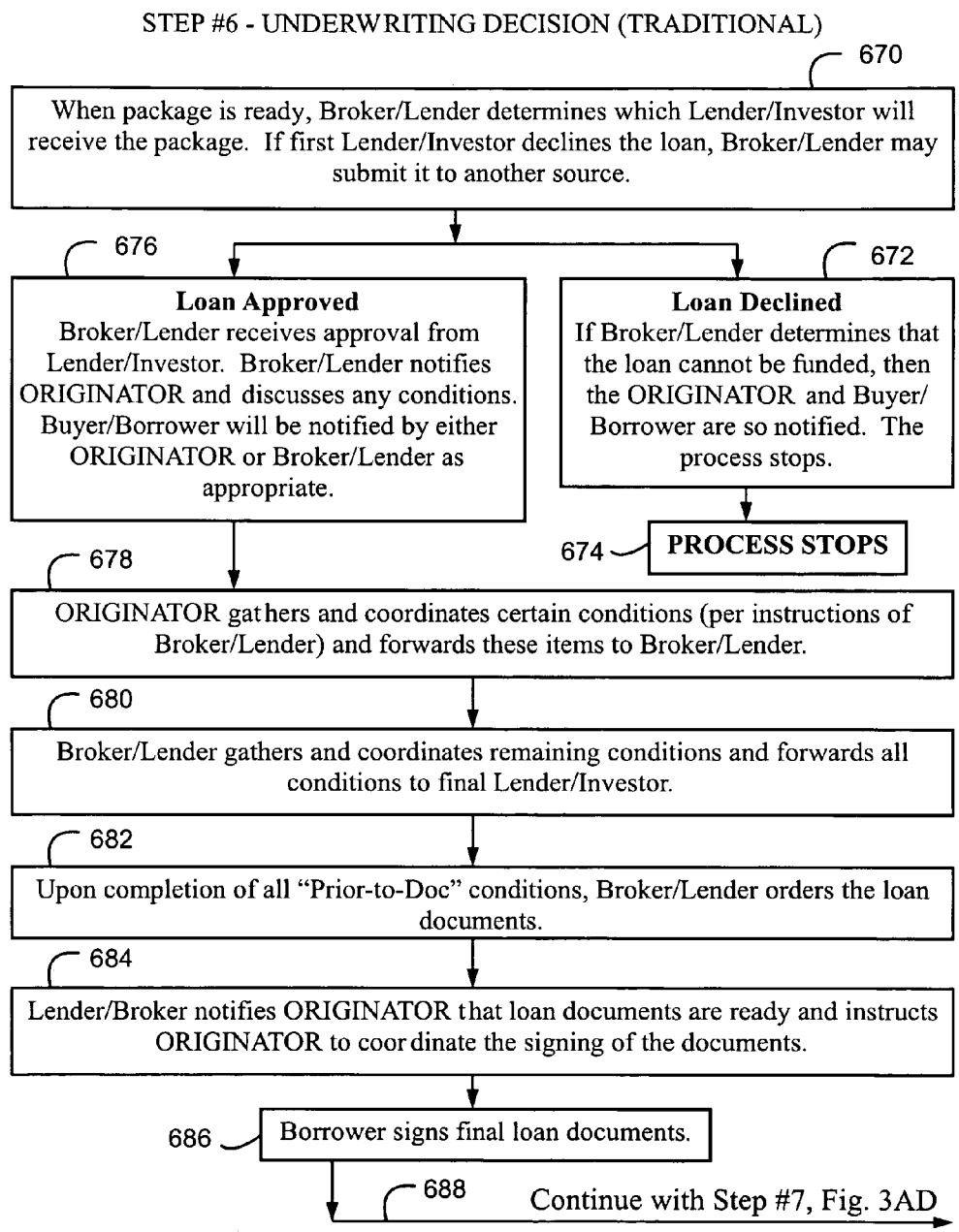
Figure 3A:
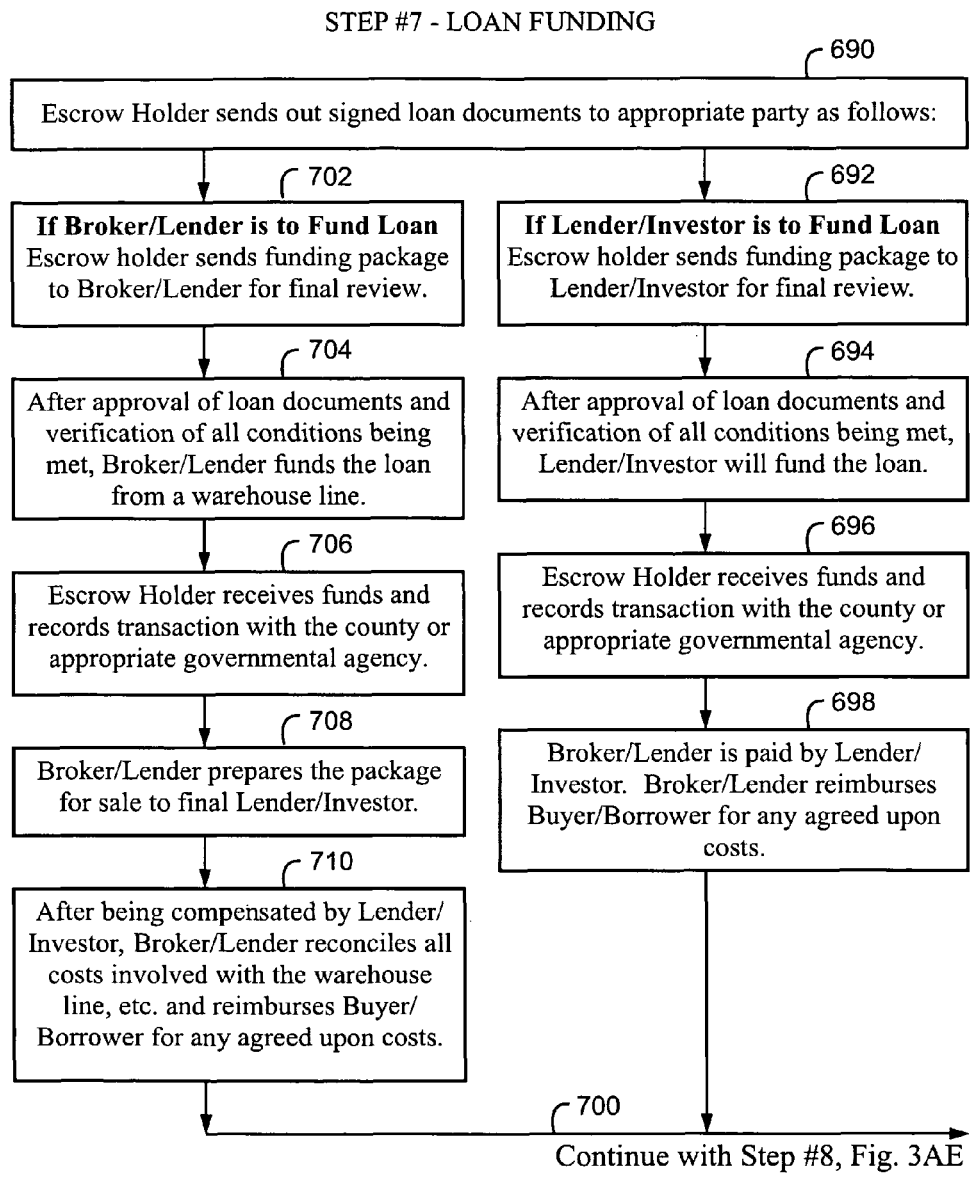
Figure 3A:
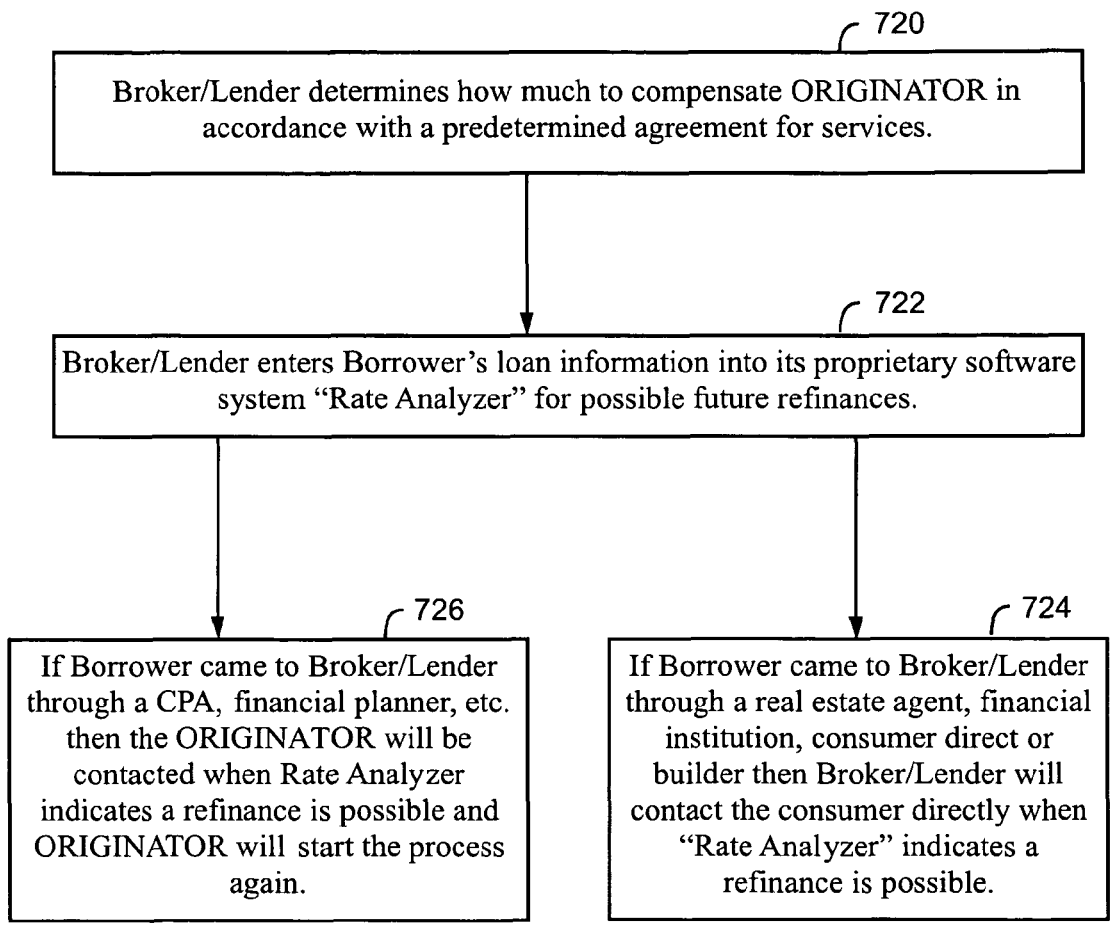

FIG. 3A includes the following.

Box 100 shows ORIGINATION SYSTEMS AND PROCEDURES. The Broker/Lender must begin by selecting the appropriate type of Originator from the list below:

Box 102 shows the originator "RE" (Real Estate Brokers/Agents). Arrow 122 directs the system and procedure to go to FIG. 3B.

Box 104 shows the originator "B" (Home Builders, FSBOs, etc.). Arrow 124 directs the system and procedure to go to FIG. 3F.

Box 106 shows the originator "FP", which includes CPAs, Financial Planners, Broker/Dealers, Stock Brokers, Insurance Brokers/Agents, Attorneys or other financial professionals. Collectively the originator is a financial professional. Arrow 126 directs the system and procedure to go to FIG. 3J.

Box 108 shows the originator "FI" (Financial Institutions such as Banks, Savings and Loans, Thrifts, Credit Unions, etc.). Arrow 128 directs the system and procedure to go to FIG. 3N.

Box 110 shows the originator "R" (Relocation Company). Arrow 130 directs the system and procedure to go to FIG. 3R.

Box 112 shows the originator "C" (Consumer is Originator). Arrow 132 directs the system and procedure to go to FIG. 3V.

FIG. 3B includes the following for STEP #2—LICENSING—FOR the originator "RE".

Box 140 asks "Is a special license required to originate loans?" Box 142 shows YES to the question of Box 140.

Box 144 asks "Does the originator have required license?" Box 146 shows YES to the question of Box 144.

Box 148 shows the following. If the originator has a lender's/agent's license, it hangs with the Broker/Lender, or any other entity that allows the originator B to originate loans with the Broker/Lender.

Arrow 150 directs the system and procedure to go to Step #3, FIG. 3C.

Box 152 shows NO to the question of Box 140. Box 154 shows No to the question of Box 144.

Box 156 shows the Broker/Lender assists the originator in obtaining license, or the originator gets license on his/her own.

Box 158 shows the following. If the originator obtains an agent's license, it hangs with the Broker/Lender, or any other entity that allows the originator to originate loans with the Broker/Lender.

Box 160 shows the following. If the originator obtains a broker's license, the originator may either hang it independently or may hang it directly with the Broker/Lender.

Box 162 shows the following. If the originator has a lender's/broker's license, the originator may either hang it independently or may hang it directly with the Broker/Lender.

FIG. 3C includes the following for STEP #2—LICENSING—FOR the originator "RE".

Box 170 shows the file folder, which contains forms, pamphlets and disclosures that are not customized for each Buyer/Borrower and a stacking order checklist. Each the originator will have several blank files to be customized at application. File folder will be modified to comply with regulatory and professional organization rules and standards.

Box 172 shows COMPUTERIZED SYSTEM (Two different options for proceeding with computerized system).

Box 174 shows without coordinating real estate purchase agreement and other forms.

Box 176 shows the following. If the Broker/Lender cannot get permission from the appropriate companies or organizations that manufacture or license the forms to use said forms in the Broker/Lender's software, then the information needed in Cypher and REALity Check will be input separate from said forms. However, the system will still coordinate the information between the Broker/Lender and the title companies, escrow companies (including escrow instructions), insurance data, inspection reports, etc. Said information will also go into loan forms. Cypher will be modified to comply with regulatory rules and professional organization rules and standards.

Box 178 shows the following. When possible the system will be integrated with the local Multiple Listing Service (MLS) to draw in the property information to eliminate the inputting of information contained on the MLS. If the Broker/Lender cannot get permission from the local MLS boards the Broker/Lender may set up systems to automate gathering such information through other legal channels, such as obtaining the information directly from online MLS sites or other online services that have the data available from the MLS.

Arrow 180 directs the system and procedure to go to step #4 on FIG. 3D.

Box 182 shows System coordinated with real estate purchase agreement and other forms.

Box 184 shows System will coordinate with title forms and real estate forms in such a manner that information will be put in once and go to the appropriate documents. This includes purchase agreements, counter offers, disclosure statements, escrow instructions, title data, insurance data, inspection reports, etc. Said information will go into the loan forms.

FIG. 3D includes the following for STEP #4—INFORMATION AND INTERVIEW—FOR the originator "RE".

Box 200 shows the originator meets with the Buyer/Borrower to gather information and submit offer on real estate purchase.

Box 202 shows the file folder, which explains forms, pamphlets, etc. to Buyer/the Borrower.

Box 204 shows REALITY CHECK Computer system used to prequalify the Buyer/Borrower to determine the maximum amount for which the Buyer/Borrower can qualify under several different loan scenarios.

Box 206 shows REALity Check can run several different options based on loan programs, down payment, closing costs, etc. Some of this information will be transferred to Cypher. The originator can get current rates from REALity Check, through rate sheets from the Broker/Lender (via modem), over the internet from the Broker/Lender or directly from the Broker/Lender over the phone.

Box 208 shows CYPHER Input information that is needed to complete purchase agreement if Broker/Lender can interact with the real estate forms. If Broker/Lender is precluded from interacting with real estate forms because of copyright infringement then the Cypher information will be input separately. The originator may omit assets and liabilities if they wish and if so, then Lender/Broker will complete them. The originator will complete the following other steps:

Box 210 shows Personal information to be input in Cypher includes (but is not limited to) current address and phone number as well as information on whether or not the Buyer/Borrower currently owns or rents his/her current home and the amount of the monthly housing payments. If the Buyer/Borrower owns his/her current home then the market value is entered as well. Length of time at residence is also entered. Name and address of employer, time on the job, current compensation, job title and employers phone number are also entered.

Arrow 212 directs the system and procedure to go to continue step #4 on FIG. 3E.

FIG. 3E includes the following for STEP #4 (CONT)—INFORMATION AND INTERVIEW FOR the originator "RE".

Box 220 shows Property information to be entered includes (but is not limited to) sales price of home, contingencies, amount of deposits, amount of future deposits, etc. The originator also tells Cypher whether the Buyer/Borrower wants a set loan amount or if the loan is to be a set percentage of the ultimate sales price.

Box 222 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not the originator is giving a credit for closing costs. Such a credit can be manually input or Cypher can calculate the credit if it is based on a pre-determined formula. The originator will also indicate whether or not the Buyer/Borrower will have impounds for taxes/insurance.

Box 224 shows the originator must also complete the Declarations section on the loan application (example page 3 of current FNMA 1003), this section discloses any lawsuits, bankruptcies, foreclosures, loan defaults, etc. Also, information about sex and national origin is requested. If the Buyer/Borrower does not wish to provide information about sex and national origin, the originator will acknowledge that the Buyer/Borrower does not wish to provide such information.

Box 226 shows the originator prints and explains forms to the Buyer/Borrower, including forms and pamphlets from the lot folder (the boiler plate forms). The Buyer/Borrower signs all forms.

Box 228 shows the originator collects all applicable documentation on the stacking order checklist from the Buyer/Borrower, including (but not limited to) W-2 forms, paystubs, bank statements, tax returns, bankruptcy papers, retirement information, etc.

Box 230 shows the originator packages up all gathered information and puts said information in a pre-determined stacking order and sends it to the Broker/Lender for processing.

Arrow 232 directs the system and procedure to go to FIG. 3Y with step #5.

FIG. 3F includes the following for STEP #2—LICENSING—FOR the originator "B".

Box 240 asks "Is a special license required to originate loans?" Box 242 shows YES for Box 240.

Box 244 asks "Does the originator have required license?" Box 246 shows YES for Box 244.

Box 248 shows the following. If the originator B has a lender's/agent's license, it hangs with the Broker/Lender, or any other entity that allows the originator B to originate loans with the Broker/Lender.

Arrow 250 directs the system and procedure to go to Step #3 of FIG. 3G.

Box 252 shows NO for Box 240.

Box 254 shows NO for Box 244.

Box 256 shows the Broker/Lender assists the originator in obtaining license, or the originator gets license on his/her own.

Box 258 shows the following. If the originator has a lender's/broker's license, the originator may either hang it independently or may hang it directly with the Broker/Lender.

Box 260 shows the following. If the originator obtains an agent's license, it hangs with the Broker/Lender, or any other entity that allows the originator to originate loans with the Broker/Lender.

Box 262 shows the following. If the originator obtains a broker's license, the originator may either hang it independently or may hang it directly with the Broker/Lender.

FIG. 3G includes the following for STEP #3—PRELIMINARY SETUP—FOR the originator "B".

Box 264 shows the LOT FOLDER, which contains forms, pamphlets and disclosures that are not customized for each Buyer/Borrower and a stacking order checklist. Each lot in the subdivision will have his/her own lot folder. Lot folder will be modified to comply with regulatory and professional organization rules and standards.

Box 266 shows COMPUTERIZED SYSTEM. System will be preconfigured for each subdivision using the originator's available lots. This pre-configuration reduces the input needed from the originator. All set parameters for each lot are pre-configured in advance (i.e. specific model option, by lot; lot premiums; elevation data; premiums for view, size, location, etc.).

Box 268 shows System can be customized to include any specialized forms that the originator uses in the course of his/her business (i.e. contracts, state disclosures, federal disclosures, local disclosures, etc.) Forms that are "Boiler Plate" may be copied and included in the lot folder instead. Cypher will be modified to comply with regulatory rules and professional organization rules and standards.

Arrow 269 directs the system and procedure to Continue with Step #4, of FIG. 3H.

FIG. 3H includes the following STEP #4—INFORMATION AND INTERVIEW—FOR the originator "B".

Box 270 shows the originator meets with the Buyer/Borrower to gather information.

Box 272 shows the LOT FOLDER, which explains forms, pamphlets, etc. to the Buyer/Borrower.

Box 274 shows REALITY CHECK, the computer system used to prequalify the Buyer/Borrower to determine the maximum amount for which Buyer/Borrower can qualify under several different loan scenarios.

Box 276 shows REALity Check can run several different options based on loan programs, down payment, closing costs, etc. Some of this information will be transferred to Cypher. The originator can get current rates from REALity Check, through rate sheets from the Broker/Lender (via modem), over the Internet from the Broker/Lender or directly from the Broker/Lender over the phone.

Box 278 shows CYPHER the originator inputs information that is needed to complete preconfigured sales contract and other the originator forms. Some inputs that are not required for the originator's forms but is required for the loan application is included as well. The originator may omit assets and liabilities sections of application. If it does omit these items they will be completed by the Broker/Lender.

Box 280 shows Personal information to be input in Cypher includes (but is not limited to) current address and phone number as well as information on whether or not the Buyer/Borrower currently owns or rents his/her current home and the amount of the monthly housing payments. If the Buyer/Borrower owns his/her current home then the market value is entered as well. Length of time at residence is also entered. Name and address of employer, time on the job, current compensation, job title and employers phone number are also entered.

Arrow 282 directs the system and procedure that Step #4 continues on FIG. 3I.

FIG. 3I includes the following STEP #4 (CONT)—INFORMATION AND INTERVIEW FOR the originator "B".

Box 290 shows Property information to be entered includes (but is not limited to) sales price of new home, date of price list being used, prices of any options and upgrades, amount of deposits, amount of future deposits, etc. the originator also tells Cypher whether the Buyer/Borrower wants a set loan amount or if the loan is to be a set percentage of the ultimate sales price.

Box 292 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not the originator is giving a credit for closing costs. Such a credit can be manually input or Cypher can calculate the credit if it is based on a pre-determined formula. The originator will also indicate whether or not the Buyer/Borrower will have impounds for taxes/insurance.

Box 294 shows the originator must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, the originator will acknowledge that the Buyer/Borrower does not wish to provide such information.

Box 296 shows the originator prints and explains forms to the Buyer/Borrower, including forms and pamphlets from the lot folder (the boiler plate forms). The Buyer/Borrower signs all forms.

Box 298 shows the originator collects all applicable documentation on the stacking order checklist from the Buyer/Borrower, including (but not limited to) W-2 forms, paystubs, bank statements, tax returns, bankruptcy papers, retirement information, etc.

Box 300 shows the originator packages up all gathered information and puts said information in a pre-determined stacking order and sends it to the Broker/Lender for processing.

Arrow 302 directs the system and procedure to Continue with Step #5, of FIG. 3Y.

FIG. 3J includes the following for STEP #2—LICENSING FOR "FP". Where the originator "FP" includes CPAs, Financial Planners, Broker/Dealers, Stock Brokers, Insurance Brokers/Agents, Attorneys or other financial professionals. Collectively the originator is a financial professional.

Box 310 asks "Is a special license required to originate loans?" Box 312 shows YES for Box 310.

Box 314 asks "Does the originator have required license?" Box 316 shows YES for Box 314.

Box 318 shows the following. If the originator has a lender's/agent's license, it hangs with the Broker/Lender, or any other entity that allows the originator B to originate loans with the Broker/Lender.

Arrow 320 directs the system and procedure to Continue with Step #3, of FIG. 3K.

Box 322 shows NO for Box 310.

Box 324 shows No for Box 314.

Box 326 shows the following. If the originator has a lender's/broker's license, the originator may either hang it independently or may hang it directly with the Broker/Lender.

Box 328 shows the Broker/Lender assists the originator in obtaining license, or the originator gets license on his/her own.

Box 330 shows the following. If the originator obtains an agent's license, it hangs with the Broker/Lender, or any other entity that allows the originator to originate loans with the Broker/Lender.

Box 332 shows the following. If the originator obtains a broker's license, the originator may either hang it independently or may hang it directly with the Broker/Lender.

FIG. 3K includes the following for STEP #3—PRELIMINARY SETUP—FOR the originator "FP".

Box 340 shows the file folder, which contains forms, pamphlets and disclosures that are not customized for each the Borrower and a stacking order checklist. Each the originator will have several blank files to be customized at application. File folder will be modified to comply with regulatory and professional organization rules and standards.

Box 342 shows COMPUTERIZED SYSTEM. The system will coordinate and read information from the originator's industry software such as tax files for accountants, insurance files for insurance brokers, Broker/Dealer files, etc. Through reading files in other software the originator uses in the course of his/her normal business practices, information can be extracted for loan documents. The originator inputs any information that is not extracted from his/her other software systems directly (see details below under CYPHER). Cypher will be modified to comply with regulatory rules and professional organization rules and standards.

Arrow 344 directs the system and procedure to Continue with Step #4, of FIG. 3L.

FIG. 3L includes the following for STEP #4—INFORMATION AND INTERVIEW FOR the originator "FP".

Box 350 shows the originator meets with the Borrower to gather information.

Box 352 shows the file folder, which explains forms, pamphlets, etc. to the Borrower.

Box 354 shows DETERMINING RATE. The originator will either get rates directly from the Broker/Lender or use REALity check or other computerized system to look up rates. Also, rates may be made available online or through a fax distribution or fax-on-demand system.

Box 356 shows CYPHER Transfer data from the originator's software systems into Cypher to complete most of information needed in loan application package. The originator will manually input any other required information not already provided by the originator's other software systems. The originator may omit assets and liabilities. If the originator does not input assets and liabilities then the Broker/Lender will complete this info.

Box 358 shows Personal information to be input in Cypher includes (but is not limited to) current address and phone number. Length of time at residence is also entered. Name and address of employer, time on the job, current compensation, job title and employer's phone number are also entered.

Box 360 shows Property information to be entered includes (but is not limited to) current value of the Borrower's home as well as the age of the home and current payments.

Arrow 362 directs the system and procedure to continue Step #4 of FIG. 3M.

FIG. 3M includes the following for STEP #4—(CONT)—the originator "FP".

Box 370 shows Loan details to be entered include rate; term; points; whether or not there is a balloon payment; title and escrow fees (they can be pre-programmed into the system). Also indicated is whether or not the Broker/Lender is giving a credit for closing costs. The originator will also indicate whether or not the Borrower will have impounds for taxes/insurance. If loan is to be a "No Point, No Fee" Cypher will calculate and disclose applicable credits.

Box 372 shows the originator must also complete the Declarations section on the loan application (example page 3 of current FNMA 1003), this section discloses any lawsuits, bankruptcies, foreclosures, loan defaults, etc. Also, information about sex and national origin is requested. If the Borrower does not wish to provide information about sex and national origin, the originator will acknowledge that the Borrower does not wish to provide such information.

Box 374 shows the originator prints and explains forms to the Borrower, including forms and pamphlets from the lot folder (the boiler plate forms). The Borrower signs all forms.

Box 376 shows the originator collects all applicable documentation on the stacking order checklist from the Borrower, including (but not limited to) W-2 forms, paystubs, bank statements, tax returns, bankruptcy papers, retirement information, etc.

Box 378 shows the originator packages up all gathered information and puts said information in a pre-determined stacking order and sends it to the Broker/Lender for processing.

Arrow 380 directs the system and procedure to Continue with Step #5, of FIG. 3Y.

FIG. 3N includes the following for STEP #2—LICENSING—FOR the originator "FI".

Box 390 asks "Is a special license required to originate loans?" Box 392 shows YES for Box 390.

Box 394 asks "Does the originator have required license?" Box 396 shows YES for Box 394.

Box 398 shows the following. If the originator has a lender's/agent's license, it hangs with the Broker/Lender, or any other entity that allows the originator B to originate loans with the Broker/Lender.

Arrow 400 directs the system and procedure to Continue with Step #3, of FIG. 3O.

Box 402 shows No for Box 390.

Box 404 shows No for Box 394.

Box 406 shows the Broker/Lender assists the originator in obtaining license, or the originator gets license on his/her own.

Box 408 shows the following. If the originator has a lender's/broker's license, the originator may either hang it independently or may hang it directly with the Broker/Lender.

Box 410 shows the following. If the originator obtains an agent's license, it hangs with the Broker/Lender, or any other entity that allows the originator to originate loans with the Broker/Lender.

Box 412 shows the following. If the originator obtains a broker's license, the originator may either hang it independently or may hang it directly with the Broker/Lender.

FIG. 3O includes the following for STEP #3—PRELIMINARY SETUP—FOR the originator "FI".

Box 420 shows the file folder, which contains forms, pamphlets and disclosures that are not customized for each Buyer/Borrower and a stacking order checklist. Each the originator will have several blank files to be customized at application. File folder will be modified to comply with regulatory and professional organization rules and standards.

Box 422 shows COMPUTERIZED SYSTEM. The system will coordinate and read information from the originator's industry software. Through reading files in other software the originator uses in the course of his/her normal business practices, information can be extracted for loan documents. The originator inputs any information that is not extracted from his/her other software systems directly (see details below under CYPHER). Cypher will be modified to comply with regulatory rules and professional organization rules and standards.

Arrow 424 directs. The system and procedure to Continue with Step #4, of FIG. 3P.

FIG. 3P includes the following for STEP #4—INFORMATION AND INTERVIEW FOR the originator "FI".

Box 430 shows the originator meets with the Borrower to gather information.

Box 432 shows the file folder, which explains forms, pamphlets, etc. to the Buyer/Borrower.

Box 434 shows DETERMINING RATE. The originator will either get rates directly from the Broker/Lender or use REALity check or other computerized system to look up rates. Also, rates may be made available online or through a fax distribution or fax-on-demand system.

Box 436 shows CYPHER Transfer data from the originator's software systems into Cypher to complete most of information needed in loan application package. The originator will manually input any other required information not already provided by the originator's other software systems. The originator may omit assets and liabilities. If the originator does not input assets and liabilities then the Broker/Lender will complete this info.

Box 438 shows Personal information to be input in Cypher includes (but is not limited to) current address and phone number. Length of time at residence is also entered. Name and address of employer, time on the job, current compensation, job title and employer's phone number are also entered.

Box 440 shows Property information to be entered includes (but is not limited to) current value of the Buyer/Borrower's home as well as the age of the home and current payments.

Arrow 442 directs the system and procedure to continue Step #4 of FIG. 3Q.

FIG. 3Q includes the following for STEP #4—(CONT)—FOR the originator "FI".

Box 450 shows Loan details to be entered include (but are not limited to) rate; term; points; whether or not there is a balloon payment; title and escrow fees (if Cypher has these fees in advance they can be pre-programmed into the system) and whether or not the Broker/Clean Lender is giving a credit for closing costs. Such a credit can be manually input or Cypher can calculate the credit if it is based on a pre-determined formula. The originator will also indicate whether or not the Buyer/Borrower will have impounds for taxes/insurance. If loan is to be a "No Point, No Fee" Cypher will calculate and disclose applicable credits.

Box 452 shows the originator must also complete the Declarations section on the loan application (example page 3 of current FNMA 1003), this section discloses any lawsuits, bankruptcies, foreclosures, loan defaults, etc. Also, information about sex and national origin is requested. If the Buyer/Borrower does not wish to provide information about sex and national origin, the originator will acknowledge that the Buyer/Borrower does not wish to provide such information.

Box 454 shows the originator prints and explains forms to Buyer/Borrower, including forms and pamphlets from the lot folder (the boiler plate forms). The Buyer/Borrower signs all forms.

Box 456 shows the originator collects all applicable documentation on the stacking order checklist from the Buyer/

Borrower, including (but not limited to) W-2 forms, paystubs, bank statements, tax returns, bankruptcy papers, retirement information, etc.

Box 458 shows the originator packages up all gathered information and puts said information in a pre-determined stacking order and sends it to the Broker/Lender for processing.

Arrow 460 directs the system and procedure to Continue with Step #5, of FIG. 3Y.

FIG. 3R includes the following for STEP #2—LICENSING—FOR the originator "R".

Box 470 asks "Is a special license required to originate loans?" Box 472 shows Yes for Box 470.

Box 474 asks "Does the originator have required license?" Box 476 shows YES for Box 474.

Box 478 shows the following. If the originator has a lender's/agent's license, it hangs with the Broker/Lender, or any other entity that allows the originator B to originate loans with the Broker/Lender.

Arrow 480 directs the system and procedure to Continue with Step #3, of FIG. 3S.

Box 482 shows No for Box 470.

Box 484 shows No for Box 474.

Box 486 shows the Broker/Lender assists the originator in obtaining license, or the originator gets license on his/her own.

Box 488 shows the following. If the originator has a lender's/broker's license, the originator may either hang it independently or may hang it directly with the Broker/Lender.

Box 490 shows the following. If the originator obtains an agent's license, it hangs with the Broker/Lender, or any other entity that allows the originator to originate loans with the Broker/Lender.

Box 492 shows the following. If the originator obtains a broker's license, the originator may either hang it independently or may hang it directly with the Broker/Lender.

FIG. 3S includes the following with STEP #3—PRELIMINARY SETUP—FOR the originator "R".

Box 500 shows the file folder, which contains forms, pamphlets and disclosures that are not customized for each Buyer/Borrower and a stacking order checklist. Each the originator will have several blank files to be customized at application. File folder will be modified to comply with regulatory and professional organization rules and standards.

Box 502 shows COMPUTERIZED SYSTEM. The system will coordinate and read information from the originator's industry software. Through reading files in other software the originator uses in the course of his/her normal business practices, information can be extracted for loan documents. The originator inputs any information that is not extracted from his/her other software systems directly (see details below under CYPHER). Cypher will be modified to comply with regulatory rules and professional organization rules and standards.

Arrow 504 directs the system and procedure to Continue with Step #4, of FIG. 3T.

FIG. 3T includes the following for STEP #4—INFORMATION AND INTERVIEW FOR the originator "R".

Box 510 shows the originator meets with the Buyer/Borrower to gather information.

Box 512 shows the file folder, which explains forms, pamphlets, etc. to the Buyer/Borrower.

Box 514 shows DETERMINING RATE. The originator will either get rates directly from the Broker/Lender or use REALity check or other computerized system to look up rates. Also, rates may be made available online or through a fax distribution or fax-on-demand system.

Box 516 shows CYPHER. Transfer data from the originator's software systems into Cypher to complete most of information needed in loan application package. The originator will manually input any other required information not already provided by the originator's other software systems. The originator may omit assets and liabilities. If the originator does not input assets and liabilities then the Broker/Lender will complete this info.

Box 518 shows Personal information to be input in Cypher includes (but is not limited to) current address and phone number as well as information on whether or not the Buyer/Borrower currently owns or rents his/her current home and the amount of the monthly housing payments. If the Buyer/Borrower owns his/her current home then the market value is entered as well. Length of time at residence is also entered. Name and address of employer, time on the job, current compensation, job title and employers phone number are also entered.

Box 520 shows Property information to be entered includes (but is not limited to) sales price of home, contingencies, amount of deposits, amount of future deposits, etc. the originator also tells Cypher whether the Buyer/Borrower wants a set loan amount or if the loan is to be a set percentage of the ultimate sales price.

Arrow 522 directs the system and procedure to continue Step #4 of FIG. 3U.

FIG. 3U includes the following for STEP #4—(CONT)—FOR the originator "R".

Box 530 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not the Broker/Lender is giving a credit for closing costs and if so the amount of the credit. Such a credit can be manually input or Cypher can calculate the credit if it is based on a pre-determined formula. The originator will also indicate whether or not the Buyer/Borrower will have impounds for taxes/insurance.

Box 532 shows the originator must also complete the Declarations section on the loan application (example page 3 of current FNMA 1003), this section discloses any lawsuits, bankruptcies, foreclosures, loan defaults, etc. Also, information about sex and national origin is requested. If the Buyer/Borrower does not wish to provide information about sex and national origin, the originator will acknowledge that the Buyer/Borrower does not wish to provide such information.

Box 534 shows the originator prints and explains forms to the Buyer/Borrower, including forms and pamphlets from the lot folder (the boiler plate forms). The Buyer/Borrower signs all forms.

Box 536 shows the originator collects all applicable documentation on the stacking order checklist from the Buyer/Borrower, including (but not limited to) W-2 forms, paystubs, bank statements, tax returns, bankruptcy papers, retirement information, etc.

Box 538 shows the originator packages up all gathered information and puts said information in a pre-determined stacking order and sends it to the Broker/Lender for processing.

Arrow 540 directs the system and procedure to Continue with Step #5, of FIG. 3Y.

FIG. 3V includes the following for STEP #2 and STEP #3—LICENSING and SETUP FOR the originator "C".

Box 550 shows the originator will have access to the system through their employer, a club or organization, church group, alumni association, their children's school, sports groups, over the Internet, etc.

Box 552 shows No license will be required, since consumer will be entering the data for himself/herself.

Box 554 shows the file folder. A separate file folder will be set up in advance for each individual borrower. It will contain the appropriate individual pamphlets, boiler-plate forms and disclosures, etc. that do not have to be specifically customized for each borrower. The files will be given to the organization through which the Borrower accesses Cypher or can be obtained over the Internet. If the Borrower requests forms over the Internet then the Broker/Lender will send out the pamphlets and disclosures. The Borrower will get other forms over the Internet.

Box 556 shows COMPUTERIZED SYSTEM. The System will be available over the Internet or on-site at the organizations to which the Borrower is affiliated. The system will be set up to read data files from popular tax preparation, accounting and financial planning software that may be available in order to reduce the amount of inputs required. The Borrower will input directly any additional information that is required but that is not available through the additional software systems.

Arrow 558 directs the system and procedure to Continue with Step #4, of FIG. 3W.

FIG. 3W includes the following for STEP #4—INFORMATION GATHERING—FOR the originator "C".

Box 560 shows Consumer gathers his or her own information.

Box 562 shows the file folder. An explanation of the forms will accompany the disclosures. File folder will be modified to comply with regulatory rules and professional organization rules and standards.

Box 564 shows DETERMINING RATE. Consumer will either get rates directly from the Broker/Lender or use REALity check or other computerized system to look up rates. Also, rates may be made available online or through a fax distribution or fax-on-demand system.

Box 566 shows CYPHER. Consumer will transfer data from his/her other software systems into Cypher, provided such interfaces are available. Any information that cannot be automatically extracted from other sources must be manually entered by the consumer. If Consumer so desires he may omit assets and liabilities which will then be input by the Broker/Lender. Cypher will be modified to comply with regulatory rules and professional organization rules and standards.

Box 568 shows Personal information to be input in Cypher includes (but is not limited to) current address and phone number as well as information on whether or not the Buyer/Borrower currently owns or rents his/her current home and the amount of the monthly housing payments. If the Buyer/Borrower owns his/her current home then the market value is entered as well. Length of time at residence is also entered. Name and address of employer, time on the job, current compensation, job title and employers phone number are also entered.

Arrow 570 directs the system and procedure to continue Step #4 on FIG. 3X.

FIG. 3X includes the following for STEP #4—(CONT)—FOR the originator "C".

Box 580 shows Property information to be entered includes (but is not limited to) sales price of home, contingencies, amount of deposits, amount of future deposits, etc. Consumer also tells Cypher whether the Buyer/Borrower wants a set loan amount or if the loan is to be a set percentage of the ultimate sales price.

Box 582 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and if the Broker/Lender is giving a credit for all or part of the non-recurring closing costs. Such a credit can be manually input or Cypher can calculate the credit if it is based on a pre-determined formula. Consumer will also indicate whether or not the Buyer/Borrower will have impounds for taxes/insurance.

Box 584 shows Consumer must also complete the Declarations section on the loan application (example page 3 of current FNMA 1003), this section discloses any lawsuits, bankruptcies, foreclosures, loan defaults, etc. Also, information about sex and national origin is requested. If the Buyer/Borrower does not wish to provide information about sex and national origin, Consumer will acknowledge that the Buyer/Borrower does not wish to provide such information.

Box 586 shows Consumer prints all forms and also prints an explanation sheet regarding all the forms and then proceeds to sign the forms.

Box 588 shows Consumer collects all applicable documentation on the stacking order checklist including (but not limited to) W-2 forms, paystubs, bank statements, tax returns, bankruptcy papers, retirement information, etc.

Box 590 shows Consumer packages up all gathered information and puts said information in a pre-determined stacking order and sends it to the Broker/Lender for processing.

Arrow 592 directs the system and procedure to Continue with Step #5, of FIG. 3Y.

FIG. 3Y includes the following for STEP #5—PACKAGE RECEIVED BY THE BROKER/LENDER.

Box 600 shows the Broker/Lender receives package from the originator and reviews the package to determine whether or not the package is complete. If the package is incomplete, the Broker/Lender contacts the originator to get missing information and arrange for delivery of missing documents.

Box 602 shows the Broker/Lender analyzes the loan package to determine whether or not the loan will be submitted through an automated underwriting system or through traditional underwriting channels.

Arrow 604 directs the system and procedure to Continue with Step #6, of FIG. 3Z.

FIG. 3Z includes the following for STEP #6—UNDERWRITING DECISION (AUTOMATED).

Box 610 shows Automated Underwriting System. The Broker/Lender determines which system to use and which information in the loan package will be required for the system.

Box 612 shows Approved by System. If the automated underwriting system approves the loan then the Broker/Lender will analyze the conditions that are placed on the approval. The originator will be instructed as to which items need to be ordered or requested by the originator. The Broker/Lender will take care of the other conditions.

Arrow 614 directs the system and procedure that the Borrower Signs Papers, Continue with Step #7, of FIG. 3AD.

Box 616 shows Not Approved by System. Automated systems will not generally decline a loan. The system is more likely to request that a file be underwritten manually. The Broker/Lender will look at the reasons given by the system for not approving the loan and determine whether any requested parameters can be changed to get the loan approved.

Arrow 618 directs the system and procedure to continue Step #6 of FIG. 3AA.

FIG. 3AA includes the following for STEP #6—UNDERWRITING DECISION (AUTOMATED)—NOT ACCEPTED.

Box 620 shows Different System to be Used. If the Broker/Lender feels that no changes to loan parameters are likely to change the outcome, the Broker/Lender may elect to submit the loan for automatic underwriting through a different service.

Box 622 shows Loan Parameters to Change. If the Broker/Lender feels that by changing the requested loan parameters that the system may accept the transaction, then the appropriate changes are made and the loan is re-submitted for an automated underwrite. (Back to FIG. 3Z).

Box 624 shows No Additional Attempts. The Broker/Lender will determine whether or not it appears that the loan can be approved through traditional underwriting. If so, then the loan is processed for a traditional loan submission. Otherwise, the Broker/Lender may elect to decline the loan and notify the originator and the Buyer/Borrower.

Box 626 shows Process Stops.

FIG. 3AB includes the following for STEP #6—UNDERWRITING DECISION (TRADITIONAL).

Box 630 shows Non-Automated Channels. The Broker/Lender determines that normal "Rules Based" underwriting is more appropriate for this transaction.

Box 632 shows the Broker/Lender will obtain a credit report and fill out the liability section of the loan application. The Broker/Lender will also complete the Assets section of the loan application using information provided on asset statements and other information provided by the Borrower (i.e. cash, investments, stocks, etc.) The Broker/Lender will analyze the Borrower's income, assets, liabilities, etc. to determine what additional information is needed and whether or not the loan can be obtained. The Broker/Lender will contact the Buyer/Borrower, and complete any missing information, including items that were initially left off the loan application. If the Broker/Lender determines that the loan cannot be done as requested, then the Buyer/Borrower is so informed at this time. If the Broker/Lender is going to continue working on the loan, then the loan application is forwarded to the Buyer/Borrower along with any changes or additions that have been made by the Broker/Lender for the Buyer/Borrower to acknowledge any changes (by initialing).

Box 634 shows the Broker/Lender will order any required verifications (deposit, mortgage, rent, employment, etc.).

Box 636 shows the Broker/Lender will either open an escrow and order the title reports or instruct the originator to do so as appropriate. If such services have already been ordered by the originator then the Broker/Lender will contact the service providers to request the needed documentation.

Box 638 shows when appropriate, the Broker/Lender instructs the originator to order the appraisal through an appraisal service designated by the Broker/Lender. Appraisal service will send the completed report directly to the Broker/Lender.

Arrow 640 directs the system and procedure to continue Step #6 of FIG. 3AC.

FIG. 3AC includes the following for STEP #6—UNDERWRITING DECISION (TRADITIONAL).

Box 670 shows when the package is ready, the Broker/Lender determines which Lender/Investor will receive the package. If first Lender/Investor declines the loan, the Broker/Lender may submit it to another source.

Box 672 shows Loan Declined. If the Broker/Lender determines that the loan cannot be funded, then the originator and the Buyer/Borrower are so notified. The process stops.

Box 674 shows PROCESS STOPS.

Box 676 shows Loan Approved. The Broker/Lender receives approval from the Lender/Investor. The Broker/Lender notifies the originator and discusses any conditions. The Buyer/Borrower will be notified by either the originator or the Broker/Lender as appropriate.

Box 678 shows the originator gathers and coordinates certain conditions (per instructions of the Broker/Lender) and forwards these items to the Broker/Lender.

Box 680 shows the Broker/Lender gathers and coordinates remaining conditions and forwards all conditions to final Lender/Investor.

Box 682 shows upon completion of all "Prior-to-Doc" conditions, the Broker/Lender orders the loan documents.

Box 684 shows Lender/Broker notifies the originator that loan documents are ready and instructs the originator to coordinate the signing of the documents.

Box 686 shows the Borrower signs final loan documents.

Arrow 688 directs the system and procedure to Continue with Step #7, of FIG. 3AD.

FIG. 3AD includes the following STEP #7—LOAN FUNDING.

Box 690 shows Escrow Holder sends out signed loan documents to appropriate party as follows:

Box 692 shows the following. If Lender/Investor is to Fund Loan. Escrow holder sends funding package to Lender/Investor for final review.

Box 694 shows after approval of loan documents and verification of all conditions being met, Lender/Investor will fund the loan.

Box 696 shows Escrow Holder receives funds and records transaction with the county or appropriate governmental agency.

Box 698 shows the Broker/Lender is paid by the Lender/Investor. The Broker/Lender reimburses the Buyer/Borrower for any agreed upon costs.

Arrow 700 directs the system and procedure to Continue with Step #8, of FIG. 3AE.

Box 702 shows the following. If the Broker/Lender is to Fund Loan. Escrow holder sends funding package to the Broker/Lender for final review.

Box 704 shows after approval of loan documents and verification of all conditions being met, the Broker/Lender funds the loan from a warehouse line.

Box 706 shows Escrow Holder receives funds and records transaction with the county or appropriate governmental agency.

Box 708 shows the Broker/Lender prepares the package for sale to final Lender/Investor.

Box 710 shows after being compensated by Lender/Investor, the Broker/Lender reconciles all costs involved with the warehouse line, etc. and reimburses the Buyer/Borrower for any agreed upon costs.

FIG. 3AE includes the following for STEP #8—LOAN CLOSED.

Box 720 shows the Broker/Lender determines how much to compensate the originator in accordance with a predetermined agreement for services.

Box 722 shows the Broker/Lender enters the Borrower's loan information into his/her proprietary software system "Rate Analyzer" for possible future refinances.

Box 724 shows the following. If the Borrower came to the Broker/Lender through a real estate agent, financial institution, consumer direct or builder then the Broker/Lender will contact the consumer directly when "Rate Analyzer" indicates a refinance is possible.

Box 726 shows the following. If the Borrower came to the Broker/Lender through a CPA, financial planner, etc. then the originator will be contacted when Rate Analyzer indicates a refinance is possible and the originator will start the process again.

As illustrated in FIG. 4, builders utilize a series of screen displays 30 starting with Main Menu screen display 30*a* that has selection tabs 32 which are selected by pointing and clicking mouse 14 to move through screen displays 30. Selecting the File tab 32*a* leads the builder to File Management Control display screen 30*b* (FIG. 4B) from which the builder can create a new file for a particular buyer and property combination by selecting tab 34*a* or select an existing file by selecting tab 34*b*.

Selecting the Contract Info tab 32*b* from Main Menu display screen 30*a* leads the builder to Contract Information screen displays 30*c* (FIG. 4C) and 30*d* (FIG. 4D). Builders can receive the system pre-configured for each tract with separate data files already established for each lot in the subdivision as shown on Contract Information—Lot and Costs screen display 30*c* (FIG. 4C).

If the subdivision already has pre-configured plans and/or elevations then the system is also pre-set with this data and displayed in field group 34*a*, enabling the builder's sales agents to spend less time entering data and more time doing sales related activities. If given lots have a predetermined lot premium from the beginning of the development then this also is preconfigured and displayed in field 34*b*. Other pre-configured information that may be provided includes lender information 34*c*, liquidated damages information 34*d*, late close penalty information 34*e*, escrow company 34*j* and whether the property is subject to Covenants, Conditions, and Restrictions (CC&R's) 34*f* or a prior sale 34*g*. The builder enters any other information not already pre-configured that is needed to complete the loan application such as the loan to value (LTV) to use for loan calculations 34*h*, and the deposits received 34*i*. Amounts such as the total purchase price 34*k* and loan amount 34*l* are automatically calculated. Selecting the Next button 34*l* moves the builder to Contract Information—Buyer Info display screen 30*b* (FIG. 4D).

On Contract Information—Buyer Info display screen 30*d* the builder enters information regarding the buyer into the system and then returns to Main Menu display screen 30*a* when done by selecting Main Menu button 36*a*. The builder enters information such as the buyer's address 36*b*, telephone number 36*c*, current home information 36*d*. By selecting the Copy Address button 36*e*, the information from the first listed buyer fields 36*b*, 36*c* and 36*d* is copied into the co-buyer fields 36*f*. The builder also enters information regarding the buyer's social security number 36*g*, the co-buyer's social security number 36*h*, the buyer's employment 36*i* and the co-buyer's employment 36*j*.

Figure 4A:
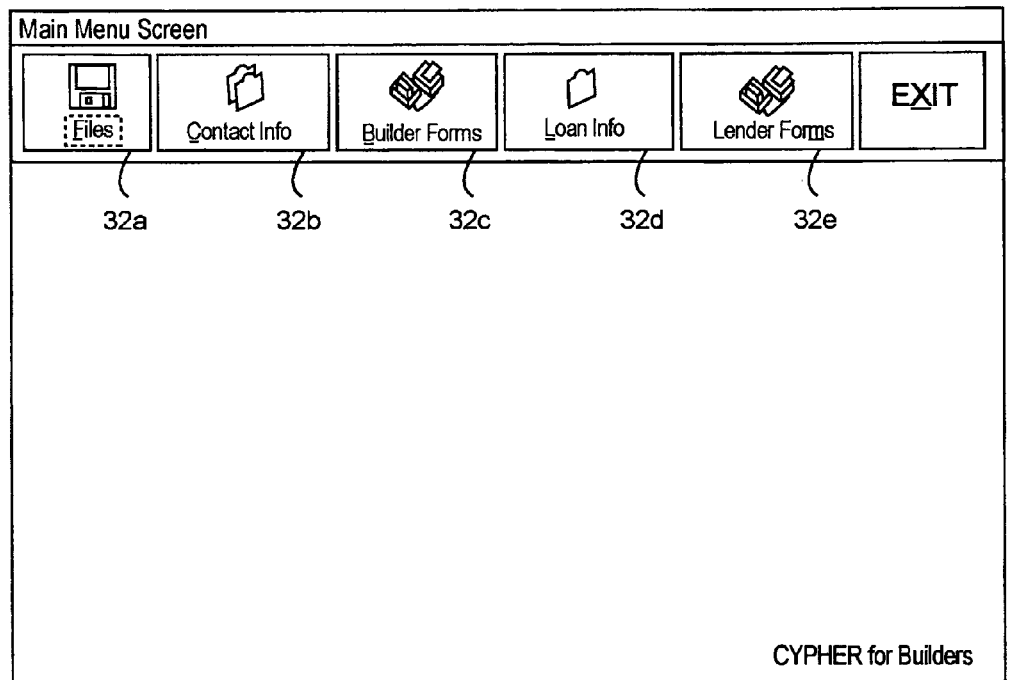
Figure 4B:
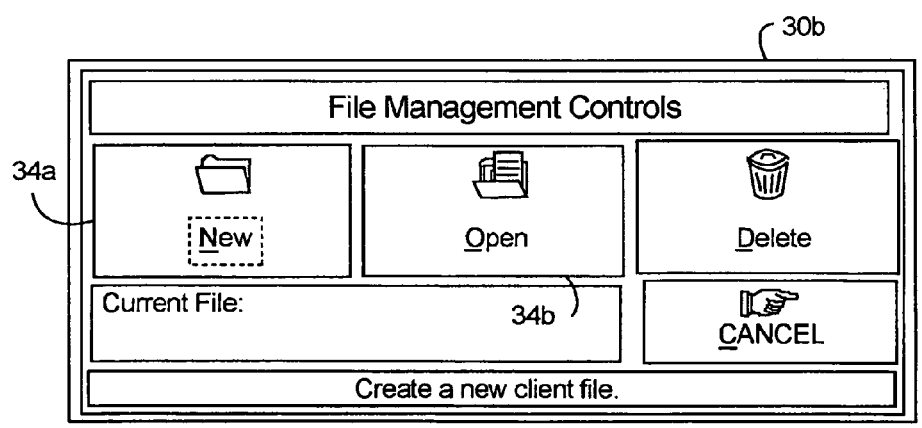
Figure 4G:

Selecting Loan Info tab 32*d* from Main Menu screen display 30*a* leads the builder to Loan Information screen displays 30*e* (FIG. 4E), 30*f* (FIG. 4F) and 30*g* (FIG. 4G). On screen display 30*e*, the builder enters loan information 38 regarding the loan amount 38*a* (if not already entered) and terms for first mortgage 38*b*, and if not pre-configured, escrow/title/tax issues 38*c* and credit to closing costs 38*d*. Selecting the Next button 40 moves the builder to the next Loan Information screen display 30*f* where the builder answers a series of yes/no questions 38*e* regarding the borrower and co-borrower (i.e., buyer and co-buyer) by checking the appropriate answer box. The builder also selects appropriate responses regarding the residence of the borrower and co-borrower from pull down fields 38*f*. Again, selecting Next button 42 moves the builder to the next Loan Information screen display 30*g*. On screen display 30*g* the builder enters information for government monitoring purposes on the borrower and co-borrower by selecting the appropriate boxes 38*g*. In text field 38*h*, the builder provides any explanations required for the declarations made on screen 30*f* or any other explanatory information necessary. The builder then returns to Main Menu screen display 30*a* by selecting the Main Menu button 44.

Figure 4H:
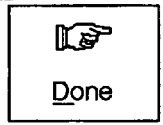

Selecting Builder Forms tab 32 from Main Menu screen display 30*a* leads the builder to Builder Forms screen display 30*h* (FIG. 4H). The builder selects the boxes 46 for the builder forms that are to be printed.

Selecting Loan Forms tab 32 from Main Menu screen display 30*a* leads the builder to Loan Forms screen display 30*h* (FIG. 4H). The builder selects the boxes 48 for the loan forms that are to be printed.

Owner-sellers have the system pre-configured with the information on the subject property. Where appropriate, real estate agents have the software system pre-configured to print out the purchase agreement generally used by members of their local Board of Realtors or multiple listing service group as well as additional forms and disclosures that are generally used and accepted and/or required. The real estate agent can also interface with his or her local MLS group to draw all of the pertinent property information into the system directly from the MLS computer service provided the MLS allows the real estate agent to access the system in this way. If the real estate agent's MLS provider is unable or unwilling to so cooperate but has the data available on the Internet then an additional software module is included to allow the real estate agent to view the information in a popular web browser such as those readily available by Netscape and Microsoft. This added software module is pre-programmed to translate the data that will be presented on a given screen of information from a web site and can actually save the appropriate fields to a data file that can be accessed by the loan origination system.

Figure 5A:
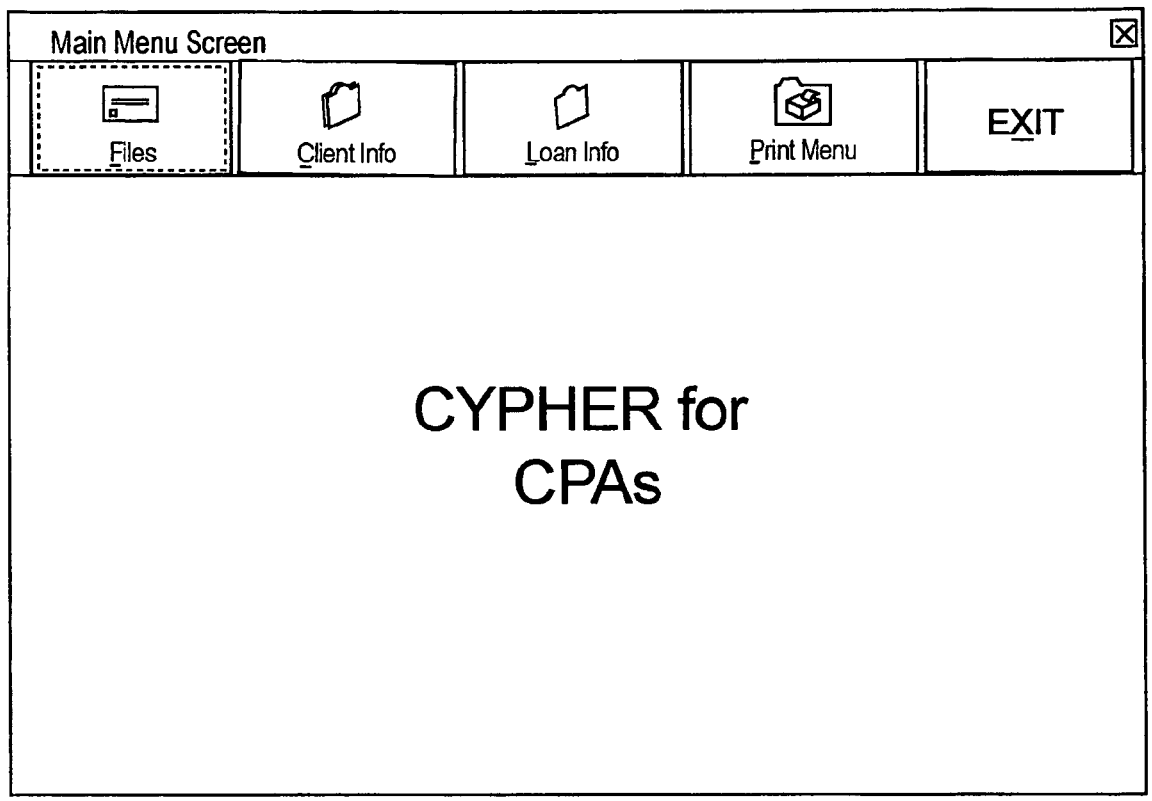
Figure 5B:
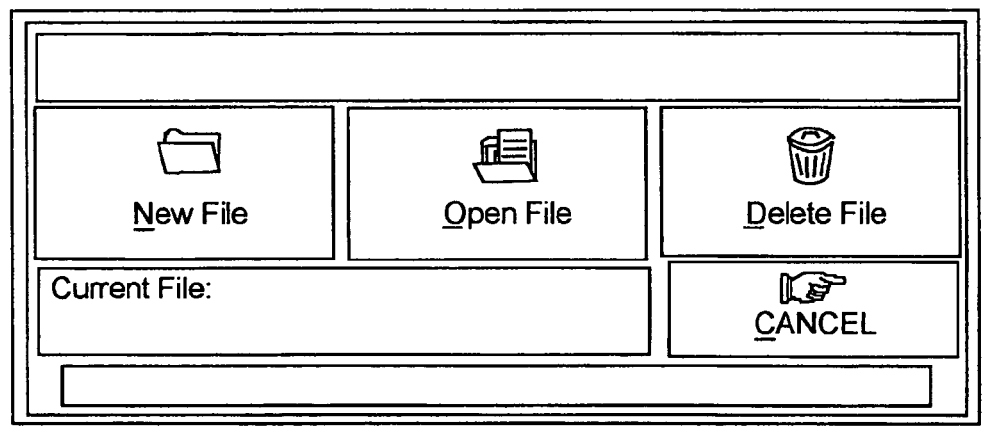
Figure 5G:
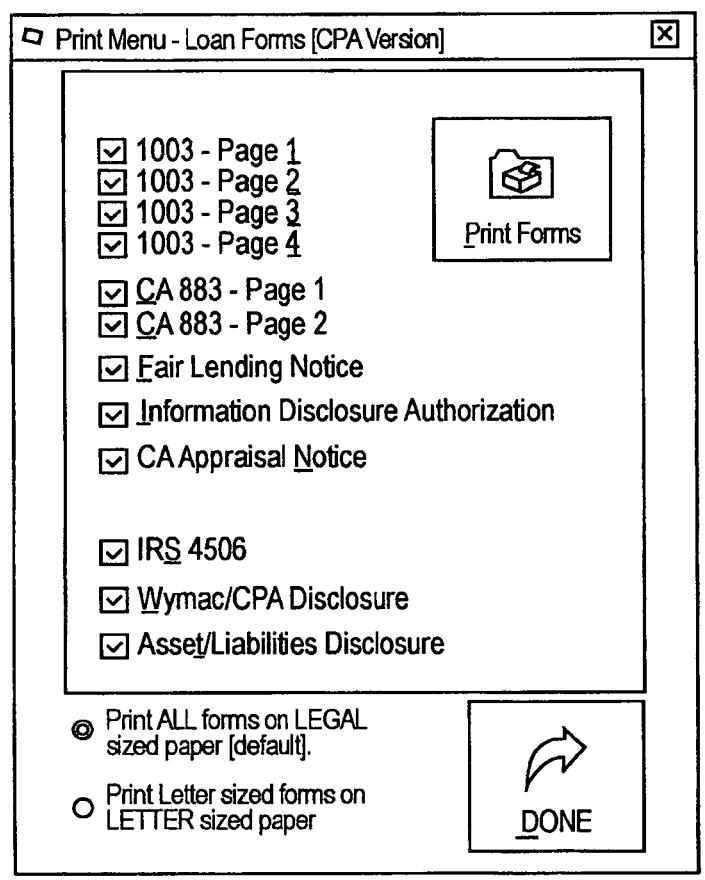

As illustrated in FIGS. 5A-5G, in the case of CPAs and other tax preparers acting as loan originators the system is set up to default to a refinance as shown on screen display 50 in FIG. 5D, as this is the most common function for these types of loan originators. The system can also be configured for purchases rather than refinances. Information regarding the current lien holder 52*a*, amount owed 52*b* and the priority 52*c* is entered into the appropriate fields if the information is not available from other customer service software in memory unit 24 and transferred into the system of the present invention as explained below. Otherwise, the screen displays are substantially the same as for the builder screen displays shown in FIG. 4A-4H and operate in the same manner to collect the same information. The system provides an interface with (or accept exported data from) popular tax preparation or accounting software which allows the loan originator to utilize detailed income and asset data already in his or her possession to reduce the loan origination time, and potential errors in inputting duplicate data. The system can also be incorporated into accounting or tax preparation software if so desired, which would allow seamless integration with little additional work.

In the case of direct consumers acting as loan originators the software system is configured to accept exported data from popular tax and or accounting software systems or is directly incorporated into tax and/or accounting software such as Intuit's Quicken®, QuickBooks® and TurboTax®. Popular accounting software often maintains detailed information on a consumer's assets and liabilities and has income information by way of evidence of net payroll deposits. Tax software may have definitive income information as well as information on the borrower's current property addresses and the addresses of any rental properties owned as well as income and expense information on those properties. All this information is needed in the processing of a mortgage loan and the consumer uses these system packages to submit a loan application directly to a final lender, bypassing the loan agent or loan broker to save additional fees or obtain a lower interest rate for the same fees.

The system is configurable to provide other professionals with a version of the software that best suits their situation. The user interface screens illustrated in FIGS. 4A-4H and FIGS. 5A-5G would be modified to reflect the type of information that these other professionals already possess as well as meeting their specific needs.

Once basic information on the borrower (i.e., loan customer) is in the system and basic questions are answered, the loan originator need only provide a few loan details to make the final calculations and print the forms and reports. This information includes, but is not limited to, one or more of the following: loan amount, interest rate and points charged, length of the loan term and whether or not there is a balloon payment required. The system is customized with standard fees for other services required in the processing of a loan application which includes, but is not limited to, one or more of the following: fees for appraisals, credit reports, loan discount and/or origination, broker fees, flood certificate, tax service fees, wire transfer, processing, underwriting, document preparation, administration, other miscellaneous lender fees, various title and escrow company fees, charges for escrow, owner's title insurance, lender's title insurance, courier, processing, document preparation, notary, charges for any required endorsements, and typical county, city and state taxes/stamps, recording fees, etc. Any other fees that are typical to a given area or loan program can also be customized before the system is distributed to the loan originator, which in turn reduces the amount of detailed knowledge about loan or mortgage origination that is required by the loan originator.

The system is directly linked with title insurance companies, escrow companies, pest control companies, home inspection companies and other service providers to speed up the process as well as provide instant information with regards to fees charged. Companies that wish to be a part of the system can offer reduced rates and fees if so desired due to the greater ease with which the service can be processed. If such companies do not wish to provide a direct active link for the system but have relatively stable fees or fee charts for their services then such fees are pre-programmed into the system to provide accurate data.

The system uses these figures to make certain assumptions with regards to the various loan programs that allow printer 20 of computer system 10 to print out original loan application documents and disclosure forms that are complete enough for a lender to accept them for the processing and approval of a mortgage or other real estate loan. In the case for which a loan program requires impounds for taxes and hazard insurance then the loan originator is so informed and initial reserves for these items are also specified. If impounds are optional the loan originator is so informed and allowed to select whether or not impounds are desired. If impounds are not available the loan originator is also so informed.

The data from the system is corroborated by linking with a credit reporting service and the actual debt accounts are imported directly into the system using such a service. This information includes as much of the following information on each account as is available from the information service provider:

1. Account type
2. Name of lender/creditor
3. Account number
4. Balance owed
5. Months reported
6. Monthly payment
7. Number of payments remaining
8. High credit limit
9. Any other information available If the final lender or investor accepts on-line collateral assessments or appraisals then the system is linked to service providers which offer such reports and the data is drawn directly into the processing system.

If the final lender or investor accepts underwriting decisions made by an automated underwriting system such as Loan Prospector, Loan Originator, Desktop Underwriter or any new such system to be developed or if the final lender or investor has his/her own in-house automated underwriting system (such as GE Capital's OMNI Score) then the system can also be linked to such underwriting systems to allow the loan originator to get an immediate approval if the borrower is qualified for such immediate approval.

This system makes a typical loan broker or lender's loan officer unnecessary as the referral source or direct consumer is able to provide nearly as much value added to the transaction as is normally provided by the loan officer. The system allows lenders, mortgage brokers, mortgage bankers, and investors to compensate the loan originator for originating the loan(s).

Figure 6:
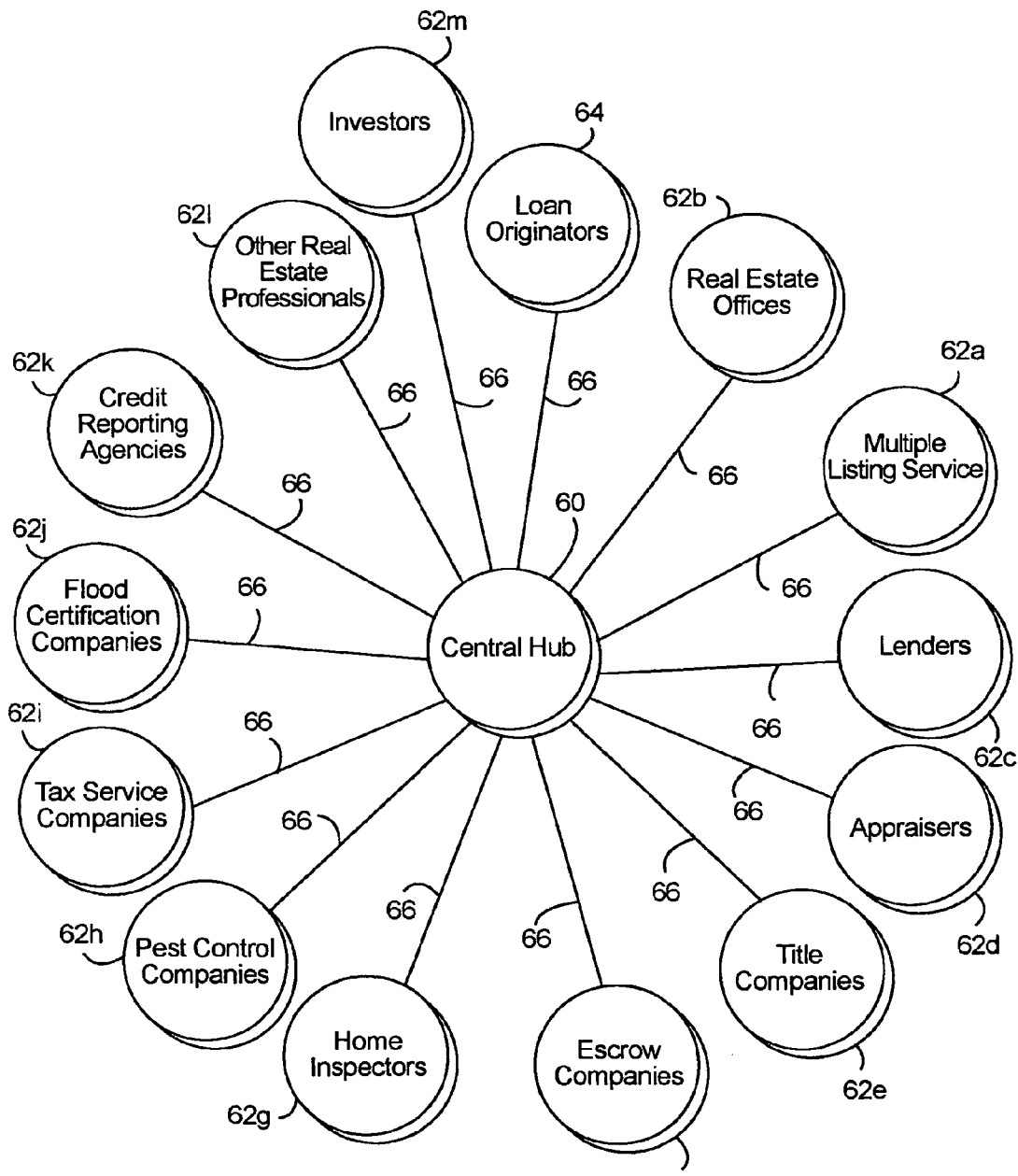
FIG. 6 is a schematic diagram illustrating the connections between the central hub and the computer systems of the other entities involved in the loan process.

As shown in FIG. 6, the system carries out the above described processes by means of a central data processing hub or host computer 60 which coordinates and processes information between two or more of the following:

1. Multiple Listing Services (MLS) 62*a*
2. real estate offices 62*b*
3. lenders/underwriters 62*c*
4. appraisers 62*d*
5. title companies 62*e*
6. escrow companies 62*f*
7. home inspectors 62*g*
8. pest control companies 62*h*
9. tax service companies 62*i*
10. flood certification companies 62*j*
11. credit reporting agencies 62*k*
12. other appropriate professionals involved in a real estate or real estate loan transaction 62*l*
13. investors 62*m*
14. loan originators 64.

Figure 7:
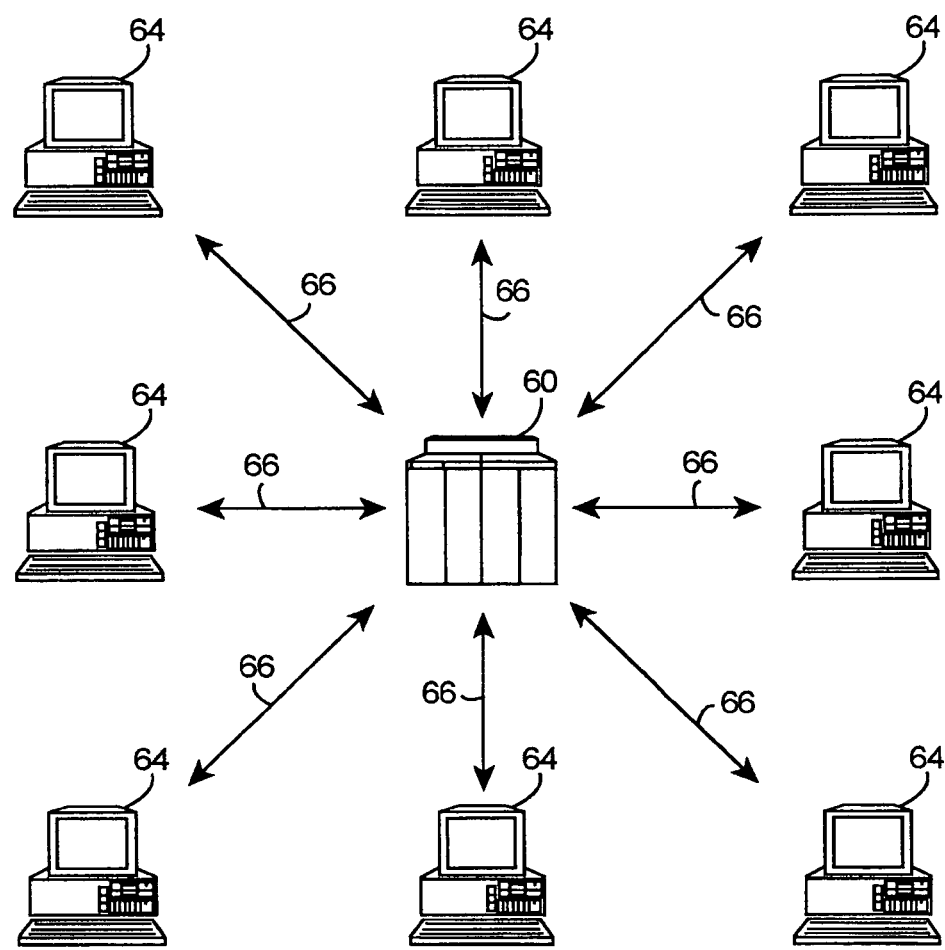
FIG. 7 is a schematic diagram illustrating the connections between the central hub and the loan originator computer systems.

The system, as depicted in FIG. 6, has a hub and spoke configuration, where the flow of information is controlled by central hub 60. Information is exchanged between loan originator 64 and other entities 62 via central hub 60. Data transfer links 66 between central hub 60 and entities 62 and 64 may be any suitable transfer mechanism such as the Internet or a direct modem connection. As depicted in FIG. 7, multiple loan originators 64 are coupled to central hub 60.

The loan originator computer system allows the loan originator to input data that he or she already has or obtains from the borrower, into the system via a pre-developed matrix for organizing the information such as the screen displays of FIGS. 4A-4H and FIGS. 5A-5G. If using other customer service computer software system(s), then the information will be transferred through the computer or other electronic media to forms or systems needed by the loan originator to coordinate the information.

The system of the present invention dictates that the loan originator follow specific steps in gathering the information and disclosing information to the buyer or borrower, and providing proper documentation to the lender or investor. These steps will include some or all of the following:

Fill out the loan application, either by hand or through a computer assisted processing system.

Analyze buyers' or borrowers' income and debt to determine the maximum mortgage that the borrower can afford either using a calculator or a computer prequalification system.

Educate the buyer or borrower in the home buying and financing process, advising him or her about different types of loan products available and demonstrate how closing costs and monthly payments may vary under different programs. This may be done with hand-out fliers that go through most of the explanation for the loan originator, such as standard regulatory pamphlets and through information generated by the system (examples of which are included in Appendix A).

Collect required financial information as appropriate which may include one or more of the following: pay stubs, W-2 forms, tax returns, bank statements, 401K and/or pension and/or profit sharing statements, divorce decree, bankruptcy and bankruptcy discharge papers and any additional information as may be required by the final lender or investor for a given loan program.

Maintain regular contact with the buyer or borrower, the lender and any real estate agents that may be involved and anybody else involved in the transaction between the application and the closing of the transaction to apprise buyer or borrower of the status of the application and to gather any additional information, as needed.

Order any legal documents required, including but not limited to any of the following, as appropriate: preliminary title report, Covenants, Conditions and Restrictions (CC&Rs), homeowner's association certificates or any other required documentation on the property.

Determine whether the property is located in a special flood hazard zone or order such service through a flood certification company to so determine.

Participate in the loan closing.

Initiate and order the appraisal through an appraisal service determined by lender or investor.

Provide appropriate loan disclosures when necessary, such as good faith estimate, fair lending notices, disclosures about the relationship between the lender or investor and the loan originator including the compensation to be paid to originator by lender/investor and other disclosures as may be required by various laws or licensing requirements.

Give copies of everything that has been signed by the buyer or borrower to the buyer or borrower as well as any fliers or handouts deemed necessary by the broker, lender or investor.

For various programs the lender or investor will determine which of the preceding items must be completed in order to qualify for compensation and whether any additional requirements must also be fulfilled. The original signed copies of all documentation are forwarded to the broker, lender or investor for processing and loan approval, along with a stacking order form generated by the system (an example of which is included as the last page of Appendix A).

Loan Calculation Module

The loan origination software present in computer system 10 also contains a module for enabling real estate agents, CPAs, attorneys, home builders and other mortgage and non-mortgage related persons to provide potential home buyers or homeowners with a variety of financing options, open house fliers, pre-qualification certificates and loan parameters.

The system enables in-depth mortgage calculations to be computed on a variety of mortgage loan programs even if the computer user has limited or no knowledge of current rates and loan guidelines. This enables a lender to provide the information to his/her own agents as well as prospective referral sources on as many of the brokers or lenders programs as the broker or lender desires. The in depth calculations and information provided enable the loan originator to appear extremely knowledgeable in real estate lending even if this is not the case.

Computer data files with current rates and program guidelines are maintained on a bulletin board system or other host computer system at broker or lender's site or another site designated by broker, lender or software provider. Central hub 60 periodically polls the bulletin board or host system to obtain the rate and program information. These file transfers will take place through a computer modem, or other electronic media. Such rates can be updated as often as lender desires, preferably at regular intervals. File transfers can also take place through an Internet connection if available. When the file transfer portion of the system of the present invention is executed, information on each and every prospective borrower from each and every user of the system is compiled into a single file at central hub 60 which is then transmitted by central hub 60 to lenders 62*c*. This enables the lender to gather desired information on prospective clients even if the referral source chooses not to provide it to the lender.

Additionally, central hub 60 collects current rate and program guideline data from lenders 62*c*, which is then transferred on data link 66 to all of the loan origination computer systems 10 in the field along with the files required to process the rates and any additional bulletins or program changes. The rate and program guideline updates are -transferred upon request from the individual loan origination computer systems 10. However, the system may be configured to transmit the updates to the loan origination computer systems 10 at loan originators 64 periodically without waiting for update requests.

The loan originator inputs loan calculation data regarding the borrower into the system by means of user interface screens 68*a-h*, as depicted in FIGS. 8A-8H, and keyboard/mouse input devices. When the portion of the system that runs calculations is executed it reads a data file on memory unit 24 that tells the system one or more of the following items about the authorized user acting as a loan originator: name, company name, address, telephone number and any other information previously input by the authorized user. If more than one authorized user uses the same machine or network installation then the loan originator is provided with a list from which to select his or her name. This way all reports can be personalized with the loan originator's name, address and phone number as well as the name, address and phone number of the loan originator's contact person with the broker or lender. If accessing over the Internet, the loan originator identifies himself-or herself through a login procedure. At least a portion of the information is displayed on main menu screen display 68*a* as shown in fields 70*a* and 70*b* of FIG. 8A.

Once the loan originator is into the main body of the program the following areas can be selected from main menu screen display 68*a* by pointing and clicking on the appropriate tab with mouse 14: file management 72*a*, borrower info 72*b*, qualifier 72*c*, rate sheets 72*d*, detailed program information 72*f* and open house flier generator (not shown but would be presented as another tab to the right of the program info tab 72*f*.

File management (screen 68*b* in FIG. 8B): The loan originator is allowed to either create a new file 74*a* or select a previously created file 74*b*. Once a file is opened or created the loan originator returns to the main menu screen display 68*a*.

Borrower info (screen 68*c* in FIG. 8C): If the loan originator has not either opened or created a file, then he or she is prompted by the computer to enter a new, unique file name for this session. On this next screen 68*c* the loan originator is able to enter information on the buyer or borrower including one or more of the following in fields 76: name(s) 76*a*, address 76*b*, telephone number(s) 76*c*, income(s) 76*d*, social security number(s) 76*e*, and any other information desired by the lender. System allows the loan originator to input the income as weekly, monthly or annually in fields 76*f*, but then converts the entered figures internally into a monthly figure for debt ratio calculations. If calculations are being run for a purchase then the loan originator inputs the money to be used for a down payment in field 76*g*. If calculations are being run for a refinance then the loan originator inputs the value of the property. If the loan originator is a real estate agent processing info for a listing then a list price can also be entered (fields not shown). The data entered on this screen is saved to a master file in memory unit 24 for the current loan originator which is compiled and sent on to the lender the next time rates and programs are updated. Pressing the DONE button 76*h* moves the loan originator to Qualifier screen 68*d*.

Qualifier (screens 68*d* in FIG. 8D): The loan originator is prompted in field 78*a* to indicate to the system whether calculations are to be run for the maximum loan amount or purchase price under each loan program or for a specific loan amount or purchase price. The purchase price is entered in field 78*b* and whether the property is a condominium in field 78*c*. The loan originator also inputs the amount of the monthly payments that borrower is currently making for other debt servicing in fields 78*d*. The amount of the funds available, which is carried over from screen display 68*c*, is indicated in field 78*e*. The loan calculation is based upon this amount as the down payment, unless one of the fixed percentage buttons 78*f* is selected. Selecting one of the buttons 78*f* will alter the value in field 78*d* in accordance with the percentage selected and the loan calculation will be based upon this amount of down payment. Pressing the CALCULATION button 78*g* performs the calculation and moves the loan originator to either Calculation Results screen 68*e* or Qualification Information screen 68*f* depending on the selection made in field 78*a*.

If the loan originator has specified maximum loan amount/purchase price then the system takes several steps to determine the maximum loan amount and/or purchase price under each and every program. The resultant information is displayed on Qualification Information screen 68*f* in FIG. 8F. The information can be printed in either summary or detailed form by selecting Print Info button 82*a*. Steps taken include:

1. Calculating the maximum loan amount allowed under the program based on the equity in the property.
2. Calculating the maximum total loan payment for principal, interest, taxes and insurance (PITI) based on debt ratios allowed under the program.
3. Calculating the maximum total debt load allowed under each program and comparing this number with a sum of the maximum PITI and the current monthly debt for other expenses. If this sum is greater than the maximum total debt allowed, then the maximum PITI for each program is appropriately reduced to allow the total debt servicing to be within program guidelines.
4. Running appropriate calculations based on other loan program guidelines. If any restriction indicates that a maximum loan amount under a given program is less than the strict maximum from step 1 above then a temporary "maximum" is stored with this reduced number.
5. PITI is calculated based on the final "maximum" loan amount and is compared to the maximum PITI from steps 2 and 3. If this new calculation is greater than the allowable amount then the computer system lowers the loan amount calculated in step 4 by increments calculated by interpolating the difference between allowed PITI and the PITI for the requested loan amount in order to approach a final maximum loan amount. This step repeats itself up to 100 times in order to come as close as possible to the maximum number.
6. The system can also be customized for any of the above listed program variations to show how far the lender typically stretches things by "exception" and this information is compiled into a separate list to show how much more the borrower may qualify for if the exception is granted.
7. This information is then organized and output to the screen. The loan originator has the option of several different reports to organize data in a printed format.

If the loan originator has selected a specific loan amount or purchase price in field 78*a* then the system runs the exact same steps 1-6 from above, and then compares the maximum loan amount or purchase price in each loan program with the request loan amount or purchase price. The resultant information is displayed on Calculation Results screen 68*e* in FIG. 8E. Any instance for which the maximum loan amount or purchase price is greater than the amount requested is a match and the loan program's data is transferred into a temporary array of qualifying programs. Finally the PITI is calculated for each loan program under the requested loan amount or purchase price and the data is output to the screen. If exception data is also used and required for the output then a second list is used to show programs for which borrower may qualify if the exception is granted. From Calculation Results screen 68*e*, the loan originator then has the option of several reports to organize the data in a printed format by selecting button 80*a*. The loan originator can also print out a pre-qualification certificate by selecting button 80*b* if and only if the borrower appears to qualify under at least one loan scenario. The qualification module also calculates appropriate APRs if needed in order to distribute the calculations to the public.

Once the loan originator is done with the qualification screens the loan originator returns to Main Menu screen display 68*a* by pressing the DONE button 80*c* on screen 68*e* or 82*b* on screen 68*f*.

The Rate Sheet option 72*d* from Main Menu screen display 68*a* prints out rate sheets showing all the programs on the system and various tiers of retail pricing, if available.

Figure 8A:
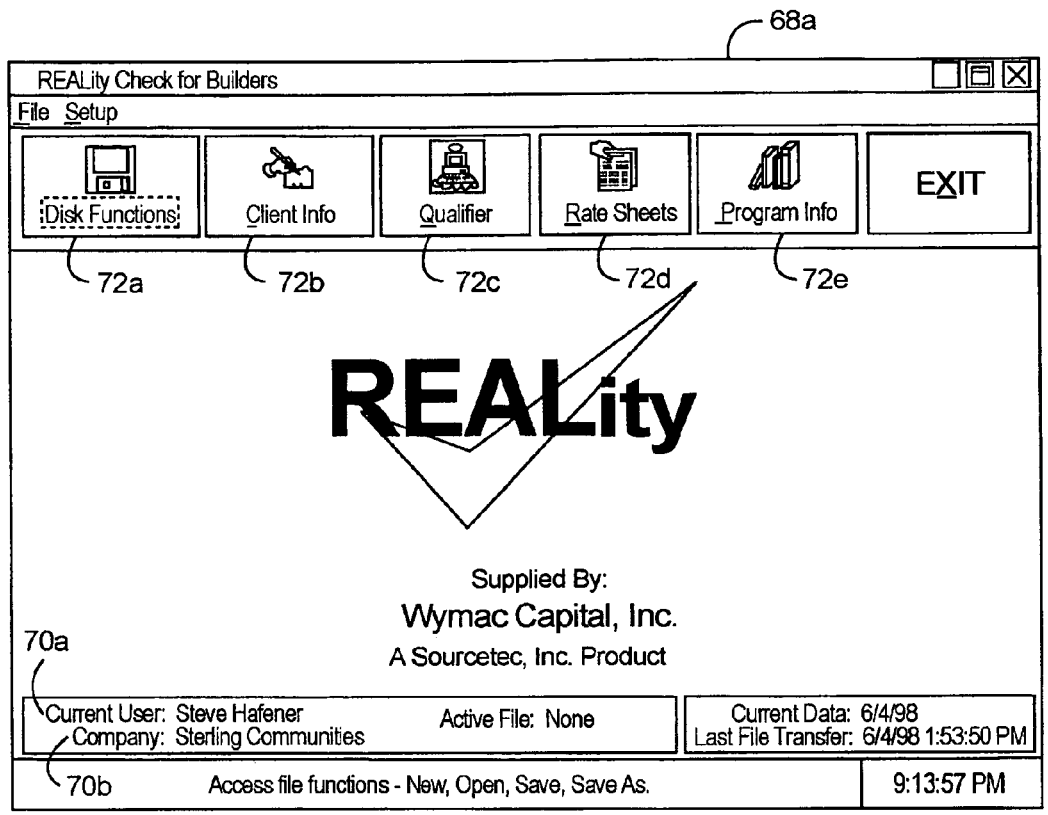
Figure 8B:
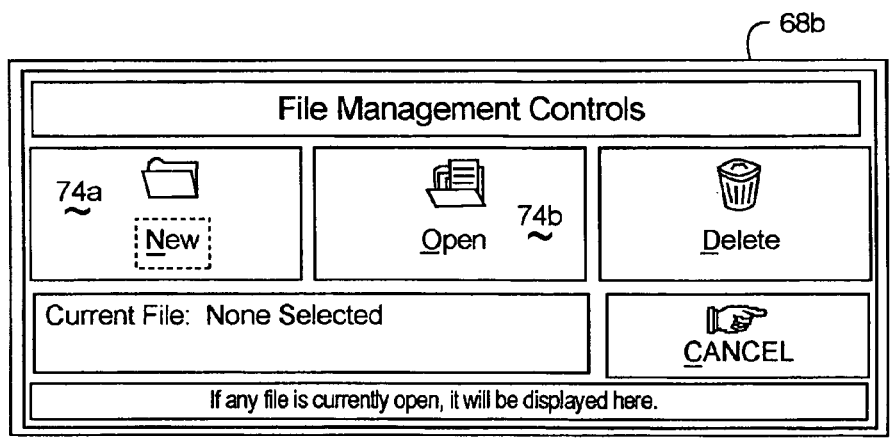
Figure 8G:
Figure 8H:

The Loan Program Info option 72*f* from Main Menu screen display 68*a* sends the loan originator to display screen 68*g* in FIG. 8G to give the loan originator the option of selecting from a list of the loan programs on the system displayed in field 84*a*. The loan originator scrolls to the desired loan program and selects the view details button 84*b* to view various loan program details such as current rates and fees, index, margin and caps for ARMs and allowable loan amounts at various loan to value ratios as displayed on Detailed Program Information screen display 68*h* in FIG. 8H. If the system is customized with "exception" guidelines then these are also shown here.

The open house flier option is only available in cases for which the loan originator is a real estate agent, builder or full service broker and allows the loan originator to select from a variety of programs to print up open house fliers for the loan originator's marketing purposes. These fliers have the name, address and phone number of the loan originator and the loan originator's company as well as the name, address and phone number of the lender and the loan originator's contact person with lender. The open house flier calculates APRs if needed in order to show the fliers to the public.

From the above description, it will be apparent that the invention disclosed herein provides a novel and advantageous mortgage loan and financial services data processing system. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, disclosure of the present invention is intended to be illustrative, but not limiting, of the scope of the invention, which is set forth in the following claims.

APPENDIX A:

Uniform Residential Loan Application - WYMAC CAPITAL, INC.

This application is designed to be completed by the applicant(s) with the lender's assistance. Applicants should complete this form as "Borrower" or "Co-Borrower", as applicable. Co-Borrower information must also be provided (and the appropriate box checked) when [XX] the income or assets of a person other than the "Borrower" (including the Borrower's spouse) will be used as a basis for loan qualification or [ ] the income or assets of the Borrower's spouse will not be used as a basis for loan qualification, but his or her liabilities must be considered because the Borrower resides in a community property state, the security property is located in a community property state, or the Borrower is relying on other property located in a community property state as a basis for repayment of the loan.

I. TYPE OF MORTGAGE AND TERMS OF LOAN

| Mortgage Applied For: | [ ] VA  [XX] Conventional  [ ] Other: | | Agency Case Number | Lender Case Number |
|---|---|---|---|---|
| | [ ] FHA  [ ] FmHA | | | |
| Amount $283,500 | Interest Rate 7.500 % | No. of Months 360 | Amortization Type: [XX] Fixed Rate  [ ] GPM | [ ] Other (explain): [ ] ARM (type): |

II. PROPERTY INFORMATION AND PURPOSE OF LOAN

| Subject Property Address (street, city, state, ZIP code): 123 Main Street, Davis, CA 99999 | No. of Units: 1 |
|---|---|
| Legal Description of Property (attach description if necessary) SEE PRELIMINARY TITLE REPORT | Year Built |

| Purpose of Loan | [XX] Purchase  [ ] Refinance | [ ] Construction  [ ] Construction-Permanent | [ ] Other (explain): | Property will be: [XX] Primary Residence  [ ] Secondary Residence  [ ] Investment |
|---|---|---|---|---|

Complete this line if construction or construction-permanent loan.

| Year Lot Acquired | Original Cost $ | Amount Existing Liens $ | (a) Present Value of Lot $ | (b) Cost of Improvements $ | Total (a + b) $ |
|---|---|---|---|---|---|

Complete this line if this is a refinance loan.

| Year Acquired | Original Cost $ | Amount Existing Liens $ | Purpose of Refinance | Describe Improvements [ ] made [ ] to be made  Cost: $ |
|---|---|---|---|---|

| Title will be held in what name(s) John Smith, Mary Smith | Manner in which title will be held TBD | Estate will be held in: [XX] Fee Simple  [ ] Leasehold (Show exp. date) |
|---|---|---|
| Source of Down Payment, Settlement Charges and/or Subordinate Financing (explain) | | |

III. BORROWER INFORMATION / CO-BORROWER

| BORROWER | CO-BORROWER |
|---|---|
| Borrower's Name (Include Jr. or Sr. if applicable) John Smith | Co-Borrower's Name (Include Jr. or Sr. if applicable) Mary Smith |
| Social Security Number: 123-45-6789 | Home Phone (incl. area code): (925) 838-4728 | Age | Yrs. School | Social Security Number: 987-65-4321 | Home Phone (incl. area code): (925) 838-4728 | Age | Yrs. School |
| [ ] Married  [ ] Unmarried (incl. single, divorced, widowed)  [ ] Separated | Dependents (Not listed by Co-Borrower) No. / Ages | [ ] Married  [ ] Unmarried (incl. single, divorced, widowed)  [ ] Separated | Dependents (Not listed by Co-Borrower) No. / Ages |
| Present Address (street, city, state, ZIP) 123 S. Main Street Walnut Creek, CA 94596 | [XX] Own  [ ] Rent  2 No. Years | Present Address (street, city, state, ZIP) 123 S. Main Street Walnut Creek, CA 94596 | [XX] Own  [ ] Rent  2 No. Years |

If residing at present address for less than two years, complete the following:

| Former Address (street, city, state, ZIP) | [ ] Own [ ] Rent ___ No. Years | Former Address (street, city, state, ZIP) | [ ] Own [ ] Rent ___ No. Years |
|---|---|---|---|
| Former Address (street, city, state, ZIP) | [ ] Own [ ] Rent ___ No. Years | Former Address (street, city, state, ZIP) | [ ] Own [ ] Rent ___ No. Years |

IV. EMPLOYMENT INFORMATION

| BORROWER | | | CO-BORROWER | | |
|---|---|---|---|---|---|
| Name and Address of Employer City of Walnut Creek 1800 Main St Walnut Creek, CA 94596 | [ ] Self Employed | Yrs. on this job: 3  Years employed in this line of work/profession | Name and Address of Employer Cal Trans | [ ] Self Employed | Yrs. on this job: 14  Years employed in this line of work/profession |
| Position/Title/Type of Business Manager | | Bus. Phone (incl. area code) (925) 283-1209 | Position/Title/Type of Business Supervisor | | Bus. Phone (incl. area code) (925) 809-4809 |

If employed in current position less than two years, or if currently employed in more than one position, complete the following:

| Name and Address of Employer | [ ] Self Employed | Dates (from - to)  Monthly Income $ | Name and Address of Employer | [ ] Self Employed | Dates (from - to)  Monthly Income $ |
|---|---|---|---|---|---|
| Position/Title/Type of Business | | Bus. Phone (incl. area code) | Position/Title/Type of Business | | Bus. Phone (incl. area code) |
| Name and Address of Employer | [ ] Self Employed | Dates (from - to)  Monthly Income $ | Name and Address of Employer | [ ] Self Employed | Dates (from - to)  Monthly Income $ |
| Position/Title/Type of Business | | Bus. Phone (incl. area code) | Position/Title/Type of Business | | Bus. Phone (incl. area code) |

Freddie Mac Form 65 - 10/92   Page 1 of 4   Fannie Mae Form 1003 - 10/92
This form was printed using Cypher by Sourcetec, Inc. Call (925) 937-4300 for more information.

Appendix A

MONTHLY INCOME AND COMBINED HOUSING EXPENSE INFORMATION

| Gross Monthly Income | Borrower | Co-Borrower | Total | Combined Monthly Housing Expense | Present | Proposed |
|---|---|---|---|---|---|---|
| Base Empl. Income* | $ 4,333 | $ 4,500 | $ 8,833 | Rent | $ | |
| Overtime | | | | First Mortgage (P&I) | 1,550 | $ 1,982 |
| Bonuses | | | | Other Financing (P&I) | | |
| Commissions | | | | Hazard Insurance | | 83 |
| Dividends/Interest | | | | Real Estate Taxes | | 328 |
| Net Rental Income | | | | Mortgage Insurance | | 142 |
| Other (before completing, see the notice in "describe other income," below.) | | | | Homeowner Assn. Dues | | |
| | | | | Other: | | |
| Total | $ 4,333 | $ 4,500 | $ 8,833 | Total | $ | $ 2,535 |

*Self-Employed Borrower(s) may be required to provide additional documentation such as tax returns and financial statements.

Describe Other Income Notice: Alimony, child support, or separate maintenance income need not be revealed if the Borrower (B) or Co-Borrower (C) does not choose to have it considered for repaying this loan.

VI. ASSETS AND LIABILITIES

This statement and any supporting schedules may be completed jointly by both married and unmarried Co-Borrowers if their assets and liabilities are sufficiently joined so that the statement can be meaningfully and fairly presented on a combined basis; otherwise separate statements and schedules are required. If the Co-Borrower section was completed about a spouse, this statement and supporting schedules must be completed about that spouse also.

Completed  XX Jointly  ☐ Not Jointly

Cash deposit toward purchase held by: First American — $ 1,000

Freddie Mac Form 65 - 10/92                Fannie Mae Form 1003 - 10/92

Appendix A

VI. ASSETS AND LIABILITIES (cont.)

Schedule of Real Estate Owned (if additional properties are owned, use continuation sheet)

| Property Address (enter S if sold, PS if pending sale or R if rental being held for income.) | Type of Property | Present Market Value | Amount of Mortgages & Liens | Gross Rental Income | Mortgage Payments | Insurance, Maintenance, Taxes & Misc. | Net Rental Income |
|---|---|---|---|---|---|---|---|
| | | $ | $ | $ | $ | $ | $ |
| | | | | | | | |
| | | | | | | | |
| Totals | | $ | $ | $ | $ | $ | $ |

List any additional names under which credit has previously been received and indicate appropriate creditor name(s) and account number(s)

Alternate Name　　　　　　　Creditor Name　　　　　　　Account Number

VII. DETAILS OF TRANSACTION

| | |
|---|---|
| a. Purchase Price | $ 315,000 |
| b. Alterations, improvements, repairs | |
| c. Land (if acquired separately) | |
| d. Refinance (incl. debts to be paid off) | |
| e. Estimated prepaid items | 3,640 |
| f. Estimated closing costs | 4,463 |
| g. PMI, MIP, Funding Fee | |
| h. Discount (if Borrower will pay) | |
| i. Total Costs (add items a through h) | 323,102 |
| j. Subordinate financing | |
| k. Borrower's closing costs paid by Seller | 1,000 |
| l. Other Credits (explain) | |
| m. Loan amount (exclude PMI, MIP, Funding Fee financed) | 283,500 |
| n. PMI, MIP, Funding Fee financed | |
| o. Loan amount (add m and n) | 283,500 |
| p. Cash from/to Borrower (subtract j, k, l & o from i) | 38,602 |

VIII. DECLARATIONS

If you answer "YES" to any questions a through i, please use continuation sheet for explanation

| | Borrower | | Co-Borrower | |
|---|---|---|---|---|
| | Yes | No | Yes | No |
| a. Are there any outstanding judgements against you? | | XX | | XX |
| b. Have you been declared bankrupt within the past 7 years? | | XX | | XX |
| c. Have you had property foreclosed upon or given title or deed in lieu thereof in the last 7 years? | | XX | | XX |
| d. Are you a party to a lawsuit? | | XX | | XX |
| e. Have you directly or indirectly been obligated on any loan which resulted in foreclosure, transfer of title in lieu of foreclosure, or judgement? (This would include such loans as home mortgage loans, SBA loans, home improvement loans, educational loans, manufactured (mobile) home loans, any mortgage, financial obligation, bond, or loan guarantee. If "YES," provide details, including date, name and address of Lender, FHA or VA case number, if any, and reasons for the action.) | | XX | | XX |
| f. Are you presently delinquent or in default on any Federal debt or any other loan, mortgage, financial obligation, bond, or loan guarantee? If "YES," give details as described in the preceding question. | | XX | | XX |
| g. Are you obligated to pay alimony, child support, or separate maintenance? | | XX | | XX |
| h. Is any part of the down payment borrowed? | | XX | | XX |
| i. Are you co-maker or co-endorser on a note? | | XX | | XX |
| j. Are you a U.S. citizen? | XX | | XX | |
| k. Are you a permanent resident alien? | | XX | | XX |
| l. Do you intend to occupy the property as your primary residence? | XX | | XX | |
| If "YES," complete question m. below | | | | |
| m. Have you had an ownership interest in a property in the last three years? | XX | | XX | |
| (1) What type of property did you own - primary residence (PR), second home (SH), or investment property (IP)? | PR | | PR | |
| (2) How did you hold title to the home - solely by yourself (S), jointly with your spouse (SP), or jointly with another person (O)? | SP | | SP | |

IX. ACKNOWLEDGEMENT AND AGREEMENT

The undersigned specifically acknowledge(s) and agree(s) that: (1) the loan requested by this application will be secured by a first mortgage or deed of trust on the propert described herein; (2) the property will not be used for any illegal or prohibited purpose or use; (3) all statements made in this application are made for the purpose of obtainin the loan indicated herein; (4) occupation of the property will be as indicated above; (5) verification or reverification of any information contained in this application may be mad at any time by the Lender, its agents, successors and assigns, either directly or through a credit-reporting agency, from any source named in this application, and the origin copy of this application will be retained by the Lender, even if the loan is not approved; (6) the Lender, its agents, successors and assigns will rely on the information contain in the application and I/we have a continuing obligation to amend and/or supplement the information provided in this application if any of the material facts which I/we hav represented to be true should change prior to closing; (7) in the event my/our payments on the loan indicated in this application become delinquent, the Lender, its agents, successo and assigns, may, in addition to all their other rights and remedies, report my/our name(s) and account information to a credit-reporting agency; (8) ownership of the loan ma be transferred to successor or assign of the Lender without notice to me and/or the administration of the loan account may be transferred to an agent, successor or assign of the Lender with prior notice to me; (9) the Lender, its agents, successors and assigns make no representations or warranties, express or implied, to the Borrower(s) regardi the property, the condition of the property, or the value of the property.

CERTIFICATION: I/We certify that the information provided in this application is true and correct as of the date set forth opposite my/our signature(s) on this application and acknowled my/our understanding that any intentional or negligent misrepresentation(s) of the information contained in this application may result in civil liability and/or criminal penalties includi but not limited to, fine or imprisonment or both under the provisions of Title 18, United States Code, Section 1001, et. seq., and liability for monetary damages to the Lende its agents, successors and assigns, insurers and any other person who may suffer any loss due to reliance upon any misrepresentation which I/we have made on his aplication.

| Borrower's Signature | Date | Co-Borrower's Signature | Date |
|---|---|---|---|
| X | | X | |

X. INFORMATION FOR GOVERNMENT MONITORING PURPOSES

The following information is requested by the Federal Government for certain types of loans related to a dwelling, in order to monitor the Lender's compliance with equal credit opportunity, fair housing and home mortgage disclosure laws. You are not required to furnish this information, but are encouraged to do so. The law provides that a Lender may neither discriminate on the basis of this information, nor on whether you choose to furnish it. However, if you choose not to furnish it, under Federal regulations this Lender is required to note race and sex on the basis of visual observation or surname. If you do not wish to furnish the above information, please check below. (Lender must review the above material to assure that the disclosures satisfy all requirements to which the Lender is subject under applicable state law for the particular type of loan applied for.)

BORROWER
- [ ] I do not wish to furnish this information
- Race/National Origin:
  - [ ] American Indian or Alaskan Native
  - [ ] Asian or Pacific Islander
  - [XX] vbWhite, not of Hispanic Origin
  - [ ] Black, not of Hispanic Origin
  - [ ] Hispanic
  - [ ] Other (specify) _____
- Sex: [ ] Female  [XX] Male

CO-BORROWER
- [ ] I do not wish to furnish this information
- Race/National Origin:
  - [ ] American Indian or Alaskan Native
  - [ ] Asian or Pacific Islander
  - [XX] vbWhite, not of Hispanic Origin
  - [ ] Black, not of Hispanic Origin
  - [ ] Hispanic
  - [ ] Other (specify) _____
- Sex: [XX] Female  [ ] Male To be completed by Interviewer This application was taken by:
- [ ] face-to-face interview
- [XX] by mail
- [ ] by telephone Interviewer's Name (print or type): Russell McDonald
Interviewer's Signature: _____  Date: _____
Interviewer's Phone Number (incl. area code): (925) 937-4300

Name and Address of Interviewer's Employer:
Wymac Capital, Inc.
1910 Olympic Blvd, Suite 150
Walnut Creek, CA 94596

Freddie Mac Form 65 - 10/92　　　Fannie Mae Form 1003 - 10/92
This form was printed using Cypher by Sourcetec, Inc. Call (925) 937-4300 for more information.

Appendix A

Continuation Sheet — Residential Loan Application

| Use this continuation sheet if you need more space to complete the Residential Loan Application. Mark B for Borrower or C for Co-Borrower. | Borrower: | Agency Case Number: |
|---|---|---|
| | Co-Borrower: | Lender Case Number: |

I/We fully understand that it is a Federal crime punishable by fine or imprisonment, or both, to knowingly make any false statements concerning any of the above facts as applicable under provisions of Title 18, United States Code, Section 1001, et. seq.

| Borrower's Signature: | Date: | Co-Borrower's Signature: | Date: |
|---|---|---|---|
| X | | X | |

Freddie Mac Form 65 - 10/92      Page 4 of 4      Fannie Mae Form 1003 - 10/92
This form was printed using Cypher by Sourcetec, Inc. Call (925) 937-4300 for more information.

Appendix A

STATE OF CALIFORNIA  
MORTGAGE LOAN DISCLOSURE STATEMENT/GOOD FAITH ESTIMATE  
RE 883 (New 12/93)

DEPARTMENT OF REAL ESTATE  
MORTGAGE LENDER

Borrower's Name(s): _____ John Smith and Mary Smith _____

Real Property Collateral: The intended security for this proposed loan will be a Deed of Trust on (street address or legal description) _____ 123 Main Street, Davis, CA 99999 _____

This joint Mortgage Loan Disclosure Statement/Good Faith Estimate is being provided by _____ Wymac Capital, Inc. _____, a real estate broker acting as a mortgage broker, pursuant to the Federal Real Estate Settlement Procedures Act (RESPA) and similar California law. In a transaction subject to RESPA, a lender will provide you with an additional Good Faith Estimate within three business days of the receipt of your loan application. You will also be informed of material changes before settlement/close of escrow. The name of the intended lender to whom your loan application will be delivered is:

☐ Unknown  [XX]___WYMAC CAPITAL, INC._____ (Name of lender, if known)

GOOD FAITH ESTIMATE OF CLOSING COSTS

The information provided below reflects estimates of the charges you are likely to incur at the settlement of your loan. The fees, commissions, costs and expenses listed are estimates; the actual charges may be more or less. Your transaction may not involve a charge for every item listed and any additional items charged will be listed. The numbers listed beside the estimate generally correspond to the numbered lines contained in the HUD-1 Settlement Statement which you will receive at settlement if this transaction is subject to RESPA. The HUD-1 Settlement Statement contains the actual costs for the items paid at settlement. When this transaction is subject to RESPA, by signing page two of this form you are also acknowledging receipt of the HUD Guide to Settlement Costs.

| HUD-1 | Item | Paid to Lender/Others | Paid to Broker |
|---|---|---|---|
| 800 | *Items Payable in Connection with Loan* | | |
| 801 | Lender's Loan Origination Fee _.500__% | $ 1,417.50 | $ |
| 802 | Lender's Loan Discount Fee _____% | $ | $ |
| 803 | Appraisal Fee | $ 350.00 | $ |
| 804 | Credit Report | $ 55.00 | $ |
| 805 | Lender's Inspection Fee | $ | $ |
| 808 | Mortgage Broker Commission/Fee _____% | $ | $ |
| 809 | Tax Service Fee | $ 75.00 | $ |
| 810 | Processing Fee | $ 395.00 | $ |
| 811 | Underwriting Fee | $ 250.00 | $ |
| 812 | Wire Transfer Fee | $ 20.00 | $ |
| 813 | Flood Cert | $ 20.00 | $ |
| 814 | Administration Fee | $ 200.00 | $ |
| 815 | Doc Preparation | $ 250.00 | $ |
| | | $ | $ |
| 900 | *Items Required by Lender to be Paid in Advance* | | |
| 901 | Interest for _15_ days at $ _59.06_ per day | $ 885.94 | $ |
| 902 | Mortgage Insurance Premiums | $ | $ |
| 903 | Hazard Insurance Premiums | $ 992.25 | $ |
| 904 | VA Funding Fee | $ | $ |
| | | $ | $ |
| 1000 | *Reserves Deposited with Lender* | | |
| 1001 | Hazard Insurance: _2_ months at $ 82.69 per month | $ 165.38 | $ |
| 1002 | Mortgage Insurance: _2_ months at $ 141.75 per month | $ 283.50 | $ |
| 1004 | Co. Property Taxes: _4_ months at $ 328.13 per month | $ 1,312.50 | $ |
| | | $ | $ |
| 1100 | *Title Charges* | | |
| 1101 | Settlement or Closing/Escrow Fee | $ 300.00 | $ |
| 1105 | Document Preparation Fee | $ 50.00 | $ |
| 1106 | Notary Fee | $ 40.00 | $ |
| 1109 | Title Insurance (Owner) | $ 550.00 | $ |
| 1110 | Title Insurance (Lender) | $ 450.00 | $ |
| 1111 | Courier | $ | $ |
| | | $ | $ |
| 1200 | *Government Recording and Transfer Charges* | | |
| 1201 | Recording Fees | $ 40.00 | $ |
| 1202 | City/County Tax/Stamps | $ | $ |
| | | $ | $ |
| 1300 | *Additional Settlement Charges* | | |
| 1302 | Pest Inspection | $ | $ |
| | | $ | $ |
| | Subtotals of Initial Fees, Commissions, Costs and Expenses | $ 8,102.06 | $ 0.00 |
| | Total of Initial Fees, Commissions, Costs and Expenses | $ 8,102.06 | |
| | Compensation to Broker (Not Paid Out of Loan Proceeds) | | |
| | Mortgage Broker Commission/Fee (To Be Paid By Lender) | $ | |
| | Any Additional Compensation from Lender XX No ☐ Yes | $ | |

Appendix A

ADDITIONAL REQUIRED CALIFORNIA DISCLOSURES

I. Proposed Loan Amount: $ 283,500.00
Initial Commissions, Fees, Costs and
Expenses Summarized on Page 1: $ 8,102.06

Payment of Other Obligations (List):
Credit Life and/or Disability Insurance (see VI below) $ _____
$ _____

Subtotal of All Deductions: $ 8,102.06

Estimated Cash at Closing ☐ To You ☒ That You Must Pay $ 8,102.06

II. Proposed Interest Rate: _7.500__ % ☒ Fixed Rate ☐ Initial Variable Rate

III. Proposed Loan Term: _30_____ ☒ Years ☐ Months

IV. Proposed Loan Payments: Payments of $_1,982.27____ will be made ☒ Monthly ☐ Quarterly ☐ Annually for _360_ (number of months, XXXXs, XXXX If proposed loan is a variable interest rate loan, this payment will vary (see loan documents for details).

This loan is subject to a balloon payment: ☒ No ☐ Yes. If Yes, the following paragraph applies and a final balloon payment of $_____ will be due on _____ [estimated date (day/month/year)]
NOTICE TO BORROWER: IF YOU DO NOT HAVE THE FUNDS TO PAY THE BALLOON PAYMENT WHEN IT COMES DUE, YOU MAY HAVE TO OBTAIN A NEW LOAN AGAINST YOUR PROPERTY TO MAKE THE BALLOON PAYMENT. IN THAT CASE, YOU MAY AGAIN HAVE TO PAY COMMISSIONS, FEES, AND EXPENSES FOR THE ARRANGING OF THE NEW LOAN. IN ADDITION, IF YOU ARE UNABLE TO MAKE THE MONTHLY PAYMENTS OR THE BALLOON PAYMENT, YOU MAY LOSE THE PROPERTY AND ALL OF YOUR EQUITY THROUGH FORECLOSURE. KEEP THIS IS MIND IN DECIDING UPON THE AMOUNT AND TERMS OF THIS LOAN.

V. Prepayments: The proposed loan has the following prepayment provisions.

☒ No Prepayment Penalty.

☐ Other (see loan documents for details).

☐ Any payment of principal in any calendar year in excess of 20% of the ☐ original balance ☐ unpaid balance will include a penalty not to exceed _____ months advance interest at the note rate, but not more than the interest that would be charged if the loan were paid to maturity (see loan documents for details).

VI. Credit Life and/or Disability Insurance: The purchase of credit life and/or disability insurance by a borrower is NOT required as a condition of making this proposed loan.

VII. Other Liens: Are there liens currently on this property for which the borrower is obligated? ☒ No ☐ Yes
If Yes, describe below:

*Lienholder's Name*                     *Amount Owing*                *Priority*
_____
_____

Liens that will remain or are anticipated on this property after the proposed loan for which you are applying is made or arranged (including the proposed loan for which you are applying):

*Lienholder's Name*                     *Amount Owing*                *Priority*
WYMAC CAPITAL, INC.                      $ 283,500                    FIRST NOTICE TO BORROWER: Be sure that you state the amount of all liens as accurately as possible. If you contract with the broker to arrange this loan, but it cannot be arranged because you did not state these liens correctly, you may be liable to pay commissions, costs, fees, and expenses even though you do not obtain the loan.

VIII. Article 7 Compliance: If this proposed loan is secured by a first deed of trust in a principal amount of less than $30,000 or secured by a junior lien in a principal amount of less than $20,000, the undersigned licensee certifies that the loan will be made in compliance with Article 7 of Chapter 3 of the Real Estate Law.

A. This loan ☐ may ☐ will ☒ will not be made wholly or in part from broker controlled funds as defined in Section 1024(j) of the Business and Professions Code.
B. If the broker indicates in the above statement that the loan "may" be made out of broker-controlled funds, the broker must inform the borrower prior to the close of escrow if the funds to be received by the borrower are in fact broker-controlled funds.

WYMAC CAPITAL, INC. License #01121628
1910 Olympic Blvd., Suite 150                    Broker's Representative          License #
Walnut Creek, CA 94596

_____        OR   _____
Signature of Broker          Date                 Signature of Representative       Date IX. NOTICE TO BORROWER: THIS IS NOT A LOAN COMMITMENT. Do not sign this statement until you have read and understood all of the information in it. All parts of this form must be completed before you sign. Borrower hereby acknowledges the receipt of a copy of this statement.

_____        _____
John Smith                   Date                 Mary Smith                       Date Review completed on _____ by _____    _____
                    Date         Broker or Designated Representative     DRE License Number Appendix A

Wymac Capital, Inc.
*1910 Olympic Blvd, Suite 150, Walnut Creek, CA 94596*
*(925) 937-4300   FAX (925) 932-1544*

INFORMATION DISCLOSURE AUTHORIZATION

TO WHOM IT MAY CONCERN:

I/We hereby authorize you to release to Wymac Capital, Inc., its credit agencies, or its assign, the following information for the purpose of verification:

Employment History, Dates, Title, Income, Hours, etc.

Banking and Savings Accounts of Record

Mortgage Loan Ratings (opening date, high credit, payment amount, loan balance and payment record)

Any other information deemed necessary in connection with a consumer or business credit report for transactions which involve Real or Personal property.

This information is for confidential use in compiling a mortgage loan credit file for a V.A., F.H.A. or Conventional home loan or business loan.

A photographic or carbon copy of this authorization (being a valid copy of the signature(s) of the undersigned) may be deemed to be the equivalent of the original and may be used as a duplicate original.

Your prompt reply will help expedite my transaction.

Thank You.

_John Smith_____          _Mary Smith_____
Name (Print or Type)                 Name (Print or Type)

_____  _____    _____  _____
Signature                Date       Signature                Date _123-45-6789_____          _987-65-4321_____
Social Security #                    Social Security #

_____              _____
Date of Birth                        Date of Birth

_123 S. Main Street - Walnut Creek, CA  94596_____
                              Address ---
This form was printed using Cypher by Sourcetec, Inc. Call (925) 937-4300 for more information.

Appendix A

Wymac Capital, Inc.
1910 Olympic Blvd, Suite 150, Walnut Creek, CA 94596
(925) 937-4300   FAX (925) 932-1544

FAIR LENDING NOTICE

THIS IS REQUIRED BY THE STATE OF CALIFORNIA:

TO: ALL APPLICANTS FOR A LOAN FOR THE PURCHASE, CONSTRUCTION, REHABILITATION, IMPROVEMENT OR REFINANCING OF A ONE-TO-FOUR FAMILY RESIDENCE.

UNDER THE HOUSING FINANCIAL DISCRIMINATION ACT OF 1977, IT IS UNLAWFUL FOR A FINANCIAL INSTITUTION TO REFUSE TO MAKE A LOAN OR TO OFFER LESS FAVORABLE TERMS THAN NORMAL (SUCH AS A HIGHER RATE, LARGER DOWN PAYMENT OR SHORTER MATURITY) BASED ON ANY OF THE FOLLOWING CONSIDERATIONS:

1. NEIGHBORHOOD CHARACTERISTICS (SUCH AS THE AVERAGE AGE OR THE INCOME LEVEL OF THE NEIGHBORHOOD) EXCEPT TO A LIMITED EXTENT NECESSARY TO AVOID AN UNSAFE AND UNSOUND BUSINESS PRACTICE.
2. RACE, SEX, COLOR, RELIGION, MARITAL STATUS, NATIONAL ORIGIN OR ANCESTRY.

IT IS ALSO UNLAWFUL TO CONSIDER, IN APPRAISING A RESIDENCE, THE RACIAL, ETHNIC OR RELIGIOUS COMPOSITION OF A PARTICULAR NEIGHBORHOOD, WHETHER OR NOT SUCH COMPOSITION IS UNDERGOING CHANGE OR IS EXPECTED TO UNDERGO CHANGE.

IF YOU WISH TO FILE A COMPLAINT OR IF YOU HAVE QUESTIONS ABOUT YOUR RIGHTS, CONTACT:

| NORTHERN CALIFORNIA OFFICES | SOUTHERN CALIFORNIA OFFICES |
|---|---|
| DEPARTMENT OF REAL ESTATE | DEPARTMENT OF REAL ESTATE |
| 185 BERRY STREET, ROOM #5816 | 107 SOUTH BROADWAY, ROOM #8107 |
| SAN FRANCISCO, CA 94107 | LOS ANGELES, CA 90012 |

IF YOU FILE A COMPLAINT, THE LAW REQUIRES THAT YOU RECEIVE A DECISION WITHIN THIRTY (30) DAYS.

THIS IS REQUIRED BY THE FEDERAL GOVERNMENT:

TO OUR APPLICANTS:

Wymac Capital, Inc. DOES NOT DISCRIMINATE IN LENDING ON THE BASIS OF RACE, COLOR, RELIGION, NATIONAL ORIGIN, AGE, SEX OR MARITAL STATUS.

YOU ARE HEREBY PROVIDED THE FOLLOWING "EQUAL CREDIT OPPORTUNITY ACT NOTICE" REQUIRED UNDER SECTION 202.4(D), 12 C.F.R.:

THE FEDERAL EQUAL CREDIT OPPORTUNITY ACT PROHIBITS CREDITORS FROM DISCRIMINATING AGAINST CREDIT APPLICANTS OF THE BASIS OF RACE, COLOR, RELIGION, NATIONAL ORIGIN, SEX, AGE OR MARITAL STATUS (PROVIDED THE APPLICANT HAS THE CAPACITY TO ENTER INTO A BINDING CONTRACT); BECAUSE ALL OR PART OF THE APPLICANT'S INCOME IS DERIVED FROM ANY PUBLIC ASSISTANCE PROGRAM; OR BECAUSE THE APPLICANT HAS IN GOOD FAITH EXERCIZED ANY RIGHT UNDER THE CONSUMER CREDIT PROTECTION ACT. THE FEDERAL AGENCY THAT ADMINISTERS COMPLIANCE WITH THE LAW CONCERNING THIS MORTGAGE COMPANY IS:

FEDERAL TRADE COMMISSION
13209 FEDERAL BUILDING
11000 WILSHIRE BOULEVARD
LOS ANGELES, CA 90024

I/WE RECEIVED A COPY OF THIS NOTICE:

| John Smith | DATE | Mary Smith | DATE |
|---|---|---|---|

Fair Lending Notice
This form was printed using Cypher by Sourcetec, Inc., Call (925) 937-4300 for more information.

Appendix A

Wymac Capital, Inc.
*1910 Olympic Blvd, Suite 150, Walnut Creek, CA 94596*
*(925) 937-4300   FAX (925) 932-1544*

COPY OF REAL PROPERTY APPRAISAL REPORT

YOU HAVE A RIGHT TO A COPY OF THE REAL PROPERTY APPRAISAL REPORT TO BE OBTAINED IN CONNECTION WITH THE LOAN FOR WHICH YOU ARE APPLYING, PROVIDED THAT YOU HAVE PAID FOR THE APPRAISAL. IF YOU WISH TO OBTAIN A COPY OF THE APPRAISAL REPORT, PLEASE SUBMIT A WRITTEN REQUEST TO THE FOLLOWING ADDRESS:

Wymac Capital, Inc.
1910 Olympic Blvd, Suite 150
Walnut Creek, CA 94596

THE SIGNATURE BELOW ACKNOWLEDGES YOUR RECEIPT OF THIS NOTICE OF YOUR RIGHT TO A COPY OF THIS APPRAISAL REPORT.

_____

_____

THE APPRAISAL REPORT IS PREPARED BY A LICENSED OR CERTIFIED REAL ESTATE APPRAISER WHO IS INDEPENDENT OF YOUR LOAN BROKER AND REAL ESTATE LENDER. NEITHER THE LOAN BROKER NOR LENDER PARTICIPATES IN THE PREPARATION OF THE APPRAISAL REPORT AND THEY ASSUME NO RESPONSIBILITY FOR ERRORS OR OMISSIONS IN ITS PREPARATION. THE APPRAISAL REPORT IS PREPARED SOLELY FOR USE IN UNDERWRITING YOUR LOAN APPLICATION. NEITHER YOU NOR ANY THIRD PARTY SHOULD USE OR RELY UPON THE APPRAISAL REPORT FOR ANY OTHER PURPOSE.

This form was printed using Cypher by Sourcetec, Inc. Call (925) 937-4300 for more information.

Appendix A

| Form 4506 | Request for Copy or Transcript of Tax Form | OMB No. 1545-0429 |
|---|---|---|
| (Rev. May 1997)<br>Department of the Treasury<br>Internal Revenue Service | ▶ Read instructions before completing this form.<br>▶ Type or print clearly. Request may be rejected if the form is incomplete or illegible. | |

NOTE: Do not use this form to get tax account information. Instead, see instructions below.

| 1a | Name shown on tax form. If a joint return, enter name shown first.<br>John Smith | 1b | First social security number on tax form or employer identification number (see instructions)<br>123-45-6789 |
|---|---|---|---|
| 2a | If a joint return, spouse's name shown on tax form<br>Mary Smith | 2b | Second social security number on tax form<br>987-65-4321 |

3  Current name, address (including apt., room, or suite no.), city, state and ZIP code

123 S. Main Street, Walnut Creek, CA 94596

4  Address, (including apt., room, or suite no.), city, state, and ZIP code shown on last return filed if different from line 3

5  If copy of form or a tax return transcript is to be mailed to someone else, enter third party's name and address 6  If we cannot find a record of your tax return and you want the payment returned to the third party, check here ☐

7  If name in third party's records differs from line 1a above, enter that name here (see intstructions) ▶

8  Check only one box to show what you want. There is no charge for items 8a, b, and c:
  a ☐ Tax return transcript of Form 1040 series filed during the current calendar year and the 3 prior calendar years (see instructions).
  b ☐ Verification of nonfiling
  c ☐ Form(s) W-2 information (see instructions).
  d ☐ Copy of tax form and all attachments (including Form(s) W-2, schedules, or other forms). The charge is $23 for each period requested.
     NOTE: If these copies must be certified for court or administrative proceedings, see instructions and check here ☐

9  If this request is to meet one of the following, check all boxes that apply.
   ☐ Small Business Administration   ☐ Department of Education   ☐ Department of Veterans Affairs   ☐ Financial Institution

| 10 | Tax form number (Form 1040, 1040A, 941, etc.) | 12 | Complete only if line 8d is checked. Amount due: | |
|---|---|---|---|---|
| | | | a Cost for each period | |
| 11 | Tax period(s) (year or period ended date). If more than four, see instructions. | | b Number of tax periods requested on line 11 | |
| | | | c Total cost. Multiply line 12a by line 12b | |
| | | | Full payment must accompany your request. Make check or money order payable to "Internal Revenue Service." | |

CAUTION: Before signing, make sure all items are complete and the form is dated.

I declare that I am either the taxpayer whose name is shown on line 1a or 2a, or a person authorized to obtain the tax information requested. I am aware that upon this form, the IRS will release the tax information requested to any party shown on line 5. The IRS has no control over what that party does with the information.

| | | | Telephone number of requeste |
|---|---|---|---|
| Signature. See instructions. If other than taxpayer, attach authorization document. | | Date | Best time to call |
| Title (if line 1a above is a corporation, partnership, estate, or trust) | | | TRY A TAX RETURN TRANSCRIP (see line 8a instructions) |
| Spouse's signature | | Date | |

Instructions

*Section references are to the Internal Revenue Code.*

TIP: If you had you tax form filled in by a paid preparer, check first to see if you can get a copy from the preparer. This may save you both time and money.

Purpose of Form.-- Use form 4506 to get a tax return transcript, verification that you did not file a Federal tax return, Form W-2 information, or a copy of a tax form Allow 6 weeks after you file a tax form before you request a copy of it or a transcript. For W-2 information, wait 13 months after the end of the year in which the wages were earned. For example, wait until Feb. 1999 to request W-2 information for wages earned in 1997

DO NOT use this form to request Forms 1099 or tax account information. See this page for details on how to get these items NOTE: Form 4506 must be received by the IRS within 60 calendar days after the date you signed and dated the request.

How Long Will It Take? -- You can get a tax return transcript or verification of nonfiling within 7 to 10 workdays after the IRS receives your request. It can take up to 60 calendar days to get a copy of a tax form or W-2 information. To avoid any delay, be sure to furnish all the information asked for on Form 4506.

Forms 1099 -- If you need a copy of a Form 1099, contact the payer. If the payer cannot help you, call or visit the IRS to get Form 1099 information.

Tax Account Information -- If you need a statement of your tax account showing any later changes that you or the IRS made to the original return, request tax account information. Tax account information lists

*(Continued)*

For Privacy Act and Paperwork Reduction Act Notice, see page 2 of form.

Form 4506 (Rev. 5-97)

This form was printed using Cypher by Appendix A (5) 937-4300 for more information.

MERITAGE HOMES/WYMAC CAPITAL, INC.

DISCLOSURE STATEMENT

NOTICE

TO: John Smith and Mary Smith  Property: 123 Main Street

Davis, CA 99999

FROM: Meritage Homes/Wymac Capital, Inc.  Date: _____

This is to give you notice that Meritage Homes (hereinafter referred to as Meritage) has a business relationship with Wymac Capital, Inc. (hereinafter referred to as Wymac). Meritage will assist Wymac in the arranging of financing for you. For this assistance, Wymac will pay Meritage 0.5% of the amount of the loan arranged for you by Wymac upon the closing of the loan.

In accordance to the agreement between Meritage and Wymac, Meritage will disclose their estimate of all settlement costs, including compensation to be paid to Meritage. YOU ARE NOT REQUIRED TO USE WYMAC CAPITAL, INC. AS A CONDITION FOR PURCHASING YOUR HOME. THERE ARE OTHER MORTGAGE SOURCES AVAILABLE TO YOU. YOU ARE FREE TO SHOP AROUND TO DETERMINE THAT YOU ARE RECEIVING THE BEST SERVICES AND THE BEST RATES FOR THESE SERVICES.

The entire loan process is complicated and requries confirmation and verification of data you will provide. Underwriting guidelines vary by lenders and can be changed at any time without notice. You agree to look to Wymac for their expertise of the loan procedures and to hold Meritage and its agents harmless regarding your mortgage. You also agree to hold Wymac and its agents harmless regarding anything to do with the construction of your home.

*Acknowledgement*

I/we have read this disclosure and have been given:
- a. A Good Faith Estimate of Closing Costs;
- b. An Appraisal Disclosure Statement;
- c. A Mortgage (Broker) Disclosure Statement;
- d. An Information Disclosure Authorization form;
- e. An IRS Form 4506;
- f. A Fair Lending Notice;
- g. A Settlement Cost booklet; and
- h. A Consumer Handbook on Adjustable Rate Mortgages and I/we understand Meritage is referring me/us to Wymac for the purposes of obtaining a mortgage and Meritage will be paid 0.5% of the loan amount if my/our loan closes.

_____  _____
Signed                          Date

John Smith
Print/Type Name

_____  _____
Signed                          Date

Mary Smith
Print/Type Name

---

Meritage Homes/Wymac Capital, Inc. Disclosure Statement
This form was printed using Cypher by Sourcetec, Inc. Call (925) 937-4300 for more information.

Appendix A

*Wymac Capital, Inc.*
*1910 Olympic Blvd, Suite 150, Walnut Creek, CA 94596*
*(925) 937-4300   FAX (925) 932-1544*

DISCLOSURE REGARDING ASSETS AND LIABILITIES

Borrower(s) acknowledge(s) that he/she/they will be signing a preliminary loan application with the assets and liabilities left blank (page 2). Wymac Capital, Inc. will insert the numbers for assets from the bank statements and investment statements given to Wymac Capital, Inc. Wymac Capital, Inc. will also put in the liabilities, as stated on your credit report. After completing page 2 of the application, Wymac Capital, Inc. will send page 2 to you for you to initial and return promptly to Wymac Capital, Inc.

Furthermore, if additional information is required in other sections of the loan application, Wymac Capital, Inc. will contact you by telephone and make any needed additions or corrections and forward the appropriate pages for you to initial or sign.

Acknowledged:

_____
John Smith

_____
Mary Smith

---

This form was printed using Cypher by Sourcetec, Inc. Call (925) 937-4300 for more information.

Appendix A

THINGS YOU CAN DO TO EXPEDITE THE LOAN PROCESS

1. When Meritage or Wymac call you, please take the call whenever possible. If you cannot take the call, please return the call as quickly as possible. Sometimes we need a 10 second answer to a question and your loan file cannot move along until we have the answer.
2. When we request information or documentation, please get it to us as soon as possible, so your loan can be underwritten quickly.

WARNING! - The following items can jeopardize your loan, even if it is already approved. You need to understand these points!

3. During the loan process, please DO NOT incur any new debt or take on any major financial commitments without talking to us first. Do not co-sign for anyone else's debts, etc. The last two things a lender typically does before funding your loan are: a) call your employer to confirm you are still employed; and b) pull one more credit report to make sure you are still paying your bills on time and you have incurred no new debt.
4. Pay all your debts on time. Any late payments after a loan approval can void the approval.
5. DO NOT change employment without talking to us first. We need to make certain the change is documented correctly, so it will not have a negative impact on getting your loan. Also, in some cases, even if you make more money at a new position it can cause your loan approval to be revoked and make it difficult to get a new loan.
6. DO NOT move large blocks of assets (stocks, bonds, mutual funds, CD's, checking, and savings accounts, etc.) without THOROUGH documentation. This means that you need to keep copies of all statements from the old and new accounts, copies of the checks or transfers to the new accounts and copies of the deposit receipts into the new accounts. If you cannot provide a proper paper trail the lender may not recognize the assets and your loan approval may be withdrawn.
7. If you receive any gift funds or bonuses or make any other deposits that are larger than a normal paycheck, THOROUGHLY document this transaction as well. Keep copies of any and all checks and deposit receipts and know that the party you receive the money from may also have to verify the reason it was given.

By signing below you acknowledge that you have read and understood the preceding information and understand that your failure to perform can jeopardize any loan approval and may significantly alter the rates and terms of any future loan approval. If you cause your loan approval to be voided and we are unable to obtain a new approval you may also loose any deposit monies on the house, as well as deposits for any options and/or upgrades you have selected.

Acknowledged:

_____  _____    _____  _____
John Smith                      Date      Mary Smith                      Date

---

This form was printed using Cypher by Sourcetec, Inc. Call (925) 937-4300 for more information.

Appendix A

GENERAL MORTGAGE INFORMATION

Conforming/Jumbo/Super Jumbo

For borrowers with excellent credit and excellent debt ratios, the best rates will be conforming loans. Conforming loans max out at $240,000. Jumbo rates are next, maxing out at $650,000 and then super jumbo rates. All loans will have adjustments for: loan-to-value, what type of documentation is used to underwrite the loan, etc.

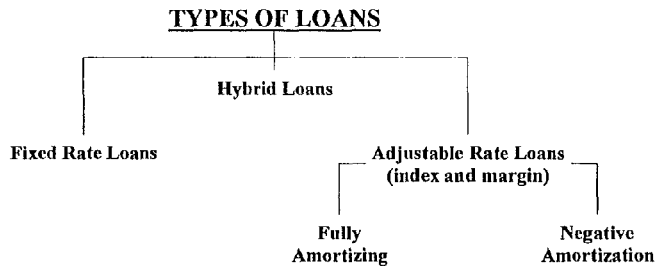

FIXED RATE LOANS: Fixed rate loans keep the initial rate for the entire term of the loan, while market interest rates go up and down.

ADJUSTABLE RATE LOANS: All adjustable rate loans have two components, the index and the margin. The margins are established when the loan is locked-in and usually will not change for the entire life of the loan. The index is also chosen when the loan is locked-in (i.e. T-Bill, LIBOR, Prime, 11th District Cost of Funds, etc.) and will fluctuate over the life of the loan. If your adjustable rate loan is fully amortizing, it will recalculate your payment on each adjustment date (i.e. monthly, quarterly, semi-annually or annually).

With a negative amortizing loan, payments are usually lower than the fully-indexed adjustable loan, but your principal will grow and you may owe more than you borrowed. Lenders will only allow your negative amortizing loan to go negative for a certain amount of time (determined by the sooner of a set time period or a maximum loan amount) and then it will become fully amortizing.

HYBRID LOANS: Hybrid loans are a mixture of fixed and adjustable. Rates on these loans will be fixed for 2,3,5,7 or 10 years, and then become adjustable.

Generally closing costs will not vary from loan to loan, except possibly in the points being charged to lower the interest rate.

The above information has been explained to me.

_____ ____ _____ ____
John Smith                Date    Mary Smith                Date

---

This form was printed using Cypher by Sourcetec, Inc. Call (925) 937-4300 for more information.

Appendix A

THE LOAN PROCESS

The following outlines some of the steps to obtaining a mortgage loan:

1. You will fill out and sign the loan application and various loan forms.

2. The origination package will be gathered by Meritage and submitted to Wymac Capital, Inc.

3. Wymac will contact you directly to complete any portion of the application package that needs more information and confirm the type of loan you desire.

4. Wymac will immediately verify your employment with your employer, verify your deposits with your bank, verify your present mortgage, order your credit report, process your loan, etc.

5. Wymac will inform Meritage as to your qualifications on obtaining a loan.

6. Meritage/Wymac will order the appraisal on your behalf.

7. Wymac will redo items in #4 above, then submit your loan packet to one of their institutional lenders/investors for a final underwriting and approval. All verifications and appraisals must be current at this time.

8. The lender/investor will either reject your loan request or suspend your loan request for lack of information, or approve your loan request with certain conditions to be met.

9. Most of the conditions will be satisfied by Meritage/Wymac. Meritage/Wymac will contact you about any conditions that Meritage/Wymac needs your help in meeting.

10. Wymac will order the loan documents from lender/investor.

11. Lender/investor will be ready to fund your loan when conditions are met.

_____  _____   _____  _____
John Smith                Date     Mary Smith               Date This form was printed using Cypher by Sourcetec, Inc. Call (925) 937-4300 for more information.

Appendix A

*Wymac Capital, Inc.*

1910 Olympic Blvd., Suite 150 * Walnut Creek, CA 94596
(925) 937-4300 * FAX (925) 932-1544

PROPERTY INFORMATION

INSURANCE

COMPANY/POLICY #

AGENT/PHONE

ANNUAL/MONTHLY PAYMENT AMOUNT

OTHER INFORMATION

HOME OWNER INFORMATION

PROPERTY TYPE/PUD/CONDO/COOP/ETC

ASSOCIATION NAME/ADDRESS

CONTACT NAME (MANAGEMENT CO?) ADDRESS/PHONE

MONTHLY DUES/INCLUDE HAZARD INSURANCE?

This form was printed using Cypher by Sourcetec, Inc. Call (925) 937-4300 for more information.

Appendix A

MORTGAGE LOAN ORIGINATION AGREEMENT
(REV 3/98)

You (the applicant) agree to enter into this Mortgage Loan Origination Agreement with Wymac Capital, Inc. as an independant contractor to apply for a residential mortgage loan from a participating lender with which we from time to time contract upon such terms and conditions as you may request or a lender may require. You inquired into mortgage financing with Wymac Capital, Inc. on _____. We are licensed as a "Mortgage Broker" by the California Department of Real Estate.

SECTION 1. NATURE OF RELATIONSHIP. In connection with your mortgage loan:

* We are acting as an independant contractor and not as your agent.
* We will enter into separate independant contractor agreements with various lenders.
* While we seek to assist you in meeting your financial needs, we do not distribute the products of all lenders or investors in the market and cannot guarantee the lowest price or best terms available in the market.

SECTION 2. OUR COMPENSATION. The lenders whose loan products we distribute generally provide their products to us at a wholesale rate.

* The retail price we offer you-your interest rate, total points, and fees-will include our compensation.
* In some cases we may be paid all of our compensation by either you or the lender.
* Alternatively, we may be paid a portion of our compensation by both you and the lender. For example, in some cases, if you would rather pay a lower interest rate, you may pay higher up front points and fees.
* Also, in some cases, if you would rather pay less up-front, you may be able to pay some or all of our compensation indirectly through a higher interest rate in which case we will be paid by the lender.

We may also be paid by the lender based on (i) the Value of the Mortgage Loan or related servicing rights in the market place or (ii) other services, goods, or facilities performed or provided by us to the lender.

By signing below, the applicant(s) acknowledge(s) receipt of a copy of this signed Agreement.

Wymac Capital, Inc.                    Applicant(s)

_____                    _____
By                                         John Smith                Date 123 S. Main Street
                                           Walnut Creek, CA  94596
_____                    _____
Date                                       Address _____
                                           Mary Smith                Date 123 S. Main Street
                                           Walnut Creek, CA  94596
                                           _____
                                           Address

---

This form was printed using Cypher by Sourcetec, Inc. Call (925) 937-4300 for more information.

Appendix A

MORTGAGE BROKER FEE DISCLOSURE

You have applied to us - a mortgage broker - for a residential mortgage loan. We will submit your application for a residential mortgage loan to a participating lender with which it from time to time contracts upon such terms and conditions as you may request or a lender may require. The lenders have asked that this form be furnished to you to clarify the role of mortgage brokers. This form supplements other disclosures or agreements required by law that you should receive from us concerning your application.

SECTION 1. NATURE OF RELATIONSHIP. In connection with this mortgage loan:

- We have seperate independent contractor agreements with various lenders.
- While we seek to assist you in meeting your financial needs, we do not distribute the products of all lenders or investors in the market and cannot guarantee the lowest price or best terms available in the market.

SECTION 2. THE BROKER'S COMPENSATION. The lenders whose loan products are distributed by us generally provide their loan products to us at a wholesale rate.

- The retail price we offer you -- your interest rate, total points and fees -- will include our compensation.
- In some cases, we may be paid all our compensation be either you or the lender.
- Alternatively, we may be paid a portion of our compenstaion by both you and the lender. For example, in some cases, if you would rather pay a lower interest rate, you may pay higher up-front points and fees.
- Also, in some cases, if you would rather pay less up-front, you may wish to have some or all of our fees; paid directly by the lender, which will result in a higher interest rate and higher monthly loan payments that you would otherwise be required to pay.
- We also may be paid by the lender based on (i) the value of the Mortgage Loan or related servicing rights in the market place or (ii) other services, goods or facilities performed or provided by us to the lender.

*You may work with us to select the method in which we receive our compensation depending on your financial needs, subject to the lender's loan program requirements and credit underwriting guidelines.*

The amount of fees and charges that you pay in connection with your loan will be estimated on your Good Faith Estimate. The final amounts will be disclosed on your HUD-1 or HUD-1A Settlement Statement.

By signing below, the applicant(s) acknowledge that you have read and understand this document. By your signature, you also acknowledge that you have received a copy of this document.

_____
Date

APPLICANT(S)                              WYMAC CAPITAL, INC.

John Smith                                Peter Moss
_____                 _____
Printed Name                              Printed Name (Broker/Agent)

_____                 _____
Signature                                 Signature

---

This form was printed using Cypher by Sourcetec, Inc. Call (925) 937-4300 for more information.

Appendix A

CALIFORNIA MORTGAGE LOAN ORGANIZATION AGREEMENT

You, the applicant(s), agree to enter into this Mortgage Loan Origination Agreement with WYMAC CAPITAL, INC., as your agent to apply for a residential mortgage loan from a participating lender with which we may from time to time contract upon such terms and conditions as you may request or a lender may require. You inquired into a mortgage financing with WYMAC CAPITAL, INC. on _____ (date). We are liscensed as a "mortgage Broker" under California Department of Real Estate.

SECTION 1. NATURE OF RELATIONSHIP. In connection with this mortgage loan we are acting as your agent; and, unless our relationship involves a federally related mortgage loan, we will provide to you a Mortgage Loan Disclosure Statement within three days of application outlining certain specific terms and conditions of our relationship. We will enter into seperate independent contractor agreements with various lenders. While we seek to assist you in meeting your financial needs, we do not distribute the products of all lenders or investors in the market and cannot guarantee the lowest price or best terms available in the market.

SECTION 2. OUR COMPENSATION. The lenders whose loan products we distribute generally provide their loan products to us at a wholesale rate. The retail price we offer you for your interest rate, total points, and fee - will include our compensation. In some cases, we may be paid all our compensation by either you or the lender. Alternativley, we may be paid a portion of our compensation by both you and the lender. For example, in some cases if you would rather pay a lower interest rate, you may pay higher up-front points and fees. Also, in some cases, if you would rather pay less up-front points and fees, you may be able to pay some or all of our compensation indirectly through a higher interest rate in which case we will be paid directly by the lender. We also may be paid by the lender based on (1) the value of the Mortgage Loan or related servicing rights in the market place or (2) other service, goods or facilities performed or provided by us to the lender.

By signing below, applicant(s) acknowledge receipt of a copy of this Agreement.

Mortgage Loan Origination Applicant(s)

| | |
|---|---|
| Borrower 1: _____ | Borrower 2: _____ |
| Print Name: John Smith | Print Name: Mary Smith |
| Date: _____ | Address: 123 S. Main Street |
| | Walnut Creek, CA 94596 |

| | |
|---|---|
| WYMAC CAPITAL, INC. | |
| Print Name (Broker/Agent): | Peter Moss |
| Signature: | |
| Address: | 1910 Olympic Blvd., Suite 150<br>Walnut Creek, CA 94596 |

This form was printed using Cypher by Sourcetec, Inc. Call (925) 937-4300 for more information.

Appendix A

MORTGAGE BROKER FEE DISCLOSURE

You have applied to a mortgage broker for a residential mortgage loan. The mortgage broker will submit your application for a residential mortgage loan to a participating lender with which it from time to time contracts upon such terms and conditions as you may request or a lender may require. The lenders have asked that this form be furnished to you to clarify the role of mortgage brokers. This form supplements other disclosures or agreements required by law that you should receive from the mortgage broker concerning your application

SECTION 1. NATURE OF RELATIONSHIP. In connection with this mortgage loan:

* The mortgage broker may be acting as independent contractor and not your agent. If you are unsure of the nature of your relationship, please ask the mortgage broker for clarification.
* While the mortgage broker seeks to assist you in meeting your financial needs, it does not distribute the products of all lenders or investors in the market and cannot guarantee the lowest price or best terms available in the market.

SECTION 2. THE BROKER'S COMPENSATION The lenders whose loan products are distributed by the mortagage broker generally provide their loan products to the mortgage broker at a wholesale rate.

* The retail price a mortgage broker offers you - your interest rate, total points and fees - will include the broker's compensation.
* In some cases, the mortgage broker may be paid all of its compensation by either you or the lender.
* Alternatively, the mortgage broker may be paid a portion of its compensation by both you and the lender. For example, in some cases, if you would rather pay a lower interest rate, you may pay higher provided by the mortgage broker to the lender.

*You may work with the mortgage broker to select the method in which it receives its compensation depending on your financial needs, subject to the lender's loan program requirement and credit underwriting guidelines.*

The amount of fees and charges that you pay in connection with your loan will be estimated on you Good Faith Estimate. The final amounts will be disclosed on your HUD-1 or HUD-1A Settlement Statement.

By signing below, the applicant(s) acknowledge that you have read and understand this document. By your signature, you also acknowledge that you have received a copy of this document.

APPLICANT(S)

John Smith
_____
Printed Name

_____
Date

_____
Signature

WYMAC CAPITAL, INC.

Mary Smith
_____
Printed Name

Peter Moss
_____
Printed Name (Broker/Agent)

_____
Signature

_____
Signature

---

This form was printed using Cypher by Sourcetec, Inc. Call (925) 937-4300 for more information.

Appendix A

*Wymac Capital, Inc.*
Proprietary-- Mortgage Loan Stacking Order Checklist

|  | Enclosed | N/A | Date Expected |
|---|---|---|---|
| $20 check, payable to Credit Internet** | ☐ | ☐ | _____ |
| Loan Application* | ☐ |  | _____ |
| Good Faith Estimate* | ☐ |  | _____ |
| Fair Lending Notice* | ☐ |  | _____ |
| Information Disclosure Authorization* | ☐ |  | _____ |
| Appraisal Report Disclosure* | ☐ |  | _____ |
| IRS Form 4506* | ☐ |  | _____ |
| Lender Disclosure Statement* | ☐ |  | _____ |
| Disclosure on Assets/Liabilities* | ☐ |  | _____ |
| Disclosure on "THE LOAN PROCESS"*** Signed by Buyer/Borrower | ☐ |  | _____ |
| Disclosure on "THINGS YOU CAN DO TO EXPEDITE THE LOAN PROCESS"*** Signed by Buyer/Borrower | ☐ |  | _____ |
| Disclosure on "GENERAL MORTGAGE INFORMATION"*** Signed by Buyer/Borrower | ☐ |  | _____ |
| Mortgage Disclosure Agreements (4)*** | ☐ |  | _____ |
| Purpose of Refinance*** | ☐ |  | _____ |
| ITEMS NOT REQUIRING BORROWERS' SIGNATURES |  |  |  |
| Bank Statements (3 months: all pages) | ☐ | ☐ | _____ |
| Brokerage Statements (401K/IRA/Keogh/Pension) | ☐ | ☐ | _____ |
| Most Current Pay Stubs (covering a month) | ☐ | ☐ | _____ |
| W-2s (2 years) | ☐ | ☐ | _____ |
| Federal Tax Returns (2 years) | ☐ | ☐ | _____ |
| Property Information (insurer & HOA)*** | ☐ | ☐ | _____ |
| ITEMS THAT SHOULD BE RETURNED, IF APPLICABLE |  |  |  |
| Corporate Financials (2 years) | ☐ | ☐ | _____ |
| Partnership Financials (2 years) | ☐ | ☐ | _____ |
| Corporate YTD Financials | ☐ | ☐ | _____ |
| Partnership YTD Financials | ☐ | ☐ | _____ |
| Corporate Tax Returns | ☐ | ☐ | _____ |
| Partnership Tax Returns | ☐ | ☐ | _____ |
| Final Divorce Decree | ☐ | ☐ | _____ |
| Bankruptcy Papers | ☐ | ☐ | _____ |

\*    Items generated by Wymac Capital, Inc. through the Cypher(TM) software
\*\*   CPA is responsible for sending this, if client has not supplied
\*\*\*  Items in master loan packet; plus C.O.D. forms for CPA fax for the appraisal

Appendix A

The invention claimed is:

1. A system comprising:
   a graphical user interface adapted to receive loan application data from a loan originator regarding a loan customer, wherein the receipt of loan application data is a first loan originator service;
   one or more storage devices adapted to store the loan application data;
   one or more additional graphical user interfaces for receiving additional data, the receipt of the additional data coordinated by the loan originator, wherein the receipt of additional data is a second loan originator service;
   a processor adapted to generate a loan application based on the loan application data and the additional data; and
   a loan application transfer interface that electronically transfers the loan application to a computer associated with a lender, wherein first and second loan originator services are not duplicative of a lender's services such that the loan originator qualifies for compensation under one or more of:
   a law regulating loan origination compensation,
   a regulation regulating loan origination compensation,
   a guideline relating to loan origination compensation, and
   a licensing requirement regulating loan origination compensation.

2. The system of claim 1, wherein the additional data comprises credit data about the loan customer.

3. The system of claim 1, wherein the additional data comprises:
   an underwriting decision based upon the loan application data and the additional data, the receipt of the underwriting decision coordinated by the loan originator, wherein the a loan application is further based upon the underwriting decision.

4. The system of claim 1, wherein the loan originator is not the loan customer.

5. The system of claim 4, wherein the loan originator is:
   a real estate broker,
   a real estate agent,
   a home builder,
   a member of a relocation company,
   a financial planner,
   a CPA,
   a broker/dealer,
   a stock broker,
   an insurance broker/agent,
   an attorney,
   a member of a bank,
   a member of a savings and loan,
   a member of a thrift, or
   a member of a credit union.

6. The system of claim 1, wherein the processor further determines one or more of: a loan originator compensation amount, a loan origination fee, and a loan originator credit.

7. The system of claim 1, wherein the loan originator is the loan customer.

8. The system of claim 1, wherein the additional data comprises notification of a financial advantage to the loan customer for refinancing a current loan for the loan customer.

9. The system of claim 1, wherein the law regulating loan compensation is RESPA.

10. The system of claim 1, wherein the processor determines one or more credits based on a pre-determined formula.

11. The system of claim 10, wherein at least one of the more credits are for closing costs.

12. The system of claim 1, wherein the additional data comprises one or more of:
   credit report data,
   an underwriting decision,
   underwriting data,
   an underwriting condition,
   flood certification data,
   pest control data,
   home inspection data,
   escrow data,
   title data,
   fee data,
   appraisal data, and
   MLS data.

13. The system of claim 12, wherein fee data comprises one or more of:
   an appraisal fee,
   a credit report fee,
   a loan discount fee,
   a loan origination fee,
   a broker fee,
   a flood certificate fee,
   a tax service fee,
   a wire transfer fee,
   a processing fee,
   an underwriting fee,
   a document preparation fee,
   an administration fee,
   a lender fee,
   a title fee,
   an escrow fee,
   an insurance fee,
   a courier fee,
   a processing fee,
   a notary fee,
   an endorsement fee,
   a local government fee,
   a pest control fee, and
   a MLS fee.

14. The system of claim 1,
   wherein the processor further generates one or more disclosure documents, and
   wherein at least one or more of the disclosure documents comprise one or more of: a loan originator compensation amount, a loan origination fee, and one or more originator credits.

15. The system of claim 14, wherein at least one of the one or more disclosure documents are required by one or more of:
   the law regulating loan compensation, the regulation regulating loan compensation, the guideline relating to loan compensation, and the licensing requirement regulating loan compensation.

16. The system of claim 1, wherein the pre-stored customer data is imported from one or more industry software systems.

17. The system of claim 16, wherein the one or more industry software systems are one or more of:
   a loan origination system,
   a tax system,
   a financial planning system,
   an insurance system,
   a broker system,
   a dealer system,
   an accounting system, and
   a legal system.

18. A system comprising:
   a graphical user interface adapted to receive loan application data from a loan originator regarding a loan customer;

one or more storage devices adapted to store the loan application data;
one or more data interfaces for receiving additional data, the receipt of the additional data coordinated by the loan originator; and
a processor adapted to generate, based upon the loan application data and the additional data:
a loan application; and
an indication that the loan originator qualifies for a loan originator compensation amount under one or more of:
a law regulating loan origination compensation,
a regulation regulating loan origination compensation,
a guideline relating to loan origination compensation, and
a licensing requirement regulating loan origination compensation.

19. The system of claim 18, wherein the loan originator is not the loan customer.

20. The system of claim 19, wherein the loan originator is:
a real estate broker,
a real estate agent,
a home builder,
a member of a relocation company,
a financial planner,
a CPA,
a broker/dealer,
a stock broker,
an insurance broker/agent,
an attorney,
a member of a bank,
a member of a savings and loan,
a member of a thrift, or
a member of a credit union.

21. The system of claim 18, wherein the processor determines one or more of: a loan origination compensation amount, a loan origination fee, and a loan originator credit based on one or more of: the loan application data and the additional data.

22. The system of claim 18, wherein the loan originator is the loan customer.

23. The system of claim 18, wherein the additional data comprises notification of a financial advantage to the loan customer for refinancing a current loan for the loan customer.

24. The system of claim 18, wherein the law regulating loan compensation is RESPA.

25. The system of claim 18, wherein the processor determines one or more credits based on a pre-determined formula.

26. The system of claim 25, wherein at least one of the more credits are for closing costs.

27. The system of claim 18, wherein the additional data comprises one or more of:
credit report data,
an underwriting decision,
underwriting data,
an underwriting condition,
flood certification data,
pest control data,
home inspection data,
escrow data,
title data,
fee data,
appraisal data, and
MLS data.

28. The system of claim 27, wherein fee data comprises one or more of:
an appraisal fee,
a credit report fee,
a loan discount fee,
a loan origination fee,
a broker fee,
a flood certificate fee,
a tax service fee,
a wire transfer fee,
a processing fee,
an underwriting fee,
a document preparation fee,
an administration fee,
a lender fee,
a title fee,
an escrow fee,
an insurance fee,
a courier fee,
a processing fee,
a notary fee,
an endorsement fee,
a local government fee,
a pest control fee, and
a MLS fee.

29. The system of claim 18,
wherein the processor further generates one or more disclosure documents, and
wherein at least one or more of the disclosure documents comprise one or more of: a loan originator compensation amount, a loan origination fee, and one or more loan originator credits.

30. The system of claim 29, wherein at least one of the one or more disclosure documents are required by one or more of:
the law regulating loan compensation, the regulation regulating loan compensation, the guideline relating to loan compensation, and the licensing requirement regulating loan compensation.

31. The system of claim 18 further comprising an electronic import interface for importing pre-stored customer data about the loan customer from a loan originator computer, wherein the pre-stored customer data is imported from one or more industry software systems.

32. The system of claim 31, wherein the one or more industry software systems are one or more of:
a loan origination system,
a tax system,
a financial planning system,
an insurance system,
a broker system,
a dealer system,
an accounting system, and
a legal system.

33. A system comprising:
an electronic import interface for importing pre-stored customer data about a loan customer from a loan originator computer;
a memory for storing the pre-stored customer data;
an input device for inputting loan application data; and
a processor for generating, based upon the pre-stored customer data and the loan application data:
a loan application; and
an indication that the loan originator qualifies for a loan originator compensation amount under one or more of:
a law regulating loan origination compensation,
a regulation regulating loan origination compensation,
a guideline relating to loan origination compensation, and
a licensing requirement regulating loan origination compensation.

34. The system of claim 33, wherein the loan originator is not the loan customer.

35. The system of claim 34, wherein the loan originator is:
a real estate broker,
a real estate agent,
a home builder,
a member of a relocation company,
a financial planner,
a CPA,
a broker/dealer,
a stock broker,
an insurance broker/agent,
an attorney,
a member of a bank,
a member of a savings and loan,
a member of a thrift, or
a member of a credit union.

36. The system of claim 33, further comprising one or more data interfaces for receiving additional data, wherein the processor further determines one or more of: a loan origination compensation amount, a loan origination fee, and a loan originator credit based on one or more of: the pre-stored customer data, the loan application data, and the additional data.

37. The system of claim 33, wherein the loan originator is the loan customer.

38. The system of claim 33, wherein the additional data comprises notification of a financial advantage to the loan customer for refinancing a current loan for the loan customer.

39. The system of claim 33, wherein the law regulating loan compensation is RESPA.

40. The system of claim 33, wherein the processor determines one or more credits based on a pre-determined formula.

41. The system of claim 40, wherein at least one of the more credits are for closing costs.

42. The system of claim 33, further comprising one or more data interfaces for receiving additional data, wherein the loan application further comprises the additional data, wherein the additional data comprises one or more of:
credit report data,
an underwriting decision,
underwriting data,
an underwriting condition,
flood certification data,
pest control data,
home inspection data,
escrow data,
title data,
fee data,
appraisal data, and
MLS data.

43. The system of claim 42, wherein fee data comprises one or more of:
an appraisal fee,
a credit report fee,
a loan discount fee,
a loan origination fee,
a broker fee,
a flood certificate fee,
a tax service fee,
a wire transfer fee,
a processing fee,
an underwriting fee,
a document preparation fee,
an administration fee,
a lender fee,
a title fee,
an escrow fee,
an insurance fee,
a courier fee,
a processing fee,
a notary fee,
an endorsement fee,
a local government fee,
a pest control fee, and
a MLS fee.

44. The system of claim 33,
wherein the processor further generates one or more disclosure documents, and
wherein at least one or more of the disclosure documents comprise one or more of: the loan originator compensation amount, a loan origination fee, and one or more loan originator credits.

45. The system of claim 44, wherein at least one of the one or more disclosure documents are required by one or more of:
the law regulating loan compensation,
the regulation regulating loan compensation,
the guideline relating to loan compensation, and
the licensing requirement regulating loan compensation.

46. The system of claim 33, wherein the pre-stored customer data is imported from one or more industry software systems.

47. The system of claim 46, wherein the one or more industry software systems are one or more of:
a loan origination system,
a tax system,
a financial planning system,
an insurance system,
a broker system,
a dealer system,
an accounting system, and
a legal system.

48. A data processing system adapted to manage origination of a mortgage loan by a loan originator in coordination with a loan broker distinct from the loan originator for a loan customer distinct from the loan originator using already possessed data for the loan customer, wherein the loan originator provides services necessary for origination of the mortgage loan and not duplicative of services provided by the loan broker, comprising:
a computer and graphical interfaces adapted to:
collect data regarding the loan customer not previously possessed by the loan originator, and
generate a loan application for the loan customer regarding the not previously possessed data and the already possessed data regarding the loan customer, and
generate disclosure documents regarding the mortgage loan and the already possessed data and the not previously possessed data regarding the loan customer; and
a modem or Ethernet card adapted to transfer the loan application to a computer associated with the loan broker, wherein the services are verified to be compliant with one or more of:
a law regulating loan origination compensation,
a regulation regulating loan origination compensation,
a guideline relating to loan origination compensation, and
a licensing requirement regulating loan origination compensation.

49. The data processing system of claim 48, wherein a financial market is analyzed to determine when there is financial advantage to refinancing a current loan.

50. The data processing system of claim 48, wherein the disclosure documents include a notice disclosure statement further including an estimate of a loan origination fee to be paid to the loan originator.

51. A data processing system adapted to manage the origination of a mortgage loan by a loan originator in coordination with a loan broker distinct from the loan originator for a loan customer distinct from the loan originator using already possessed data for the loan customer, who is an existing client of the loan originator, wherein the loan originator provides services necessary for the origination of the mortgage loan and not duplicative of services provided by the loan broker, comprising:
- a computer and associated peripheral adapted to:
  - import already possessed data by the loan originator regarding the loan customer,
  - collect data regarding the loan customer not previously possessed by the loan originator,
  - generate a loan application for the loan customer based upon the not previously possessed data and the already possessed data, both regarding the loan customer, and
  - generate disclosure documents based upon the mortgage loan and the already possessed data and the not previously possessed data regarding the loan customer; and
- a modem or Ethernet card adapted to transfer the loan application to a computer associated with the loan broker wherein the services are verified to be compliant with one or more of:
- a law regulating loan origination compensation,
- a regulation regulating loan origination compensation,
- a guideline relating to loan origination compensation, and
- a licensing requirement regulating loan origination compensation.

52. The data processing system of claim 51, wherein a financial market is analyzed to determine when there is financial advantage to refinancing a current loan.

53. The data processing system of claim 51, wherein the disclosure documents include a notice disclosure statement further including an estimate of a loan origination fee to be paid to the loan originator.

54. A method comprising:
- receiving, via a graphical user interface, a loan application data from a loan originator regarding a loan customer;
- storing, using one or more storage devices, the loan application data;
- receiving, using one or more data interfaces, additional data the receipt of the additional data coordinated by the loan originator; and
- generating, using a processor, based upon the loan application data and the additional data:
  - a loan application; and
  - an indication on one or more of the graphical user interface and a disclosure document that the loan originator qualifies for a loan originator compensation amount under one or more of:
- a law regulating loan origination compensation,
- a regulation regulating loan origination compensation,
- a guideline relating to loan origination compensation, and
- a licensing requirement regulating loan origination compensation.

55. The method of claim 54, wherein the loan originator is not the loan customer.

56. The system of claim 55, wherein the loan originator is:
- a real estate broker,
- a real estate agent,
- a home builder,
- a member of a relocation company,
- a financial planner,
- a CPA,
- a broker/dealer,
- a stock broker,
- an insurance broker/agent,
- an attorney,
- a member of a bank,
- a member of a savings and loan,
- a member of a thrift, or
- a member of a credit union.

57. The method of claim 54, wherein the processor determines one or more of: a loan origination compensation amount, a loan origination fee, and a loan originator credit based on one or more of: the loan application data and the additional data.

58. The method of claim 54, wherein the loan originator is the loan customer.

59. The method of claim 54, wherein the additional data comprises notification of a financial advantage to the loan customer for refinancing a current loan for the loan customer.

60. The method of claim 54, wherein the law regulating loan compensation is RESPA.

61. The method of claim 54, wherein the processor determines one or more credits based on a pre-determined formula.

62. The method of claim 61, wherein at least one of the one or more credits are for closing costs.

63. The method of claim 54, wherein the additional data comprises one or more of:
- credit report data,
- an underwriting decision,
- underwriting data,
- an underwriting condition,
- flood certification data,
- pest control data,
- home inspection data,
- escrow data,
- title data,
- fee data,
- appraisal data, and
- MLS data.

64. The method of claim 54, wherein fee data comprises one or more of:
- an appraisal fee,
- a credit report fee,
- a loan discount fee,
- a loan origination fee,
- a broker fee,
- a flood certificate fee,
- a tax service fee,
- a wire transfer fee,
- a processing fee,
- an underwriting fee,
- a document preparation fee,
- an administration fee,
- a lender fee,
- a title fee,
- an escrow fee,
- an insurance fee,
- a courier fee,
- a processing fee,
- a notary fee,
- an endorsement fee,
- a local government fee,
- a pest control fee, and
- a MLS fee.

65. The method of claim 54,
wherein the processor further generates one or more disclosure documents, and
wherein at least one or more of the disclosure documents comprise one or more of: a loan originator compensation amount, a loan origination fee, and one or more originator credits.

66. The method of claim 65, wherein at least one of the one or more disclosure documents are required by one or more of:
the law regulating loan compensation,
the regulation regulating loan compensation,
the guideline relating to loan compensation, and
the licensing requirement regulating loan compensation.

67. The method of claim 54 further comprising importing, using an electronic import interface, pre-stored customer data about the loan customer from a loan originator computer, wherein the pre-stored customer data is imported from one or more industry software systems.

68. The method of claim 67, wherein the one or more industry software systems are one or more of:
a loan origination system,
a tax system,
a financial planning system,
an insurance system,
a broker system,
a dealer system,
an accounting system, and
a legal system.

69. A method comprising:
importing, using an electronic import interface, pre-stored customer data about a loan customer from a loan originator computer;
storing, using a memory, the pre-stored customer data;
receiving, from an input device, loan application data; and
generating, using a processor, based upon the pre-stored customer data and the loan application data:
a loan application; and
an indication on one or more of the graphical user interface and a disclosure document that the loan originator qualifies for a loan originator compensation amount under one or more of:
a law regulating loan origination compensation,
a regulation regulating loan origination compensation,
a guideline relating to loan origination compensation, and
a licensing requirement regulating loan origination compensation.

70. The method of claim 69, wherein the loan originator is not the loan customer.

71. The system of claim 70, wherein the loan originator is:
a real estate broker,
a real estate agent,
a home builder,
a member of a relocation company,
a financial planner,
a CPA,
a broker/dealer,
a stock broker,
an insurance broker/agent,
an attorney,
a member of a bank,
a member of a savings and loan,
a member of a thrift, or
a member of a credit union.

72. The method of claim 69, further comprising receiving additional data, using one or more data interfaces, wherein the processor further determines one or more of: a loan origination compensation amount, a loan origination fee, and a loan originator credit based on one or more of: the pre-stored customer data, the loan application data, and the additional data.

73. The method of claim 69, wherein the loan originator is the loan customer.

74. The method of claim 69, wherein the additional data comprises notification of a financial advantage to the loan customer for refinancing a cuiTent loan for the loan customer.

75. The method of claim 69, wherein the law regulating loan compensation is RESPA.

76. The method of claim 69, wherein the processor determines one or more credits based on a pre-determined formula.

77. The method of claim 76, wherein at least one of the more credits are for closing costs.

78. The method of claim 69, further comprising one or more data interfaces for receiving additional data, wherein the loan application further comprises the additional data, wherein the additional data comprises one or more of:
credit report data,
an underwriting decision,
underwriting data,
an underwriting condition,
flood certification data,
pest control data,
home inspection data,
escrow data,
title data,
fee data,
appraisal data, and
MLS data.

79. The method of claim 78, wherein fee data comprises one or more of:
an appraisal fee,
a credit report fee,
a loan discount fee,
a loan origination fee,
a broker fee,
a flood certificate fee,
a tax service fee,
a wire transfer fee,
a processing fee,
an underwriting fee,
a document preparation fee,
an administration fee,
a lender fee,
a title fee,
an escrow fee,
an insurance fee,
a courier fee,
a processing fee,
a notary fee,
an endorsement fee,
a local government fee,
a pest control fee, and
a MLS fee.

80. The method of claim 69,
wherein the processor further generates one or more disclosure documents, and
wherein at least one or more of the disclosure documents comprise one or more of: the loan originator compensation amount, a loan origination fee, and one or more loan originator credits.

81. The method of claim 80, wherein at least one of the one or more disclosure documents are required by one or more of:
the law regulating loan compensation,
the regulation regulating loan compensation,
the guideline relating to loan compensation, and
the licensing requirement regulating loan compensation.

82. The method of claim 69, wherein the pre-stored customer data is imported from one or more industry software systems.

83. The method of claim 82, wherein the one or more industry software systems are one or more of:
- a loan origination system,
- a tax system,
- a financial planning system,
- an insurance system,
- a broker system,
- a dealer system,
- an accounting system, and
- a legal system.

* * * * *